United States Patent
Sanakkayala et al.

(10) Patent No.: US 11,429,499 B2
(45) Date of Patent: Aug. 30, 2022

(54) HEARTBEAT MONITORING OF VIRTUAL MACHINES FOR INITIATING FAILOVER OPERATIONS IN A DATA STORAGE MANAGEMENT SYSTEM, INCLUDING OPERATIONS BY A MASTER MONITOR NODE

(71) Applicant: Commvault Systems, Inc., Tinton Falls, NJ (US)

(72) Inventors: Santhosh Sanakkayala, Ocean, NJ (US); Sarath Cheriyan Joseph, Eatontown, NJ (US); Ananda Venkatesha, Cupertino, CA (US); Rajesh Polimera, Freehold, NJ (US); Rahul S. Pawar, Marlboro, NJ (US); Henry Wallace Dornemann, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 16/920,613

(22) Filed: Jul. 3, 2020

(65) Prior Publication Data
US 2020/0334113 A1 Oct. 22, 2020

Related U.S. Application Data

(63) Continuation of application No. 15/716,391, filed on Sep. 26, 2017, now Pat. No. 10,747,630.
(Continued)

(51) Int. Cl.
*G06F 11/00* (2006.01)
*G06F 11/20* (2006.01)
(Continued)

(52) U.S. Cl.
CPC ........ *G06F 11/203* (2013.01); *G06F 9/45558* (2013.01); *G06F 11/1438* (2013.01);
(Continued)

(58) Field of Classification Search
CPC .. G06F 11/203; G06F 11/1438; G06F 11/301; G06F 11/3006; G06F 11/3495;
(Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| AU | 2004227949 | 10/2004 |
| CA | 2498174 | 3/2004 |

(Continued)

OTHER PUBLICATIONS

U.S. Appl. No. 16/262,753, filed Jan. 30, 2019, Dornemann et al..
(Continued)

*Primary Examiner* — Sarai E Butler
(74) *Attorney, Agent, or Firm* — Commvault Systems, Inc.

(57) ABSTRACT

An illustrative "VM heartbeat monitoring network" of heartbeat monitor nodes monitors target VMs in a data storage management system. Accordingly, target VMs are distributed and re-distributed among illustrative worker monitor nodes according to preferences in an illustrative VM distribution logic. Worker heartbeat monitor nodes use an illustrative ping monitoring logic to transmit special-purpose heartbeat packets to respective target VMs and to track ping responses. If a target VM is ultimately confirmed failed by its worker monitor node, an illustrative master monitor node triggers an enhanced storage manager to initiate failover for
(Continued)

the failed VM. The enhanced storage manager communicates with the heartbeat monitor nodes and also manages VM failovers and other storage management operations in the system. Special features for cloud-to-cloud failover scenarios enable a VM in a first region of a public cloud to fail over to a second region.

20 Claims, 31 Drawing Sheets

Related U.S. Application Data

(60) Provisional application No. 62/402,269, filed on Sep. 30, 2016, provisional application No. 62/604,988, filed on Jul. 28, 2017.

(51) Int. Cl.
| | |
|---|---|
| *G06F 9/455* | (2018.01) |
| *G06F 11/14* | (2006.01) |
| *G06F 11/30* | (2006.01) |
| *H04L 43/10* | (2022.01) |
| *G06F 11/34* | (2006.01) |
| *H04L 41/046* | (2022.01) |
| *H04L 41/0659* | (2022.01) |
| *G06F 11/07* | (2006.01) |
| *H04L 43/0817* | (2022.01) |
| *H04L 43/12* | (2022.01) |

(52) U.S. Cl.
CPC ........ *G06F 11/301* (2013.01); *G06F 11/3006* (2013.01); *G06F 11/3495* (2013.01); *H04L 43/10* (2013.01); *G06F 11/0757* (2013.01); *G06F 11/2094* (2013.01); *G06F 11/2097* (2013.01); *G06F 2009/45591* (2013.01); *G06F 2201/805* (2013.01); *G06F 2201/815* (2013.01); *H04L 41/046* (2013.01); *H04L 41/0659* (2013.01); *H04L 43/0817* (2013.01); *H04L 43/12* (2013.01)

(58) Field of Classification Search
CPC ............ G06F 11/2094; G06F 11/2097; G06F 11/0757; G06F 9/203; G06F 2009/45591; G06F 2201/815; G06F 2201/805; G06F 9/45558; H04L 43/10; H04L 43/12; H04L 41/046; H04L 41/0649; H04L 43/0817; H04L 41/0659
USPC ...................................... 714/1–57
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,481,694 A | 1/1996 | Chao et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,544,359 A | 8/1996 | Tada et al. |
| 5,548,750 A | 8/1996 | Larsson et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,640,561 A | 6/1997 | Satoh et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,793,867 A | 8/1998 | Cordery et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,930,831 A | 7/1999 | Marsh et al. |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,078,932 A | 6/2000 | Haye et al. |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,904 B1 | 1/2001 | Gunderson |
| 6,185,474 B1 | 2/2001 | Nakamura et al. |
| 6,199,074 B1 | 3/2001 | Kern et al. |
| 6,212,512 B1 | 4/2001 | Barney et al. |
| 6,230,166 B1 | 5/2001 | Velamuri et al. |
| 6,260,069 B1 | 7/2001 | Anglin |
| 6,269,431 B1 | 7/2001 | Dunham |
| 6,272,631 B1 | 8/2001 | Thomlinson et al. |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,415,323 B1 | 7/2002 | McCanne et al. |
| 6,418,478 B1 | 7/2002 | Ignatius et al. |

(56) References Cited

U.S. PATENT DOCUMENTS

| | | | |
|---|---|---|---|
| 6,421,711 B1 | 7/2002 | Blumenau et al. |
| 6,487,561 B1 | 11/2002 | Ofek et al. |
| 6,516,327 B1 | 2/2003 | Zondervan et al. |
| 6,519,679 B2 | 2/2003 | Devireddy et al. |
| 6,538,669 B1 | 3/2003 | Lagueux, Jr |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Oshinsky et al. |
| 6,658,526 B2 | 12/2003 | Nguyen et al. |
| 6,704,839 B2 | 3/2004 | Butterworth et al. |
| 6,704,885 B1 | 3/2004 | Salas-Meza et al. |
| 6,721,767 B2 | 4/2004 | De Meno et al. |
| 6,732,124 B1 | 5/2004 | Koseki et al. |
| 6,760,723 B2 | 7/2004 | Oshinsky et al. |
| 6,769,003 B2 | 7/2004 | Park et al. |
| 6,772,290 B1 | 8/2004 | Bromley et al. |
| 6,795,904 B1 | 9/2004 | Kamvysselis |
| 6,820,214 B1 | 11/2004 | Cabrera et al. |
| 6,836,830 B1 | 12/2004 | Yamagami et al. |
| 6,839,747 B1 | 1/2005 | Blumenau et al. |
| 6,880,101 B2 | 4/2005 | Golasky et al. |
| 7,003,641 B2 | 2/2006 | Prahlad et al. |
| 7,035,880 B1 | 4/2006 | Crescent et al. |
| 7,065,537 B2 | 6/2006 | Cha et al. |
| 7,076,270 B2 | 7/2006 | Jaggers et al. |
| 7,082,464 B2 | 7/2006 | Hasan et al. |
| 7,100,007 B2 | 8/2006 | Saika |
| 7,103,432 B2 | 9/2006 | Drader et al. |
| 7,107,298 B2 | 9/2006 | Prahlad et al. |
| 7,130,970 B2 | 10/2006 | Devassy et al. |
| 7,143,121 B2 | 11/2006 | Mendonca et al. |
| 7,162,496 B2 | 1/2007 | Amarendran et al. |
| 7,174,433 B2 | 2/2007 | Kottomtharayil et al. |
| 7,178,059 B2 | 2/2007 | Greenspan et al. |
| 7,209,972 B1 | 4/2007 | Ignatius et al. |
| 7,219,162 B2 | 5/2007 | Denker et al. |
| 7,234,073 B1 | 6/2007 | Roytman et al. |
| 7,246,207 B2 | 7/2007 | Kottomtharayil |
| 7,249,150 B1 | 7/2007 | Watanabe et al. |
| 7,315,923 B2 | 1/2008 | Retnamma et al. |
| 7,315,924 B2 | 1/2008 | Prahlad et al. |
| 7,318,134 B1 | 1/2008 | Oliveira et al. |
| 7,324,543 B2 | 1/2008 | Wassew et al. |
| 7,343,356 B2 | 3/2008 | Prahlad et al. |
| 7,343,453 B2 | 3/2008 | Prahlad et al. |
| 7,346,623 B2 | 3/2008 | Prahlad et al. |
| 7,346,751 B2 | 3/2008 | Prahlad et al. |
| 7,376,895 B2 | 5/2008 | Tsao |
| 7,380,072 B2 | 5/2008 | Kottomtharayil et al. |
| 7,380,155 B2 | 5/2008 | Fung et al. |
| 7,383,293 B2 | 6/2008 | Gupta et al. |
| 7,386,744 B2 | 6/2008 | Barr et al. |
| 7,389,311 B1 | 6/2008 | Crescent et al. |
| 7,395,282 B1 | 7/2008 | Crescenti |
| 7,401,154 B2 | 7/2008 | Ignatius et al. |
| 7,409,509 B2 | 8/2008 | Devassy et al. |
| 7,424,519 B2 | 9/2008 | Hoshino et al. |
| 7,437,388 B1 | 10/2008 | DeVos |
| 7,440,982 B2 | 10/2008 | Lu et al. |
| 7,447,692 B2 | 11/2008 | Oshinsky et al. |
| 7,448,079 B2 | 11/2008 | Tremain |
| 7,454,569 B2 | 11/2008 | Kavuri et al. |
| 7,475,282 B2 | 1/2009 | Tormasov et al. |
| 7,484,054 B2 | 1/2009 | Kottomtharayil et al. |
| 7,484,208 B1 | 1/2009 | Nelson |
| 7,490,207 B2 | 2/2009 | Amarendran et al. |
| 7,500,053 B1 | 3/2009 | Kavuri et al. |
| 7,502,820 B2 | 3/2009 | Manders et al. |
| 7,512,595 B1 | 3/2009 | McBride et al. |
| 7,529,782 B2 | 5/2009 | Prahlad et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,546,484 B2 | 6/2009 | Sen et al. |
| 7,552,279 B1 | 6/2009 | Gandler |
| 7,568,080 B2 | 7/2009 | Prahlad et al. |
| 7,581,077 B2 | 8/2009 | Ignatius et al. |
| 7,594,138 B2 | 9/2009 | Abdulvahid |
| 7,596,721 B1 | 9/2009 | Flake et al. |
| 7,600,125 B1 | 10/2009 | Stringham |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,617,307 B2 | 11/2009 | Childress et al. |
| 7,620,710 B2 | 11/2009 | Kottomtharayil et al. |
| 7,631,351 B2 | 12/2009 | Erofeev |
| 7,636,743 B2 | 12/2009 | Erofeev |
| 7,640,406 B1 | 12/2009 | Hagerstrom et al. |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,884 B2 | 2/2010 | Prahlad et al. |
| 7,685,177 B1 | 3/2010 | Hagerstrom et al. |
| 7,694,070 B2 | 4/2010 | Mogi et al. |
| 7,702,782 B1 | 4/2010 | Pai |
| 7,707,184 B1 | 4/2010 | Zhang et al. |
| 7,707,190 B2 | 4/2010 | Yu et al. |
| 7,721,138 B1 | 5/2010 | Lyadvinsky et al. |
| 7,725,893 B2 | 5/2010 | Jaeckel et al. |
| 7,730,035 B2 | 6/2010 | Berger et al. |
| 7,734,578 B2 | 6/2010 | Prahlad et al. |
| 7,734,669 B2 | 6/2010 | Kottomtharayil et al. |
| 7,739,459 B2 | 6/2010 | Kottomtharayil et al. |
| 7,747,579 B2 | 6/2010 | Prahlad et al. |
| 7,756,835 B2 | 7/2010 | Pugh |
| 7,756,964 B2 | 7/2010 | Madison, Jr. et al. |
| 7,757,043 B2 | 7/2010 | Kavuri et al. |
| 7,765,167 B2 | 7/2010 | Prahlad et al. |
| 7,769,961 B2 | 8/2010 | Kottomtharayil et al. |
| 7,778,984 B2 | 8/2010 | Zhang et al. |
| 7,792,789 B2 | 9/2010 | Prahlad et al. |
| 7,793,307 B2 | 9/2010 | Gokhale et al. |
| 7,797,281 B1 | 9/2010 | Greene et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,822,717 B2 | 10/2010 | Kapoor et al. |
| 7,822,939 B1 | 10/2010 | Veprinsky et al. |
| 7,822,967 B2 | 10/2010 | Fung |
| 7,840,537 B2 | 11/2010 | Gokhale |
| 7,861,234 B1 | 12/2010 | Lolo |
| 7,882,077 B2 | 2/2011 | Gokhale et al. |
| 7,890,467 B2 | 2/2011 | Watanable et al. |
| 7,899,788 B2 | 3/2011 | Chandhok et al. |
| 7,917,617 B1 | 3/2011 | Ponnapur |
| 7,937,421 B2 | 5/2011 | Mikesell et al. |
| 7,937,612 B1 | 5/2011 | Lyadvinsky et al. |
| 8,001,277 B2 | 8/2011 | Mega et al. |
| 8,037,028 B2 | 10/2011 | Prahlad et al. |
| 8,037,032 B2 | 10/2011 | Pershin et al. |
| 8,046,550 B2 | 10/2011 | Feathergill |
| 8,051,473 B2 | 11/2011 | Szucs |
| 8,055,745 B2 | 11/2011 | Atluri |
| 8,060,476 B1 | 11/2011 | Afonso et al. |
| 8,069,271 B2 | 11/2011 | Brunet et al. |
| 8,099,391 B1 | 1/2012 | Monckton |
| 8,108,638 B2 | 1/2012 | Kishi |
| 8,108,640 B1 | 1/2012 | Holl, II |
| 8,117,492 B1 | 2/2012 | Searls et al. |
| 8,131,681 B1 | 3/2012 | Hangud et al. |
| 8,135,930 B1 | 3/2012 | Mattox et al. |
| 8,140,786 B2 | 3/2012 | Bunte |
| 8,156,086 B2 | 4/2012 | Lu et al. |
| 8,156,301 B1 | 4/2012 | Khandelwal et al. |
| 8,170,995 B2 | 5/2012 | Prahlad et al. |
| 8,185,777 B2 | 5/2012 | Davies et al. |
| 8,185,893 B2 | 5/2012 | Hyser et al. |
| 8,195,623 B2 | 6/2012 | Prahlad et al. |

(56) References Cited

U.S. PATENT DOCUMENTS

| | | |
|---|---|---|
| 8,199,911 B1 | 6/2012 | Tsaur et al. |
| 8,200,637 B1 | 6/2012 | Stringham |
| 8,204,859 B2 | 6/2012 | Ngo |
| 8,219,524 B2 | 7/2012 | Gokhale |
| 8,219,653 B1 | 7/2012 | Keagy et al. |
| 8,219,769 B1 | 7/2012 | Wilk |
| 8,225,133 B1 | 7/2012 | Lyadvinsky et al. |
| 8,229,896 B1 | 7/2012 | Narayanan |
| 8,229,954 B2 | 7/2012 | Kottomtharayil et al. |
| 8,230,256 B1 | 7/2012 | Raut |
| 8,271,443 B1 | 9/2012 | Swift et al. |
| 8,285,681 B2 | 10/2012 | Prahlad et al. |
| 8,291,170 B1 | 10/2012 | Zhang et al. |
| 8,291,407 B2 | 10/2012 | Greenwood et al. |
| 8,307,177 B2 | 11/2012 | Prahlad et al. |
| 8,307,187 B2 | 11/2012 | Chawla et al. |
| 8,315,992 B1 | 11/2012 | Gipp et al. |
| 8,336,040 B2 | 12/2012 | Davidson et al. |
| 8,364,652 B2 | 1/2013 | Vijayan et al. |
| 8,370,542 B2 | 2/2013 | Lu et al. |
| 8,396,838 B2 | 3/2013 | Brockway |
| 8,407,190 B2 | 3/2013 | Prahlad |
| 8,433,679 B2 | 4/2013 | Crescenti |
| 8,433,682 B2 | 4/2013 | Ngo |
| 8,434,131 B2 | 4/2013 | Varadharajan |
| 8,438,347 B1 | 5/2013 | Tawri et al. |
| 8,453,145 B1 | 5/2013 | Naik |
| 8,473,594 B2 | 6/2013 | Astete et al. |
| 8,479,304 B1 | 7/2013 | Clifford |
| 8,489,676 B1 | 7/2013 | Chaplin et al. |
| 8,504,526 B2 | 8/2013 | Gokhale et al. |
| 8,560,788 B1 | 10/2013 | Sreedharan et al. |
| 8,577,845 B2 | 11/2013 | Nguyen et al. |
| 8,578,120 B2 | 11/2013 | Attarde et al. |
| 8,578,126 B1 | 11/2013 | Gaonkar et al. |
| 8,595,191 B2 | 11/2013 | Prahlad et al. |
| 8,620,870 B2 | 12/2013 | Dwarampudi et al. |
| 8,650,389 B1 | 2/2014 | Thornewell et al. |
| 8,667,171 B2 | 3/2014 | Guo et al. |
| 8,706,867 B2 | 4/2014 | Vijayan |
| 8,751,857 B2 | 6/2014 | Frenkel et al. |
| 8,776,043 B1 | 7/2014 | Thimsen et al. |
| 8,793,222 B1 | 7/2014 | Stringham |
| 8,799,431 B2 | 8/2014 | Pabari |
| 8,825,720 B1 | 9/2014 | Xie et al. |
| 8,831,202 B1 | 9/2014 | Abidogun et al. |
| 8,850,146 B1 | 9/2014 | Majumdar |
| 8,904,081 B1 | 12/2014 | Kulkarni |
| 8,909,980 B1 | 12/2014 | Lewis et al. |
| 8,924,967 B2 | 12/2014 | Nelson |
| 8,930,496 B2 | 1/2015 | Gokhale et al. |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan Retnamma et al. |
| 8,954,796 B1 | 2/2015 | Cohen et al. |
| 8,959,299 B2 | 2/2015 | Ngo et al. |
| 8,966,318 B1 | 2/2015 | Shah |
| 9,020,895 B1 | 4/2015 | Rajashekar |
| 9,020,900 B2 | 4/2015 | Vijayan Retnamma et al. |
| 9,020,987 B1 | 4/2015 | Nanda et al. |
| 9,021,459 B1 | 4/2015 | Qu |
| 9,026,497 B2 | 5/2015 | Gokhale et al. |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,116,633 B2 | 8/2015 | Sancheti et al. |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,213,706 B2 | 12/2015 | Long et al. |
| 9,223,597 B2 | 12/2015 | Deshpande et al. |
| 9,235,474 B1 | 1/2016 | Petri et al. |
| 9,235,582 B1 | 1/2016 | Madiraju Varadaraju et al. |
| 9,239,687 B2 | 1/2016 | Vijayan et al. |
| 9,239,762 B1 | 1/2016 | Gunda et al. |
| 9,244,777 B2 | 1/2016 | Boullery et al. |
| 9,246,996 B1 | 1/2016 | Brooker |
| 9,268,602 B2 | 2/2016 | Prahlad et al. |
| 9,280,378 B2 | 3/2016 | Shah |
| 9,280,430 B2 | 3/2016 | Sarfare et al. |
| 9,286,086 B2 | 3/2016 | Deshpande et al. |
| 9,286,110 B2 | 3/2016 | Mitkar et al. |
| 9,292,350 B1 | 3/2016 | Pendharkar et al. |
| 9,298,386 B2 | 3/2016 | Baldwin et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,336,076 B2 | 5/2016 | Baldwin et al. |
| 9,342,537 B2 | 5/2016 | Kumarasamy et al. |
| 9,372,827 B2 | 6/2016 | Kumarasamy et al. |
| 9,378,035 B2 | 6/2016 | Kirpalani |
| 9,397,944 B1 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann et al. |
| 9,444,811 B2 | 9/2016 | Nara et al. |
| 9,448,731 B2 | 9/2016 | Nallathambi et al. |
| 9,451,023 B2 | 9/2016 | Sancheti |
| 9,461,881 B2 | 10/2016 | Kumarasamy |
| 9,471,441 B1 | 10/2016 | Lyadvinsky et al. |
| 9,477,683 B2 | 10/2016 | Ghosh |
| 9,483,361 B2 | 11/2016 | Gokhale et al. |
| 9,483,362 B2 | 11/2016 | Gokhale et al. |
| 9,483,363 B2 | 11/2016 | Gokhale et al. |
| 9,483,364 B2 | 11/2016 | Gokhale et al. |
| 9,489,244 B2 | 11/2016 | Mitkar et al. |
| 9,495,251 B2 | 11/2016 | Kottomtharayil et al. |
| 9,495,370 B1 | 11/2016 | Chatterjee et al. |
| 9,495,404 B2 | 11/2016 | Kumarasamy et al. |
| 9,563,518 B2 | 2/2017 | Klose |
| 9,575,789 B1 | 2/2017 | Rangari et al. |
| 9,575,991 B2 | 2/2017 | Ghosh |
| 9,588,847 B1 | 3/2017 | Natanzon et al. |
| 9,588,972 B2 | 3/2017 | Dwarampudi et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |
| 9,633,033 B2 | 4/2017 | Vijayan et al. |
| 9,639,274 B2 | 5/2017 | Maranna et al. |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil et al. |
| 9,710,465 B2 | 7/2017 | Dornemann et al. |
| 9,766,989 B2 | 7/2017 | Mitkar et al. |
| 9,740,702 B2 | 8/2017 | Pawar et al. |
| 9,760,398 B1 | 9/2017 | Pai |
| 9,760,448 B1 | 9/2017 | Per et al. |
| 9,766,825 B2 | 9/2017 | Bhagi et al. |
| 9,811,427 B2 | 11/2017 | Klose |
| 9,823,977 B2 | 11/2017 | Dornemann et al. |
| 9,852,026 B2 | 12/2017 | Mitkar et al. |
| 9,886,346 B2 | 2/2018 | Kumarasamy et al. |
| 9,892,276 B2 | 2/2018 | Bell et al. |
| 9,898,213 B2 | 2/2018 | Joshi et al. |
| 9,928,001 B2 | 3/2018 | Dornemann et al. |
| 9,939,981 B2 | 4/2018 | White et al. |
| 9,965,306 B1 | 5/2018 | Natanzon |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,990,253 B1 | 6/2018 | Rajimwale et al. |
| 9,996,287 B2 | 6/2018 | Dornemann et al. |
| 9,996,534 B2 | 6/2018 | Dornemann et al. |
| 10,001,935 B2 | 6/2018 | Gokhale et al. |
| 10,013,314 B2 | 7/2018 | Klose |
| 10,048,889 B2 | 8/2018 | Dornemann et al. |
| 10,061,658 B2 | 8/2018 | Long et al. |
| 10,061,663 B2 | 8/2018 | Vijayan et al. |

(56) References Cited

U.S. PATENT DOCUMENTS

| | | | |
|---|---|---|---|
| 10,073,649 B2 | 9/2018 | DeJong et al. |
| 10,084,873 B2 | 9/2018 | Dornemann et al. |
| 10,108,652 B2 | 10/2018 | Kumarasamy et al. |
| 10,146,643 B2 | 12/2018 | Fang et al. |
| 10,152,251 B2 | 12/2018 | Sancheti et al. |
| 10,162,528 B2 | 12/2018 | Sancheti et al. |
| 10,162,873 B2 | 12/2018 | Desphande et al. |
| 10,191,816 B2 | 1/2019 | Vijayan et al. |
| 10,228,962 B2 | 3/2019 | Dornemann et al. |
| 10,229,133 B2 | 3/2019 | Vijayan et al. |
| 10,255,143 B2 | 4/2019 | Vijayan et al. |
| 10,365,839 B2 | 7/2019 | Gokhale et al. |
| 10,379,892 B2 | 8/2019 | Kripalani |
| 10,380,072 B2 | 8/2019 | Attarde et al. |
| 10,387,073 B2 | 8/2019 | Bhagi et al. |
| 10,387,269 B2 | 8/2019 | Muller et al. |
| 10,417,102 B2 | 9/2019 | Sanakkayala et al. |
| 10,437,505 B2 | 10/2019 | Dornemann et al. |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,474,638 B2 | 11/2019 | Mitkar et al. |
| 10,481,826 B2 | 11/2019 | Vijayan et al. |
| 10,481,984 B1 | 11/2019 | Semyonov et al. |
| 10,496,547 B1 | 12/2019 | Naenko |
| 10,503,619 B2 | 12/2019 | Kremane |
| 10,503,753 B2 | 12/2019 | Mitkar et al. |
| 10,534,672 B2 | 1/2020 | Klose |
| 10,534,673 B2 | 1/2020 | Gokhale et al. |
| 10,540,327 B2 | 1/2020 | Ngo et al. |
| 10,565,067 B2 | 2/2020 | Dornemann |
| 10,572,468 B2 | 2/2020 | Dornemann et al. |
| 10,592,145 B2 | 3/2020 | Bedadala et al. |
| 10,592,350 B2 | 3/2020 | Dornemann |
| 10,592,357 B2 | 3/2020 | Vijayan et al. |
| 10,628,267 B2 | 4/2020 | Prahlad et al. |
| 10,650,057 B2 | 5/2020 | Pawar et al. |
| 10,673,943 B2 | 6/2020 | Prahlad et al. |
| 10,678,758 B2 | 6/2020 | Dornemann |
| 10,684,883 B2 | 6/2020 | Deshpande et al. |
| 10,684,924 B2 | 6/2020 | Kilaru et al. |
| 10,732,885 B2 | 8/2020 | Gutta et al. |
| 10,733,143 B2 | 8/2020 | Pawar et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,838,824 B2 | 11/2020 | Klose |
| 10,853,195 B2 | 12/2020 | Ashraf et al. |
| 10,877,928 B2 | 12/2020 | Nagrale et al. |
| 10,884,635 B2 | 1/2021 | Gokhale et al. |
| 10,896,104 B2 | 1/2021 | Sanakkayala et al. |
| 10,990,484 B2 | 4/2021 | Gokhale et al. |
| 11,016,696 B2 | 5/2021 | Ankireddypalle et al. |
| 11,099,943 B2 | 8/2021 | Gokhale et al. |
| 11,099,956 B1 | 8/2021 | Polimera et al. |
| 11,200,124 B2 | 12/2021 | Rathi et al. |
| 2001/0044910 A1 | 11/2001 | Ricart et al. |
| 2002/0069369 A1 | 6/2002 | Tremain |
| 2002/0095609 A1 | 7/2002 | Tokunaga |
| 2002/0178143 A1 | 11/2002 | Fujimoto |
| 2002/0194511 A1 | 12/2002 | Swoboda |
| 2003/0021223 A1 | 1/2003 | Kashyap |
| 2003/0031127 A1 | 2/2003 | Saleh et al. |
| 2003/0056142 A1 | 3/2003 | Hashemi et al. |
| 2003/0074600 A1 | 4/2003 | Tamatsu |
| 2003/0084076 A1 | 5/2003 | Sekiguchi et al. |
| 2003/0126494 A1 | 7/2003 | Strasser |
| 2003/0149750 A1 | 8/2003 | Franzenburg |
| 2003/0163495 A1 | 8/2003 | Lanzatella et al. |
| 2003/0182301 A1 | 9/2003 | Patterson et al. |
| 2003/0182329 A1 | 9/2003 | Sato |
| 2003/0204597 A1 | 10/2003 | Arakawa et al. |
| 2003/0236956 A1 | 12/2003 | Grubbs et al. |
| 2004/0019892 A1 | 1/2004 | E. et al. |
| 2004/0030668 A1 | 2/2004 | Pawlowski et al. |
| 2004/0030822 A1 | 2/2004 | Rajan et al. |
| 2004/0044642 A1 | 3/2004 | Fujii et al. |
| 2004/0078654 A1 | 4/2004 | Holland et al. |
| 2004/0128442 A1 | 7/2004 | Hinshaw et al. |
| 2004/0139127 A1 | 7/2004 | Pofelski |
| 2004/0153823 A1 | 8/2004 | Ansari |
| 2004/0230899 A1 | 11/2004 | Pagnano et al. |
| 2004/0250033 A1 | 12/2004 | Prahlad et al. |
| 2004/0267838 A1 | 12/2004 | Curran et al. |
| 2004/0268175 A1 | 12/2004 | Koch et al. |
| 2005/0039069 A1 | 2/2005 | Prahlad et al. |
| 2005/0044114 A1 | 2/2005 | Kottomtharayil et al. |
| 2005/0060356 A1 | 3/2005 | Saika |
| 2005/0080970 A1 | 4/2005 | Jeyasingh et al. |
| 2005/0131996 A1 | 6/2005 | Mastrianni et al. |
| 2005/0138461 A1 | 6/2005 | Allen et al. |
| 2005/0172161 A1* | 8/2005 | Cruz ............... G06F 11/2025 714/4.11 |
| 2005/0183072 A1 | 8/2005 | Horning et al. |
| 2005/0187891 A1 | 8/2005 | Johnson et al. |
| 2005/0198303 A1 | 9/2005 | Knauerhase et al. |
| 2005/0216788 A1 | 9/2005 | Mani-Meitav et al. |
| 2005/0235286 A1 | 10/2005 | Ballew et al. |
| 2005/0257062 A1 | 11/2005 | Ignatius et al. |
| 2005/0262033 A1 | 11/2005 | Yamashita |
| 2005/0262097 A1 | 11/2005 | Sim-Tang |
| 2005/0262316 A1 | 11/2005 | Obayashi et al. |
| 2005/0268156 A1 | 12/2005 | Mashayekhi et al. |
| 2005/0278397 A1 | 12/2005 | Clark |
| 2006/0005048 A1 | 1/2006 | Osaki |
| 2006/0010227 A1 | 1/2006 | Atluri |
| 2006/0026452 A1 | 2/2006 | Suzuki et al. |
| 2006/0036658 A1 | 2/2006 | Henrickson |
| 2006/0047626 A1 | 3/2006 | Raheem |
| 2006/0058994 A1 | 3/2006 | Ravi et al. |
| 2006/0085672 A1 | 4/2006 | Watanabe et al. |
| 2006/0101189 A1 | 5/2006 | Chandrasekaran et al. |
| 2006/0155594 A1 | 7/2006 | Almeida et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0206547 A1 | 9/2006 | Kulkarni et al. |
| 2006/0224846 A1 | 10/2006 | Amarendran |
| 2006/0225065 A1 | 10/2006 | Chandhok et al. |
| 2006/0230136 A1 | 10/2006 | Ma |
| 2006/0236054 A1 | 10/2006 | Kitamura et al. |
| 2007/0027999 A1 | 2/2007 | Allen et al. |
| 2007/0043870 A1 | 2/2007 | Ninose |
| 2007/0050526 A1 | 3/2007 | Abe et al. |
| 2007/0074068 A1 | 3/2007 | Hsieh |
| 2007/0094467 A1 | 4/2007 | Yamasaki |
| 2007/0094533 A1 | 4/2007 | Coombs et al. |
| 2007/0100792 A1 | 5/2007 | Lent et al. |
| 2007/0150499 A1 | 6/2007 | D'Souza et al. |
| 2007/0156793 A1 | 7/2007 | D'Souza et al. |
| 2007/0185922 A1 | 8/2007 | Kapoor et al. |
| 2007/0185938 A1 | 8/2007 | Prahlad et al. |
| 2007/0186068 A1 | 8/2007 | Agrawal |
| 2007/0198802 A1 | 8/2007 | Kavuri |
| 2007/0203938 A1 | 8/2007 | Prahlad et al. |
| 2007/0208918 A1 | 9/2007 | Harbin et al. |
| 2007/0220319 A1 | 9/2007 | Desai et al. |
| 2007/0226535 A1 | 9/2007 | Gokhale |
| 2007/0234108 A1 | 10/2007 | Cox et al. |
| 2007/0234302 A1 | 10/2007 | Suzuki et al. |
| 2007/0239804 A1 | 10/2007 | Armstrong et al. |
| 2007/0250365 A1 | 10/2007 | Chakrabarti et al. |
| 2007/0266056 A1 | 11/2007 | Stacey et al. |
| 2007/0271471 A1 | 11/2007 | Merzlikine et al. |
| 2007/0282921 A1 | 12/2007 | Atluri et al. |
| 2007/0283355 A1 | 12/2007 | Misono et al. |
| 2007/0299930 A1 | 12/2007 | Wendelrup et al. |
| 2008/0007765 A1 | 1/2008 | Ogata et al. |
| 2008/0022058 A1 | 1/2008 | Nadathur et al. |
| 2008/0059704 A1 | 3/2008 | Kavuri |
| 2008/0071841 A1 | 3/2008 | Okada et al. |
| 2008/0091655 A1 | 4/2008 | Gokhale |
| 2008/0098049 A1 | 4/2008 | Pillai et al. |

(56) References Cited

U.S. PATENT DOCUMENTS

| | | |
|---|---|---|
| 2008/0126833 A1 | 5/2008 | Callaway et al. |
| 2008/0134177 A1 | 6/2008 | Fitzgerald et al. |
| 2008/0147754 A1 | 6/2008 | Littlefield et al. |
| 2008/0162840 A1 | 7/2008 | Augenstein |
| 2008/0189468 A1 | 8/2008 | Schmidt et al. |
| 2008/0195639 A1 | 8/2008 | Freeman et al. |
| 2008/0201600 A1 | 8/2008 | Lu |
| 2008/0228771 A1 | 9/2008 | Prahlad et al. |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244068 A1 | 10/2008 | Iyoda et al. |
| 2008/0244177 A1 | 10/2008 | Crescenti et al. |
| 2008/0244204 A1 | 10/2008 | Cremelie et al. |
| 2008/0250407 A1 | 10/2008 | Dadhia et al. |
| 2008/0253283 A1 | 10/2008 | Douglis et al. |
| 2008/0270488 A1 | 10/2008 | Ozawa et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0307020 A1 | 12/2008 | Ko et al. |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0013258 A1 | 1/2009 | Hintermeister et al. |
| 2009/0037680 A1 | 2/2009 | Colbert et al. |
| 2009/0037763 A1 | 2/2009 | Adhya et al. |
| 2009/0055507 A1 | 2/2009 | Oeda |
| 2009/0077557 A1 | 3/2009 | Ichikawa et al. |
| 2009/0113109 A1 | 4/2009 | Nelson et al. |
| 2009/0144416 A1 | 6/2009 | Chatley et al. |
| 2009/0157882 A1 | 6/2009 | Kashyap |
| 2009/0183145 A1 | 7/2009 | Hu et al. |
| 2009/0204649 A1 | 8/2009 | Wong et al. |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Siesarev et al. |
| 2009/0240904 A1 | 9/2009 | Austruy et al. |
| 2009/0243846 A1 | 10/2009 | Yuuki |
| 2009/0248762 A1 | 10/2009 | Prahlad et al. |
| 2009/0249005 A1 | 10/2009 | Bender et al. |
| 2009/0282404 A1 | 11/2009 | Khandekar et al. |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327477 A1 | 12/2009 | Madison, Jr. et al. |
| 2010/0011178 A1 | 1/2010 | Feathergill |
| 2010/0017444 A1 | 1/2010 | Chatterjee et al. |
| 2010/0017647 A1 | 1/2010 | Callaway et al. |
| 2010/0030984 A1 | 2/2010 | Erickson |
| 2010/0031086 A1 | 2/2010 | Leppard |
| 2010/0042790 A1 | 2/2010 | Mondal et al. |
| 2010/0049929 A1 | 2/2010 | Nagarkar et al. |
| 2010/0049930 A1 | 2/2010 | Pershin |
| 2010/0070466 A1 | 3/2010 | Prahlad et al. |
| 2010/0070474 A1 | 3/2010 | Lad |
| 2010/0070478 A1 | 3/2010 | Anglin |
| 2010/0070725 A1 | 3/2010 | Prahlad et al. |
| 2010/0070726 A1 | 3/2010 | Ngo et al. |
| 2010/0077161 A1 | 3/2010 | Stoakes et al. |
| 2010/0082672 A1 | 4/2010 | Kottomtharayil |
| 2010/0094948 A1 | 4/2010 | Ganesh et al. |
| 2010/0094981 A1 | 4/2010 | Cordray |
| 2010/0101300 A1 | 4/2010 | Rigby et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0162037 A1 | 6/2010 | Maule et al. |
| 2010/0186014 A1 | 7/2010 | Vaghani et al. |
| 2010/0211829 A1 | 8/2010 | Ziskind et al. |
| 2010/0223495 A1 | 9/2010 | Leppard |
| 2010/0228913 A1 | 9/2010 | Czezatke et al. |
| 2010/0242096 A1 | 9/2010 | Varadharajan et al. |
| 2010/0250549 A1 | 9/2010 | Muller et al. |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0280999 A1 | 11/2010 | Atluri et al. |
| 2010/0281458 A1 | 11/2010 | Paladino et al. |
| 2010/0293439 A1 | 11/2010 | Flynn et al. |
| 2010/0299309 A1 | 11/2010 | Maki et al. |
| 2010/0299490 A1 | 11/2010 | Attarde et al. |
| 2010/0299666 A1 | 11/2010 | Agbaria et al. |
| 2010/0306173 A1 | 12/2010 | Frank |
| 2010/0306486 A1 | 12/2010 | Balasubramanian et al. |
| 2010/0325471 A1* | 12/2010 | Mishra ............... G06F 11/1484 714/3 |
| 2010/0325727 A1 | 12/2010 | Neystad et al. |
| 2010/0332401 A1 | 12/2010 | Prahlad |
| 2010/0332454 A1 | 12/2010 | Prahlad et al. |
| 2010/0332456 A1 | 12/2010 | Prahlad et al. |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0107025 A1 | 5/2011 | Urkude et al. |
| 2011/0107331 A1 | 5/2011 | Evans et al. |
| 2011/0153570 A1 | 6/2011 | Kim et al. |
| 2011/0154109 A1 | 6/2011 | Levine |
| 2011/0161299 A1 | 6/2011 | Prahlad |
| 2011/0179414 A1 | 7/2011 | Goggin et al. |
| 2011/0185355 A1 | 7/2011 | Chawla et al. |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0218967 A1 | 9/2011 | Sliger et al. |
| 2011/0219144 A1 | 9/2011 | Amit et al. |
| 2011/0225277 A1 | 9/2011 | Freimuth et al. |
| 2011/0234583 A1 | 9/2011 | Bakalash |
| 2011/0239013 A1 | 9/2011 | Muller |
| 2011/0246430 A1 | 10/2011 | Prahlad et al. |
| 2011/0252208 A1 | 10/2011 | Ali et al. |
| 2011/0264786 A1 | 10/2011 | Kedem et al. |
| 2011/0289281 A1 | 11/2011 | Spackman |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0078881 A1 | 3/2012 | Crump et al. |
| 2012/0079221 A1 | 3/2012 | Sivasubramanian et al. |
| 2012/0084262 A1 | 4/2012 | Dwarampudi et al. |
| 2012/0084272 A1 | 4/2012 | Garces-Erice et al. |
| 2012/0084769 A1 | 4/2012 | Adi et al. |
| 2012/0096149 A1 | 4/2012 | Sunkara et al. |
| 2012/0101999 A1 | 4/2012 | Scherzinger et al. |
| 2012/0110328 A1 | 5/2012 | Pate et al. |

(56) References Cited

U.S. PATENT DOCUMENTS

| | | |
|---|---|---|
| 2012/0131295 A1 | 5/2012 | Nakajima |
| 2012/0131578 A1 | 5/2012 | Ciano et al. |
| 2012/0136832 A1 | 5/2012 | Sadhwani |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1 | 8/2012 | Bezbaruah |
| 2012/0221843 A1 | 8/2012 | Bak et al. |
| 2012/0233285 A1 | 9/2012 | Suzuki |
| 2012/0254119 A1 | 10/2012 | Kumarasamy et al. |
| 2012/0254364 A1 | 10/2012 | Vijayan |
| 2012/0254824 A1 | 10/2012 | Bansold |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0054533 A1 | 2/2013 | Hao et al. |
| 2013/0061014 A1 | 3/2013 | Prahlad et al. |
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0117744 A1 | 5/2013 | Klein et al. |
| 2013/0138880 A1 | 5/2013 | Murata |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy |
| 2013/0238572 A1 | 9/2013 | Prahlad et al. |
| 2013/0262390 A1 | 10/2013 | Kumarasamy et al. |
| 2013/0262396 A1 | 10/2013 | Kripalani et al. |
| 2013/0262638 A1 | 10/2013 | Kumarasamy et al. |
| 2013/0262801 A1 | 10/2013 | Sancheti et al. |
| 2013/0268931 A1 | 10/2013 | O'Hare et al. |
| 2013/0290267 A1 | 10/2013 | Dwarampudi et al. |
| 2013/0311429 A1 | 11/2013 | Agetsuma |
| 2013/0326260 A1 | 12/2013 | Wei et al. |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0082128 A1 | 3/2014 | Beard |
| 2014/0089266 A1 | 3/2014 | Une et al. |
| 2014/0095816 A1 | 4/2014 | Hsu et al. |
| 2014/0101300 A1 | 4/2014 | Rosensweig et al. |
| 2014/0115285 A1 | 4/2014 | Arcese et al. |
| 2014/0115287 A1 | 4/2014 | Schnapp et al. |
| 2014/0136803 A1 | 5/2014 | Qin |
| 2014/0143636 A1 | 5/2014 | Frost et al. |
| 2014/0156684 A1 | 6/2014 | Zaslavsky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0195749 A1 | 7/2014 | Colgrove et al. |
| 2014/0196037 A1 | 7/2014 | Gopalan et al. |
| 2014/0196038 A1 | 7/2014 | Kottomtharayil et al. |
| 2014/0196039 A1 | 7/2014 | Kottomtharayil et al. |
| 2014/0201142 A1 | 7/2014 | Varadharajan et al. |
| 2014/0201151 A1 | 7/2014 | Kumarasamy et al. |
| 2014/0201153 A1 | 7/2014 | Vijayan et al. |
| 2014/0201157 A1 | 7/2014 | Pawar et al. |
| 2014/0201162 A1 | 7/2014 | Kumarasamy et al. |
| 2014/0201170 A1 | 7/2014 | Vijayan et al. |
| 2014/0229451 A1 | 8/2014 | Venkatesh et al. |
| 2014/0237537 A1 | 8/2014 | Manmohan et al. |
| 2014/0244610 A1 | 8/2014 | Raman et al. |
| 2014/0258245 A1 | 9/2014 | Estes |
| 2014/0259015 A1 | 9/2014 | Chigusa et al. |
| 2014/0278530 A1 | 9/2014 | Bruce et al. |
| 2014/0281758 A1 | 9/2014 | Klein et al. |
| 2014/0282514 A1 | 9/2014 | Carson et al. |
| 2014/0330874 A1 | 11/2014 | Novak et al. |
| 2014/0337285 A1 | 11/2014 | Gokhale et al. |
| 2014/0337295 A1 | 11/2014 | Haselton et al. |
| 2014/0337664 A1 | 11/2014 | Gokhale et al. |
| 2014/0344323 A1 | 11/2014 | Pelavin et al. |
| 2014/0372384 A1 | 12/2014 | Long et al. |
| 2014/0372788 A1* | 12/2014 | Vavrick ............... G06F 11/0712 714/4.1 |
| 2015/0026508 A1* | 1/2015 | Jacobs ................ G06F 11/1658 714/4.11 |
| 2015/0058382 A1 | 2/2015 | St. Laurent |
| 2015/0067391 A1 | 3/2015 | Merchant et al. |
| 2015/0067393 A1 | 3/2015 | Madani et al. |
| 2015/0074536 A1 | 3/2015 | Varadharajan et al. |
| 2015/0088821 A1 | 3/2015 | Blea et al. |
| 2015/0089185 A1 | 3/2015 | Brandyberry et al. |
| 2015/0095908 A1* | 4/2015 | Jacobs ................ G06F 9/45558 718/1 |
| 2015/0120928 A1 | 4/2015 | Gummaraju et al. |
| 2015/0121122 A1 | 4/2015 | Towstopiat et al. |
| 2015/0134637 A1 | 5/2015 | Magdon-Ismail et al. |
| 2015/0142745 A1 | 5/2015 | Tekade et al. |
| 2015/0149813 A1* | 5/2015 | Mizuno ............... G06F 11/1484 714/4.11 |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0169417 A1* | 6/2015 | Brandwine ......... H04L 61/2503 714/4.11 |
| 2015/0199238 A1 | 7/2015 | Badgley |
| 2015/0205682 A1 | 7/2015 | Gokhale et al. |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0268876 A1 | 9/2015 | Ahn et al. |
| 2015/0278046 A1* | 10/2015 | Zellermayer ....... G06F 11/1484 714/4.11 |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347306 A1 | 12/2015 | Gschwind |
| 2015/0347430 A1 | 12/2015 | Ghosh |
| 2015/0350027 A1 | 12/2015 | Raissinia et al. |
| 2015/0363254 A1* | 12/2015 | Satoyama ........... G06F 11/0727 714/57 |
| 2015/0363413 A1 | 12/2015 | Ghosh |
| 2015/0370652 A1 | 12/2015 | He et al. |
| 2015/0370668 A1 | 12/2015 | Nazari et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0378857 A1* | 12/2015 | Sevigny ............... G06F 11/1484 714/6.3 |
| 2015/0381711 A1* | 12/2015 | Singh .................... H04L 41/12 709/221 |
| 2016/0019317 A1 | 1/2016 | Pawar et al. |
| 2016/0026405 A1 | 1/2016 | Dhuse |
| 2016/0070623 A1 | 3/2016 | Derk |
| 2016/0085606 A1 | 3/2016 | Panasko et al. |
| 2016/0092467 A1 | 3/2016 | Lee et al. |
| 2016/0132400 A1 | 5/2016 | Pawar et al. |
| 2016/0154709 A1 | 6/2016 | Mitkar et al. |
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0203060 A1 | 7/2016 | Singh |

(56) References Cited

U.S. PATENT DOCUMENTS

| | | |
|---|---|---|
| 2016/0210064 A1 | 7/2016 | Dornemann et al. |
| 2016/0226966 A1 | 8/2016 | Lin |
| 2016/0283335 A1 | 9/2016 | Yao et al. |
| 2016/0299818 A1 | 10/2016 | Vijayan Retnamma et al. |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2016/0371127 A1 | 12/2016 | Antony |
| 2017/0031768 A1 | 2/2017 | Sarab |
| 2017/0054720 A1* | 2/2017 | Geng ............... H04L 67/1097 |
| 2017/0090972 A1 | 3/2017 | Ryu et al. |
| 2017/0123939 A1 | 5/2017 | Maheshwari et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0192868 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0262204 A1 | 9/2017 | Dornemann et al. |
| 2017/0262347 A1 | 9/2017 | Dornemann |
| 2017/0262350 A1 | 9/2017 | Dornemann |
| 2017/0264589 A1 | 9/2017 | Hunt et al. |
| 2017/0286230 A1 | 10/2017 | Zamir |
| 2017/0315876 A1 | 11/2017 | Dornquast et al. |
| 2017/0371547 A1 | 12/2017 | Fruchtman et al. |
| 2018/0011885 A1 | 1/2018 | Prahlad et al. |
| 2018/0067955 A1 | 3/2018 | Pawar et al. |
| 2018/0075166 A1 | 3/2018 | Pawar et al. |
| 2018/0089031 A1 | 3/2018 | Dornemann et al. |
| 2018/0095846 A1 | 4/2018 | Sanakkayala et al. |
| 2018/0113623 A1 | 4/2018 | Sancheti |
| 2018/0143879 A1 | 5/2018 | Dornemann |
| 2018/0143880 A1 | 5/2018 | Dornemann |
| 2018/0173454 A1 | 6/2018 | Dornemann et al. |
| 2018/0181598 A1 | 6/2018 | Pawar et al. |
| 2018/0253192 A1 | 9/2018 | Varadharajan et al. |
| 2018/0260157 A1 | 9/2018 | Dornemann et al. |
| 2018/0267861 A1 | 9/2018 | Iyer et al. |
| 2018/0275913 A1 | 9/2018 | Mitkar et al. |
| 2018/0276022 A1 | 9/2018 | Mitkar et al. |
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0284986 A1 | 10/2018 | Bhagi et al. |
| 2018/0285202 A1 | 10/2018 | Bhagi et al. |
| 2018/0285209 A1 | 10/2018 | Liu et al. |
| 2018/0285215 A1 | 10/2018 | Ashraf et al. |
| 2018/0285353 A1 | 10/2018 | Rao et al. |
| 2018/0300168 A1 | 10/2018 | Deshpande et al. |
| 2018/0307510 A1 | 10/2018 | Kottomtharayil et al. |
| 2018/0314694 A1 | 11/2018 | Dornemann et al. |
| 2018/0329636 A1 | 11/2018 | Dornemann et al. |
| 2018/0373597 A1 | 12/2018 | Rana |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0108341 A1 | 4/2019 | Bedhapudi et al. |
| 2019/0196916 A1 | 6/2019 | Kumarasamy et al. |
| 2019/0272220 A1 | 9/2019 | Vijayan et al. |
| 2019/0272221 A1 | 9/2019 | Vijayan et al. |
| 2019/0278662 A1 | 9/2019 | Nagrale et al. |
| 2019/0324791 A1 | 10/2019 | Kripalani |
| 2019/0340088 A1 | 11/2019 | Sanakkayala et al. |
| 2019/0347120 A1 | 11/2019 | Kottomtharayil et al. |
| 2019/0369901 A1 | 12/2019 | Dornemann et al. |
| 2019/0370107 A1 | 12/2019 | Subburasu et al. |
| 2019/0391742 A1 | 12/2019 | Bhagi et al. |
| 2020/0034252 A1 | 1/2020 | Mitkar et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0159627 A1 | 5/2020 | Bedadala et al. |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0183802 A1 | 6/2020 | Rathi et al. |
| 2020/0241907 A1 | 7/2020 | Dornemann et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334201 A1 | 10/2020 | Pawar et al. |
| 2020/0334221 A1 | 10/2020 | Prahlad et al. |
| 2021/0026741 A1 | 1/2021 | Klose |
| 2021/0334002 A1 | 10/2021 | Ankireddypalle et al. |
| 2021/0342237 A1 | 11/2021 | Polimera et al. |
| 2022/0012135 A1 | 1/2022 | Gokhale et al. |
| 2022/0043727 A1 | 2/2022 | Rathi et al. |

FOREIGN PATENT DOCUMENTS

| | | |
|---|---|---|
| DE | 69415115.7 | 8/1999 |
| DE | 60020978.4 | 4/2006 |
| EP | 0259912 A1 | 3/1988 |
| EP | 0405926 A2 | 1/1991 |
| EP | 0467546 A2 | 1/1992 |
| EP | 0541281 A2 | 5/1993 |
| EP | 0645709 | 3/1995 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| EP | 1204922 | 5/2002 |
| EP | 1209569 | 5/2002 |
| EP | 1384135 | 1/2004 |
| EP | 1387269 | 2/2004 |
| EP | 1393181 | 3/2004 |
| EP | 1533701 | 5/2005 |
| EP | 1938192 | 11/2009 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2005/050449 A1 | 6/2005 |
| WO | WO 2005/103955 A1 | 11/2005 |
| WO | WO 2006/052872 | 5/2006 |
| WO | WO 2007/021678 A2 | 2/2007 |
| WO | WO 2010/140264 A1 | 12/2010 |

OTHER PUBLICATIONS

Armstead et al., "Implementation of a Campus-wide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Brandon, J., "Virtualization Shakes Up Backup Strategy," <http://www.computerworld.com>, Feb. 21, 2008, 3 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Celesti, et al., "Improving Virtual Machine Migration in Federated Cloud Environments", 2010, pp. 61-67.

Chan, et al., "An Approach to High Availability for Cloud Servers with Snapshot Mechanism," 2012, pp. 1-6.

Chen et al., "When Virtual Is Better Than Real", IEEE 2001, pp. 133-138.

Chervenak, et al., "Protecting File Systems—A Survey of Backup Techniques," 1998, pp. 17-31.

Chiappetta, Marco, "ESA Enthusiast System Architecture," <http://hothardware.com/Articles/NVIDIA—ESA—Enthusiast—System—Architecture/>, Nov. 5, 2007, 2 pages.

(56) References Cited

OTHER PUBLICATIONS

CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, accessed Apr. 30, 2014, 1 page.
CommVault Systems, Inc., "Enhanced Protection and Manageability of Virtual Servers," Partner Solution Brief, 2008, 6 pages.
Cully, et al., "Remus: High Availability via Asynchronous Virtual Machine Replication", 2008, pp. 161-174.
Data Protection for Large Vmware and Vblock Environments Using EMC Avamar Applied Technology, Nov. 2010, EMC Corporation, 26 pages.
Davis, D., "3 VMware Consolidated Backup (VCB) Utilities You Should Know," Petri IT Knowlegebase, <http://www.petri.co.il/vmware-consolidated-backup-utilities.htm>, Nov. 16, 2007, 3 pages.
Davis, D., "Understanding VMware VMX Configuration Files," Petri IT Knowledgebase, <http://www.petri.co.il/virtual_vmware_vmx_configuration_files.htm>, Nov. 16, 2007, 3 pages.
Davis, D., "VMware Server & Workstation Disk Files Explained," Petri IT Knowledgebase, <http://www.petri.co.il/virtual_vmware_files_explained.htm>, May 3, 2008, 3 pages.
Davis, D., "VMware Versions Compared," Petri IT Knowledgebase, <http://www.petri.co.il/virtual_vmware_versions_compared.htm>, Nov. 16, 2007, 3 pages.
Deng, et al., "Fast Saving and Restoring Virtual Machines with Page Compression", 2011, pp. 150-157.
Eitel, "Backup and Storage Management in Distributed Heterogeneous Environments," IEEE, Jun. 12-16, 1994, pp. 124-126.
Eldos Callback File System product information from https://www.eldos.com/clients/104-345.php retrieved on Dec. 30, 2016 in 2 pages.
Eldos Usermode filesystem for your Windows applications—Callback File System® (CBFS®)—Create and manage virtual filesystems and disks from your Windows applications retrieved from https://eldos.com/cbfs on Dec. 30, 2016 in 4 pages.
Fraser, et al., "Safe Hardware Access With the Xen Virtual Machine Monitor", 1st Workshop on Operating System and Architectural Support for the demand IT InfraStructure (OASIS), 2004, pp. 1-10.
Gait, "The Optical File Cabinet: A Random-Access File System for Write-Once Optical Disks," IEEE Computer, vol. 21, No. 6, pp. 11-22 (Jun. 1988) (see in particular figure 5 in p. 15 and recitation in claim 5).
Galan et al. "Service Specification in Cloud Environments Based on Extension to Oper Standards" COMSWARE Jun. 16-19, 2009 Dublin, Ireland ACM.
Gibson, et al., "Implementing Preinstallation Environment Media for Use in User Support," 2007, pp. 129-130.
Granger, et al., "Survivable Storage Systems", 2001, pp. 184-195.
Gupta, et al., "GPFS-SNC: An enterprise storage framework for virtual-machine clouds", 2011, pp. 1-10.
Haselhorst, et al., "Efficient Storage Synchronization for Live Migration in Cloud Infrastructures", 2011, pp. 511-518.
Hirofuchio, Takahiro et al., "A live storage migration mechanism over wan and its performance evaluation," 2009, pp. 67-74.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Hu, Wenjin et al., "A Quantitative Study of Virtual Machine Live Migration," 2013, pp. 1-10.
Huff, "Data Set Usage Sequence Number," IBM Technical Disclosure Bulletin, vol. 24, No. 5, Oct. 1981 New York, US, pp. 2404-2406.
Ibrahim, Shadi et al., "CLOUDLET: Towards MapReduce Implementation on Virtual Machines," 2009, pp. 65-66.
Ismail et al., Architecture of Scalable Backup Service For Private Cloud, IEEE 2013, pp. 174-179.

Jander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal 7.2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE.
Liang, et al., "A virtual disk environment for providing file system recovery", 2006, pp. 589-599.
Lu et al.. "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of 1/0 Intensive Workloads," 2012, pp. 85-96.
Reingold, B. et al., "Cloud Computing: The Intersection of Massive Scalability, Data Security and Privacy (Part I)," LegalWorks, a Thomson Business, Jun. 2009, 5 pages.
Reingold, B. et al., "Cloud Computing: Industry and Government Developments (Part II)," LegalWorks, Sep. 2009, 5 pages.
Reingold, B. et al., "Cloud Computing: Whose Law Governs the Cloud? (Part III)," LegalWorks, Jan.-Feb. 2010, 6 pages.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Apr. 30, 2014, 4 pages.
Sanbarrow.com, "Files Used by a VM," <http://sanbarrow.com/vmx/vmx-files-used-by-a-vm.html>, internet accessed on Apr. 30, 2014, 1 page.
Sanbarrow.com, "Monolithic Versus Split Disks," <http://sanbarrow.com/vmdk/monolithicversusspllit.html>, internet accessed on Jul. 14, 2008, 2 pages.
Somasundaram et al., Information Storage and Management. 2009, pp. 251-281.
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Tudoran, Radu et al., "Adaptive File Management for Scientific Workflows on the Azure Cloud," 2013, pp. 273-281.
Vaghani, "Virtual Machine File System", 2010, pp. 57-70.
VMware, Inc., "VMware Solution Exchange (VSX)" <http://www.vmware.com/appliances/learn/ovf.html>, 2014, 3 pages.
VMware, Inc., "OVF, Open Virtual Machine Format Specification, version 0.9," White Paper, <http://www.vmware.com>, Sep. 7, 2007, 50 pages.

(56) References Cited

OTHER PUBLICATIONS

VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
VMware, Inc., "Using VMware Infrastructure for Backup and Restore," Best Practices, <http://www.vmware.com>, accessed Apr. 30, 2014, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "VMware Consolidated Backup," Product Datasheet, <http://www.vmware.com>, 2009, 2 pages.
VMware, Inc., "VMware Consolidated Backup, Improvements in Version 3.5," Information Guide, <http://www.vmware.com>, accessed Apr. 30, 2014, 11 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, 2008, 2 pages.
VMware, Inc., "VMware OVF Tool," Technical Note, <http://www.vmware.com>, 2007, 4 pages.
VMware, Inc., "VMware Workstation 5.0, Snapshots in a Process Tree," <http://www.vmware.com/support/ws5/doc/ws_preserve_sshot_tree.html>, accessed Apr. 30, 2014, 1 page.
VMware, Inc., "VMware Workstation 5.0, Snapshots in a Linear Process," <http:/www.vmware.com/support/ws5/doc/ws_preserve_sshot_linear.html>, internet accessed on 2014, 1 page.
VMware, Inc., "VMware Workstation 5.5, What Files Make Up a Virtual Machine?" <http://www.vmware.com/support/ws55/doc/ws_learning_files_in_a_vm.html>, 2014, 2 pages.
VMware Storage VMotion—Non-Disruptive Live Migration for Virtual Machine Storage Disk Files. Copyright 2009 VMware, Inc.; 2 pages.
Vrable, et al., "Cumulus: Filesystem Backup to the Cloud", 2009, pp. 1-28.
VSphere Storage vMotion: Storage Management & Virtual Machine Migration. http://www.vmware.com/products /vsphere/features/storage-vmotion Retrieved Aug. 12, 2014; 6 pages.
Wikipedia, "Cloud computing," <http://en.wikipedia.org/wiki/Cloud—computing>, 2009, 11 pages.
Wikipedia, "Cluster (file system)," <http://en.wikipedia.org/wiki/Cluster_%28file_system%29>, Sep. 2, 2008, 1 page.
Wikipedia, "Cylinder-head-sector," <http://en.wikipedia.org/wiki/Cylinder-head-sector>, Jan. 4, 2009, 6 pages.
Wikipedia, "File Allocation Table," <http://en.wikipedia.org/wiki/File_Allocation_Table>, Dec. 3, 2008, 12 pages.
Wikipedia, "Logical Disk Manager," <http://en.wikipedia.org/wiki/Logical_Disk_Manager>, Nov. 16, 2007, 3 pages.
Wikipedia, "Logical vol. Management," <http://en.wikipedia.org/wiki/Logical_volume_management>, Oct. 27, 2008, 3 pages.
Wikipedia, "Storage Area Network," <http://en.wikipedia.org/wiki/Storage_area_network>, Dec. 5, 2008, 5 pages.
Wikipedia, "Virtualization," <http://en.wikipedia.org/wiki/Virtualization>, Apr. 29, 2014, 7 pages.
Wood, et al., "Disaster Recovery as a Cloud Service: Economic Benefits & Deployment Challenges", 2010, pp. 1-7.
Yang, et al., "Toward Reliable Data Delivery for Highly Dynamic Mobile Ad Hoc Networks," 2012, pp. 111-124.
Yang, et al., "TRAP-Array: A Disk Array Architecture Providing Timely Recovery to Any Point-in-time," 2006, pp. 1-12.
Yoshida et al., "Orthros: A High-Reliability Operating System with Transmigration of Processes," 2013, pp. 318-327.
Zhao, et al., "Adaptive Distributed Load Balancing Algorithm based on Live Migration of Virtual Machines in Cloud", 2009, pp. 170-175.
Zhao, et al., Supporting Application-Tailored Grid File System Sessions with WSRF-Based Services, Advanced Computing and Information Systems Laboratory (ACIS), pp. 24-33.
International Search Report and Written Opinion for PCT/US2011/054374, dated May 2, 2012, 7 pages.
International Preliminary Report on Patentability and Written Opinion for PCT/US2011/054374, dated Apr. 2, 2013, 9 pages.
Adjeroh, Donald A., and Kingsley C. Nwosu. "Multimedia database management-requirements and issues." IEEE multimedia 4.3 (1997): pp. 24-33. (Year: 1997).
Bhagwat et al., "Extreme Binning: Scalable, Parallel Deduplication for Chunk-based File Backup", IEEE International Symposium on Modeling, Analysis & Simulation of Computer and Telecommunication Systems, Sep. 2009, pp. 1-9.
Bonvin, Nicolas, Thanasis G. Papaioannou, and Karl Aberer. "Dynamic cost-efficient replication in data clouds." Proceedings of the 1st Workshop on Automated Control for Datacenters and Clouds. 2009.pp.49-56 (Year: 2009).
Diallo, Ousmane, et al. "Distributed database management techniques for wireless sensor networks." IEEE Transactions on Parallel and Distributed Systems 26.2 (2013): pp. 604-620. (Year: 2013).
Fu et al., "Fine Grained Transaction Log for Data Recovery in Database Systems", Third Asia-Pacific Trusted Infrastructure Technologies Conference, IEEE, 2008, pp. 123-131.
Gorton, et al., IEEE Software 32.3 (2014):pp. 78-85. (Year: 2014).
Huff, IBM Technical Disclosure Bulletin, vol. 24, No. 5, Oct. 1981 New York, US, pp. 2404-2406, "Data Set Usage Sequence Number".
Levy et al., "Log-Driven Backups: A Recovery Scheme for Large Memory Database Systems", IEEE 1990, pp. 99-109.
Li et al., "Research on the Backup Mechanism of Oracle Database" International Conference on Environmental Science and Information Application Technology, Jul. 2009, pp. 423-426.
Terry, et al. "Managing update conflicts in Bayou, a weakly connected replicated storage system." ACM SIGOPS Operating Systems Review 29.5 (1995): pp. 172-182. (Year: 1995).
Weil, Sage A., et al. "CRUSH: Controlled, scalable, decentralized placement of replicated data." SC'06: Proceedings of the 2006 ACM/IEEE Conference on Supercomputing. IEEE, 2006. pp.1-12 (Year: 2006).

\* cited by examiner

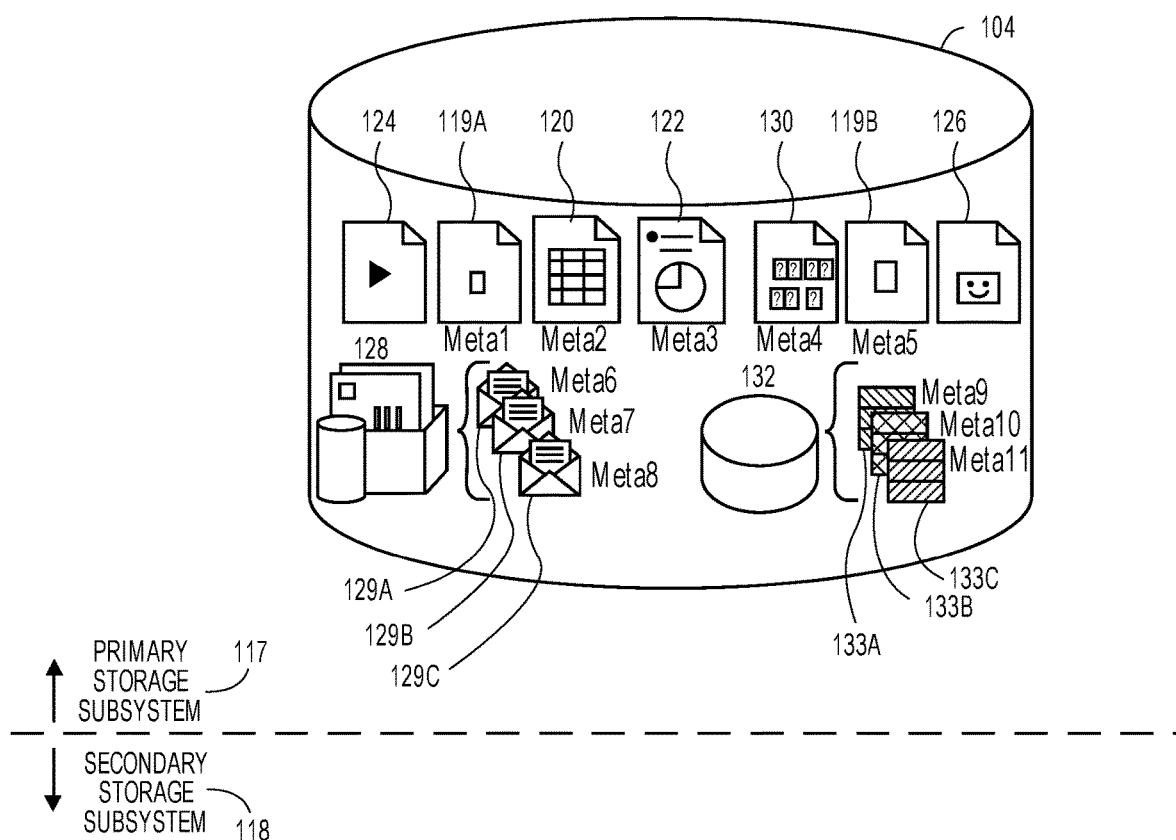
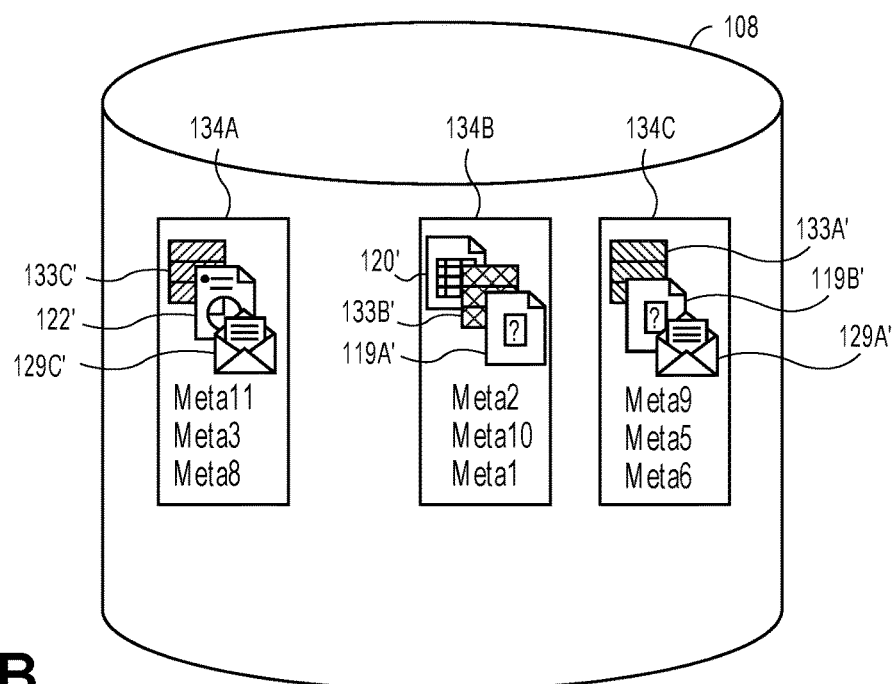
FIG. 1B

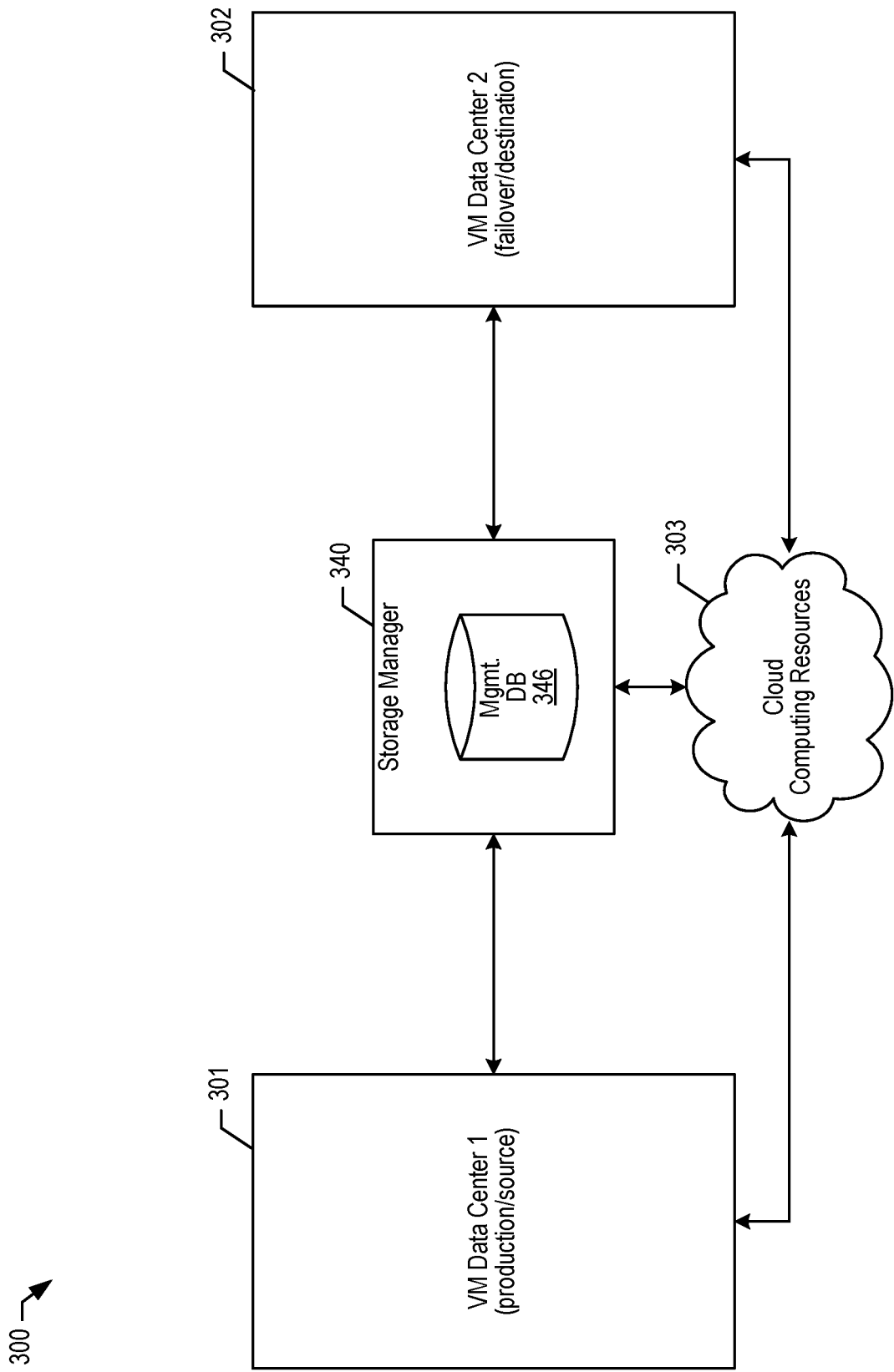
FIG. 3  System 300 For Heartbeat Monitoring Of Virtual Machines And Initiating Failover And/or Failback Operations

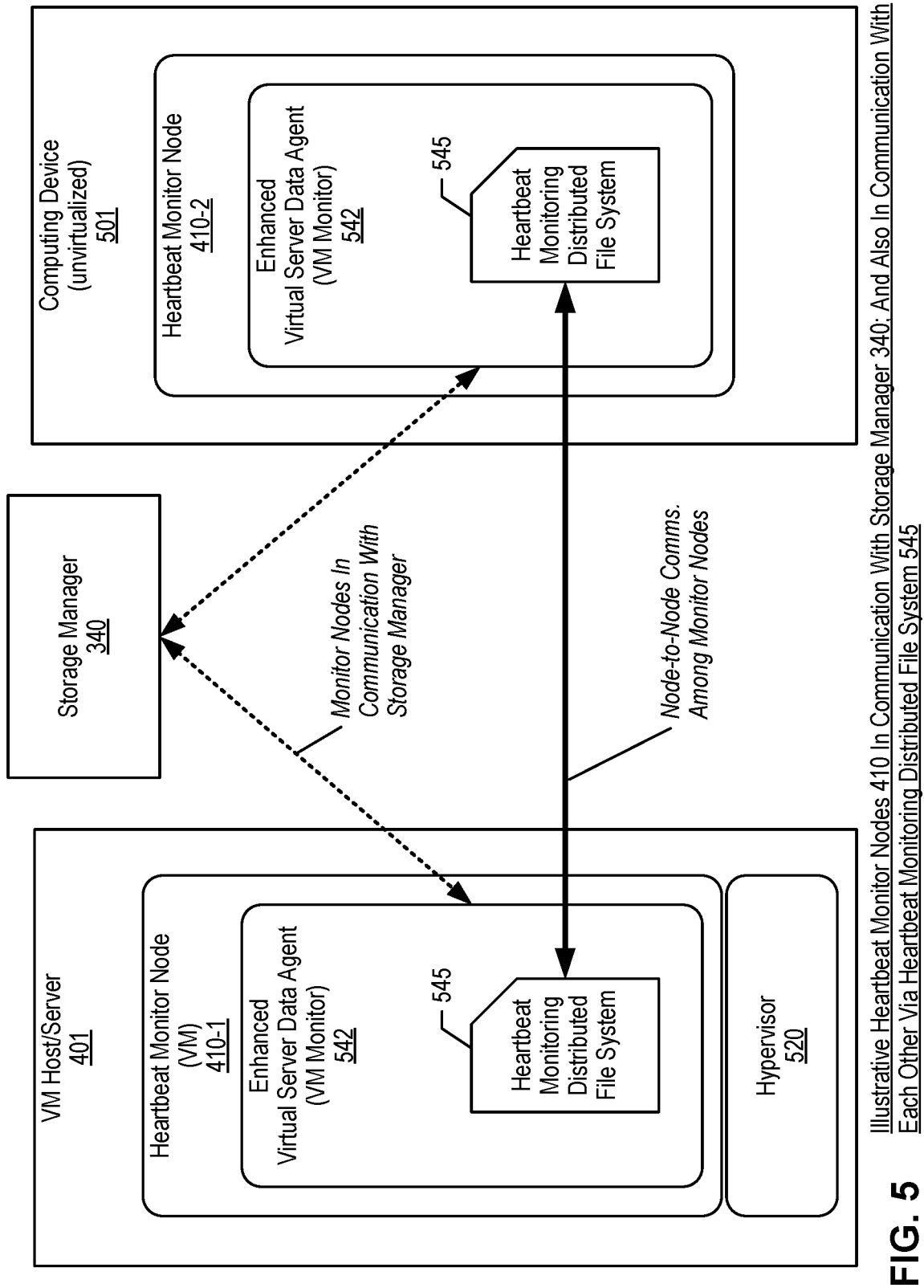
FIG. 5  Illustrative Heartbeat Monitor Nodes 410 In Communication With Storage Manager 340; And Also In Communication With Each Other Via Heartbeat Monitoring Distributed File System 545

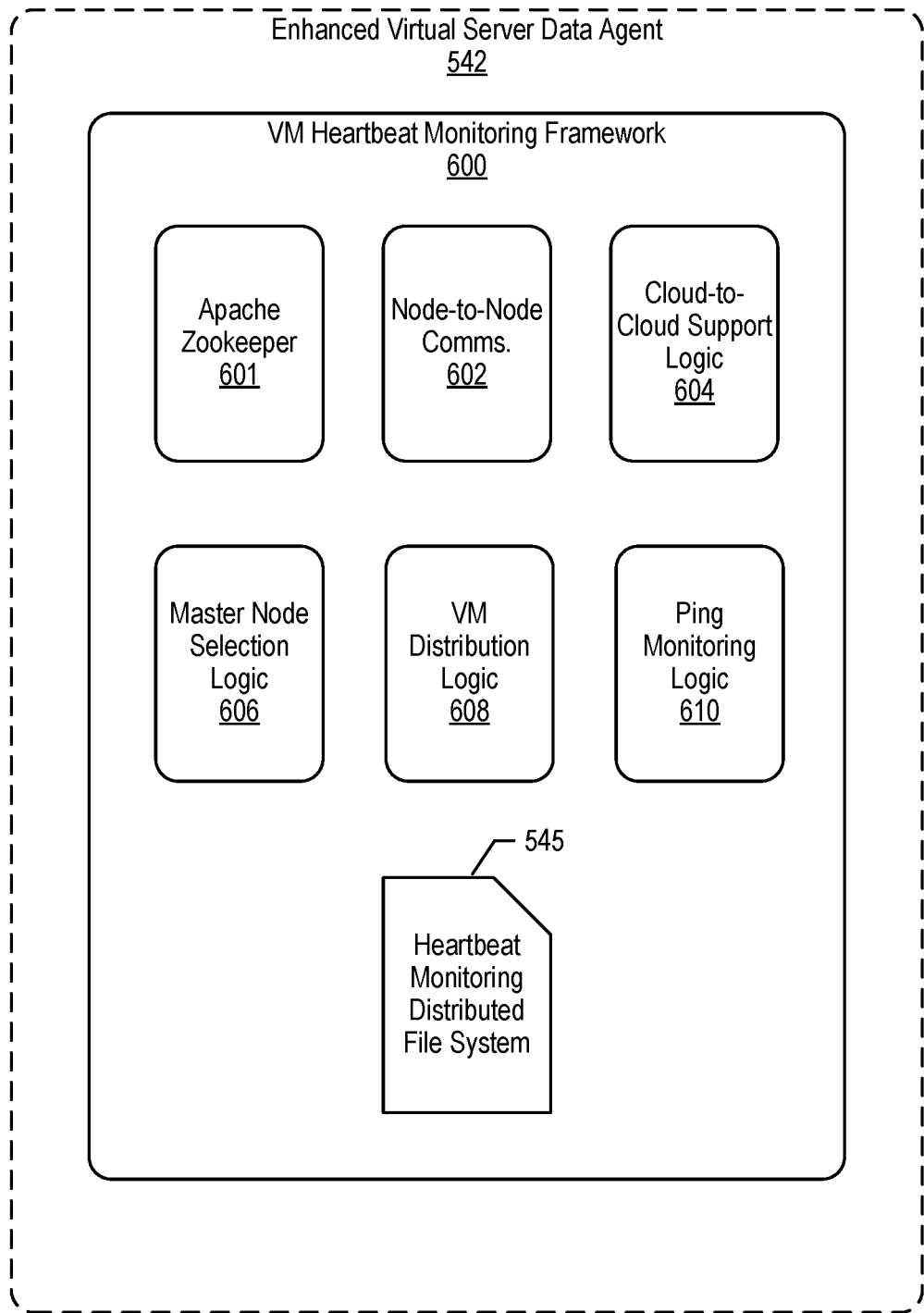
FIG. 6  Illustrative Functional Components And Distributed File System In Enhanced Virtual Server Data Agent Configured As A VM Heartbeat Monitor Node

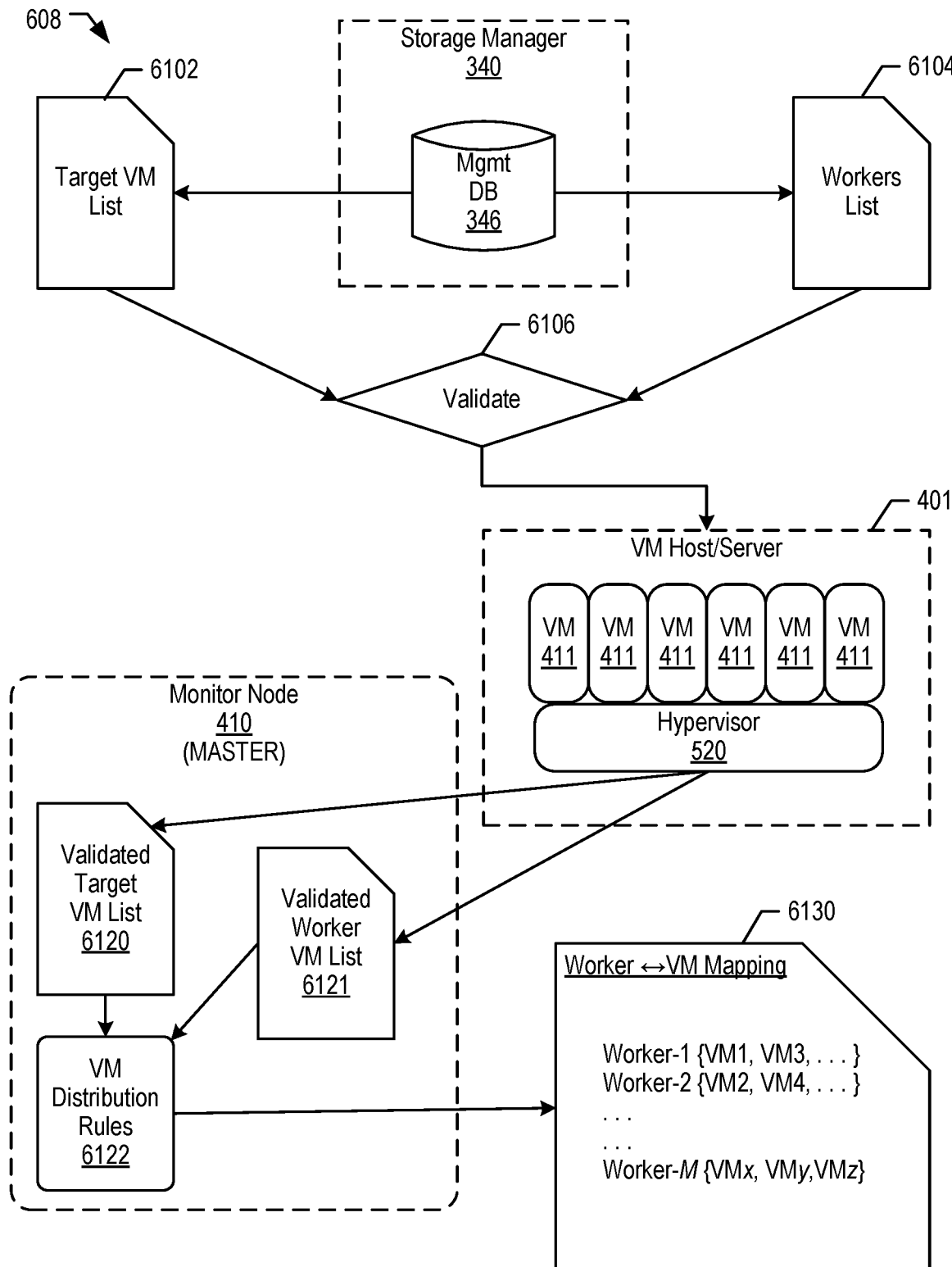
FIG. 6A  Illustrative Logical View Of VM Distribution Logic 608

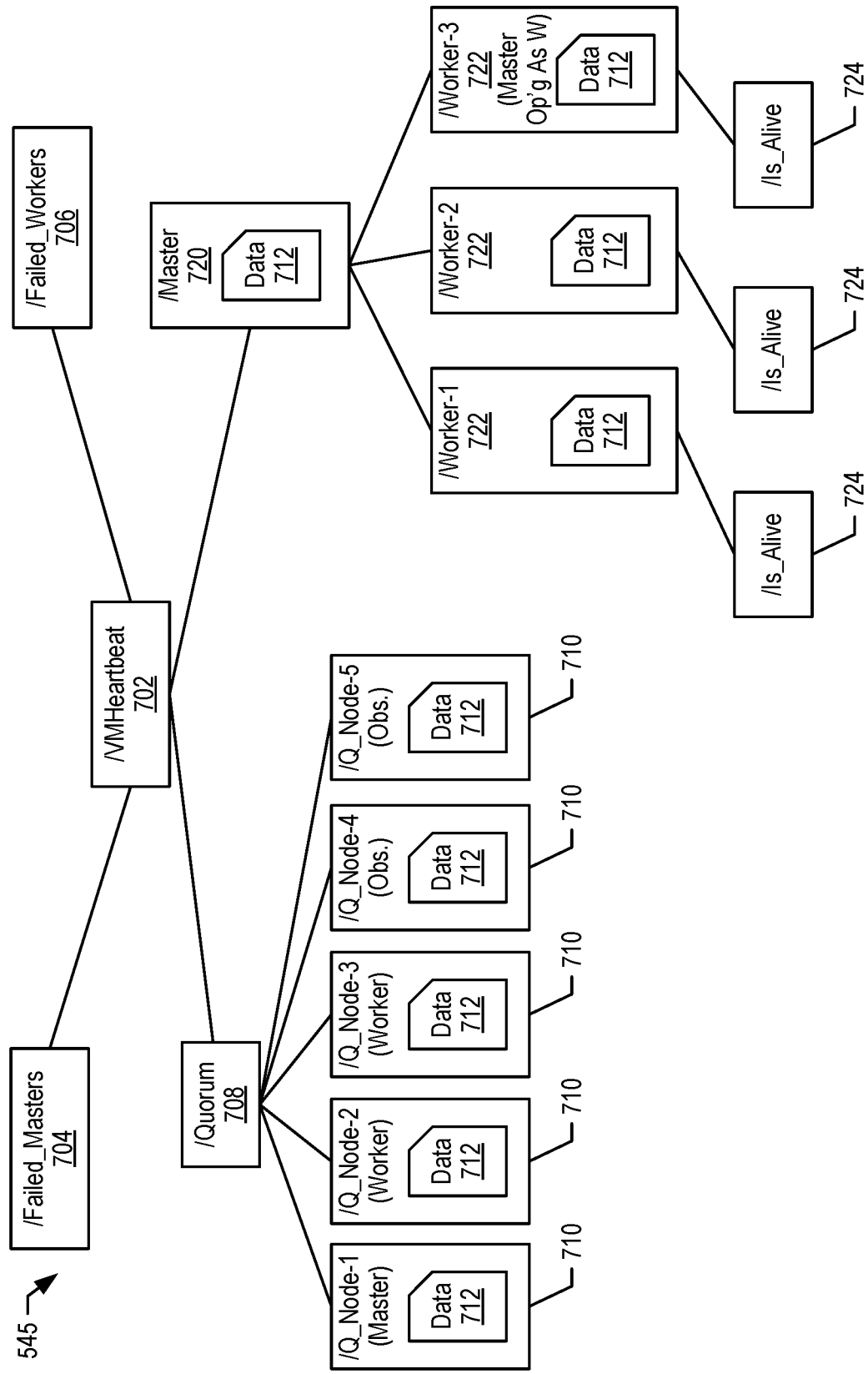
FIG. 7  Illustrative Distributed File System For VM Heartbeat Monitoring

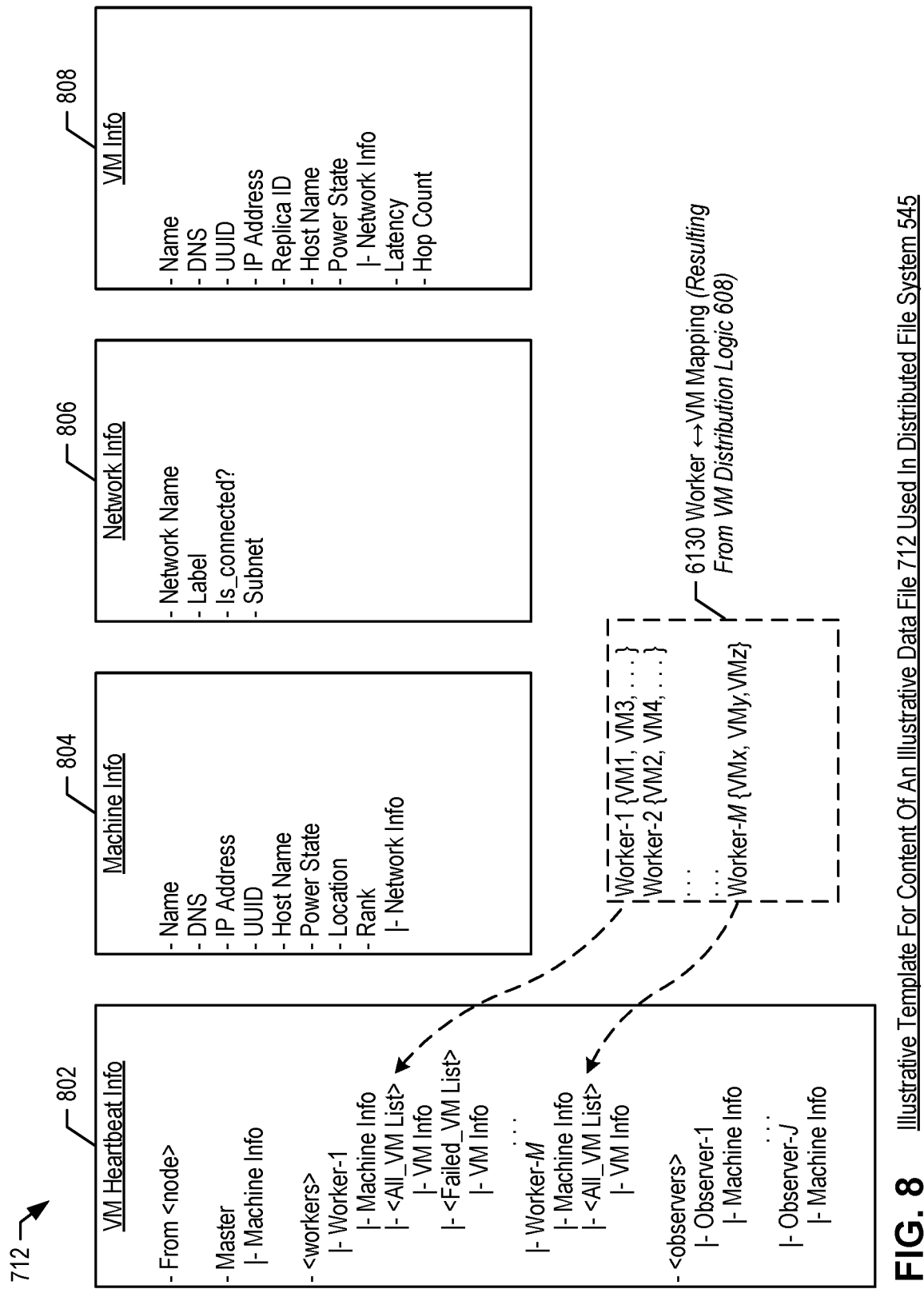
FIG. 8   Illustrative Template For Content Of An Illustrative Data File 712 Used In Distributed File System 545

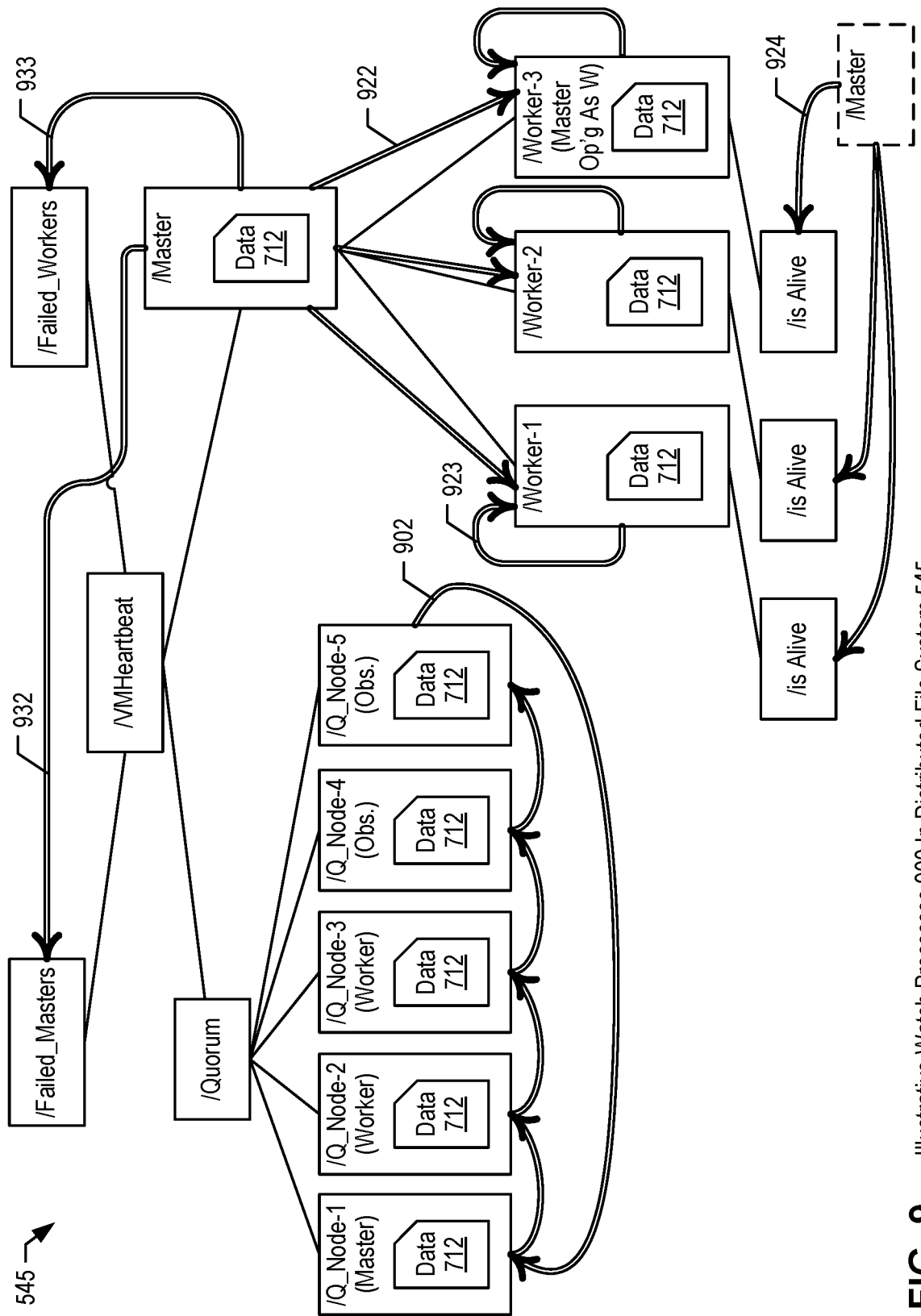
FIG. 9  Illustrative Watch Processes 900 In Distributed File System 545

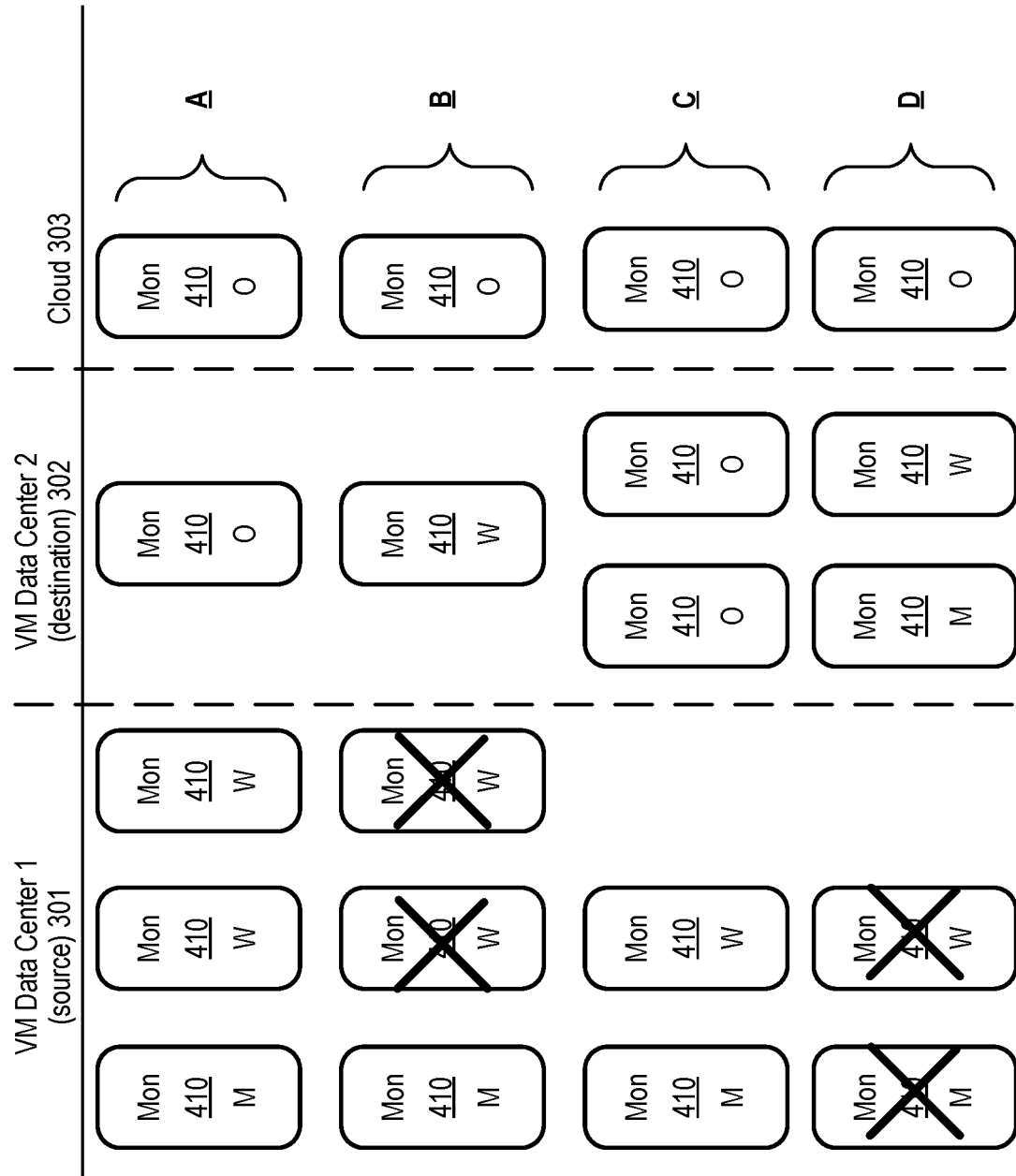
FIG. 10  Illustrative Quorum Arrangements For Heartbeat Monitor Nodes

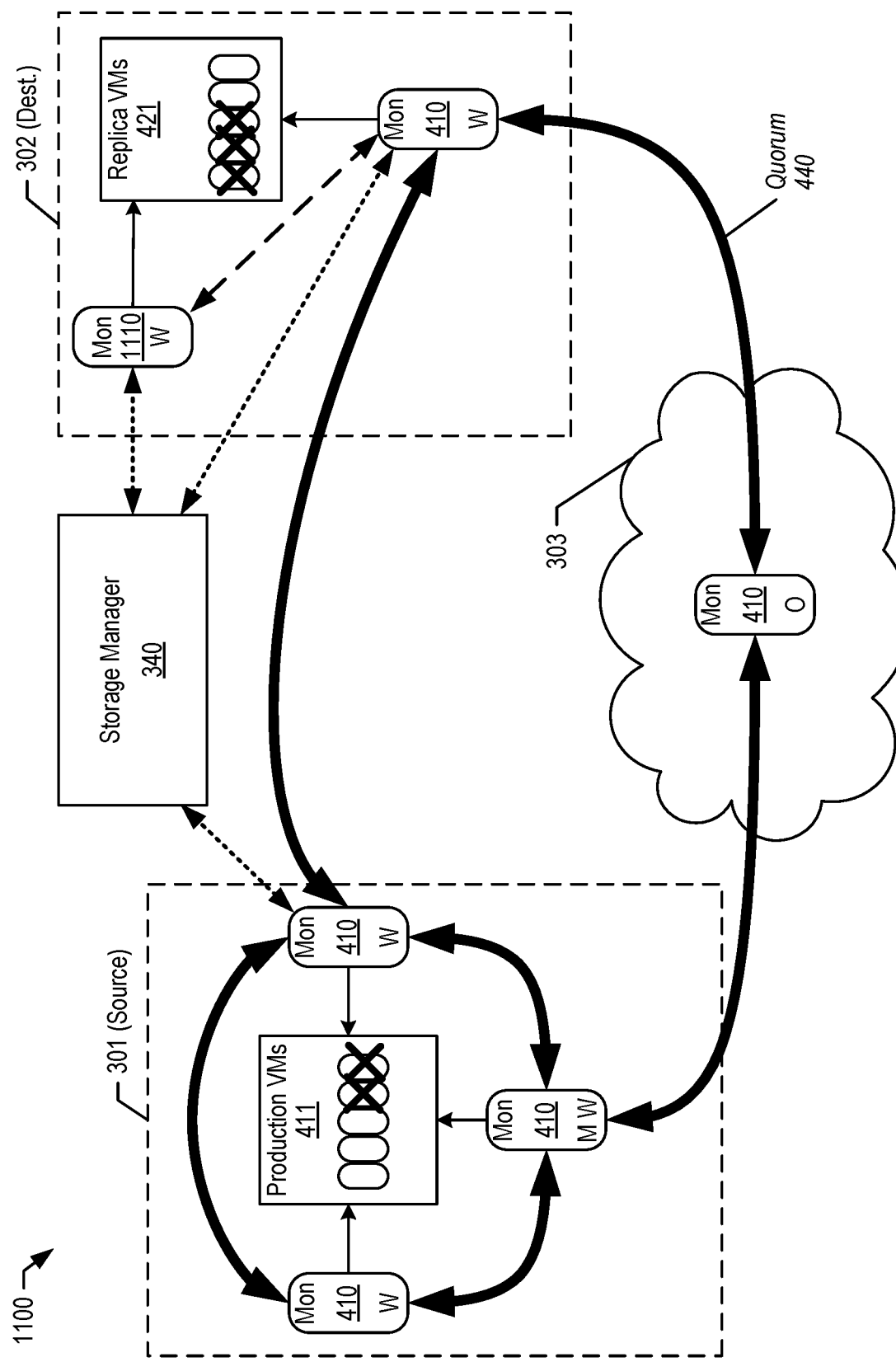
FIG. 11 *Illustrative Failover Of Target VMs To Replica VMs And Another Monitor Node(s) In System 1100*

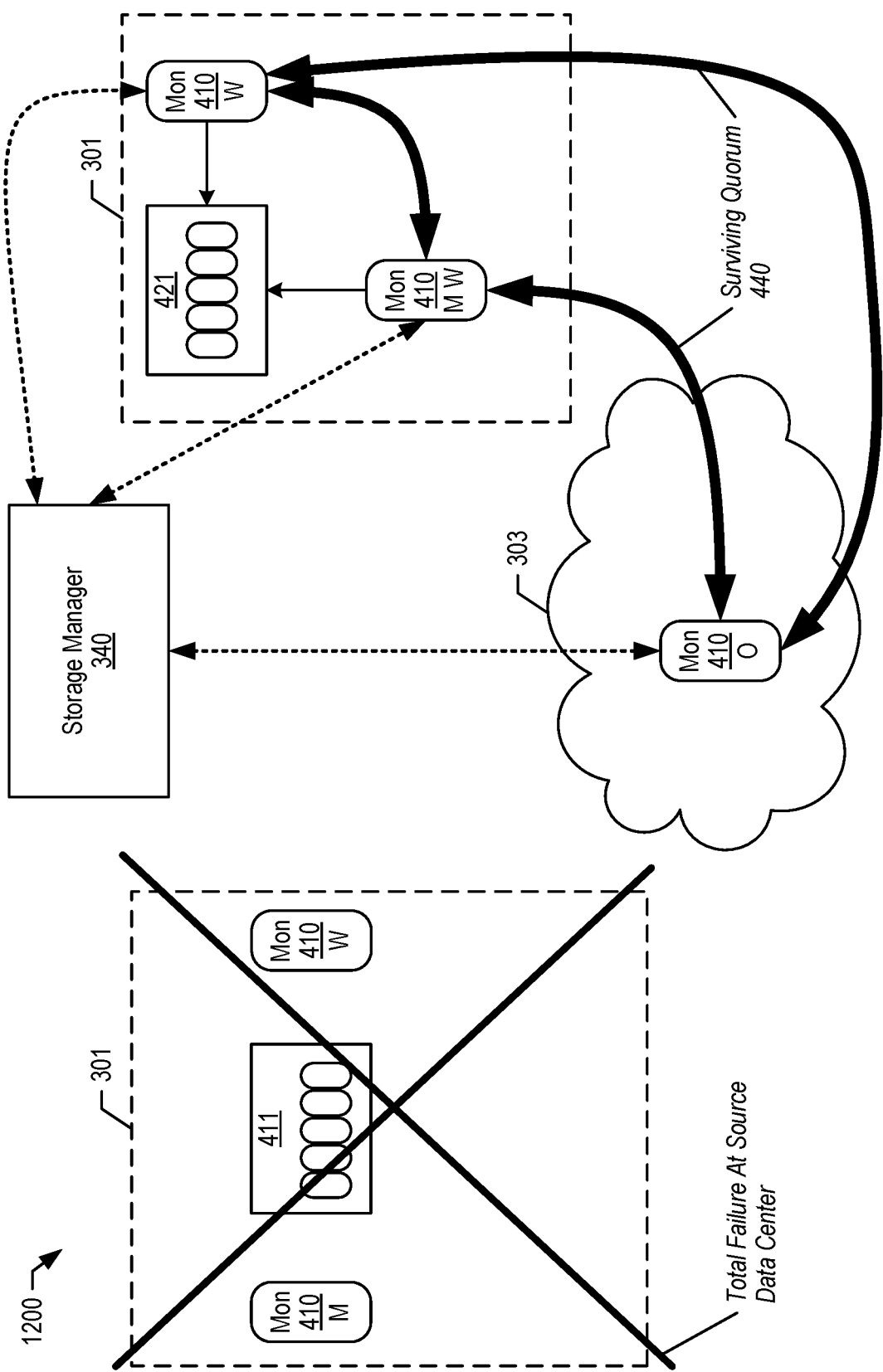
FIG. 12    System 1200 Experiencing Failure Of Entire Source Data Center

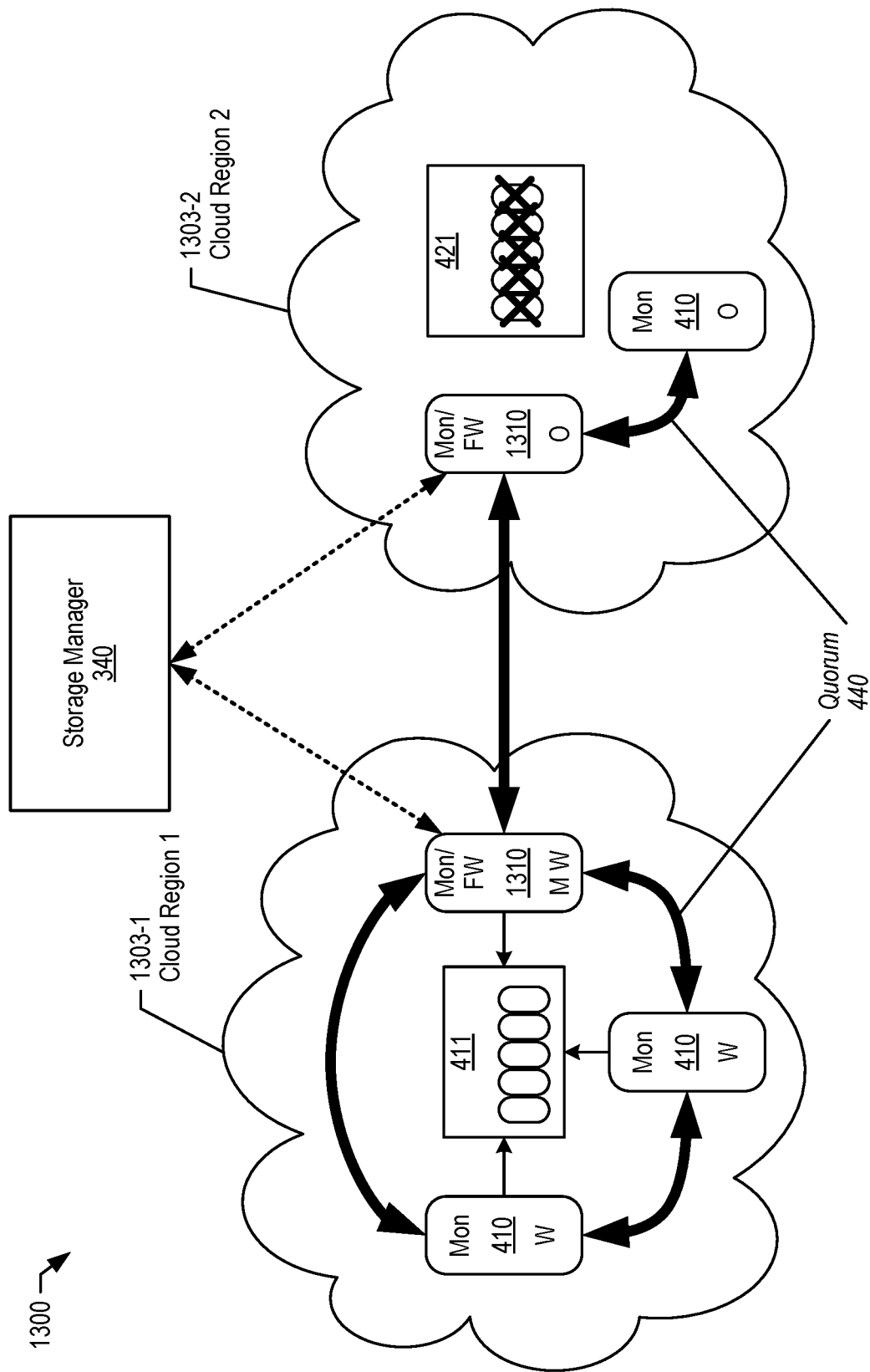
FIG. 13  System 1300 For Heartbeat Monitoring Of VMs For Initiating Cloud-to-Cloud Failover And/or Failback Ops.

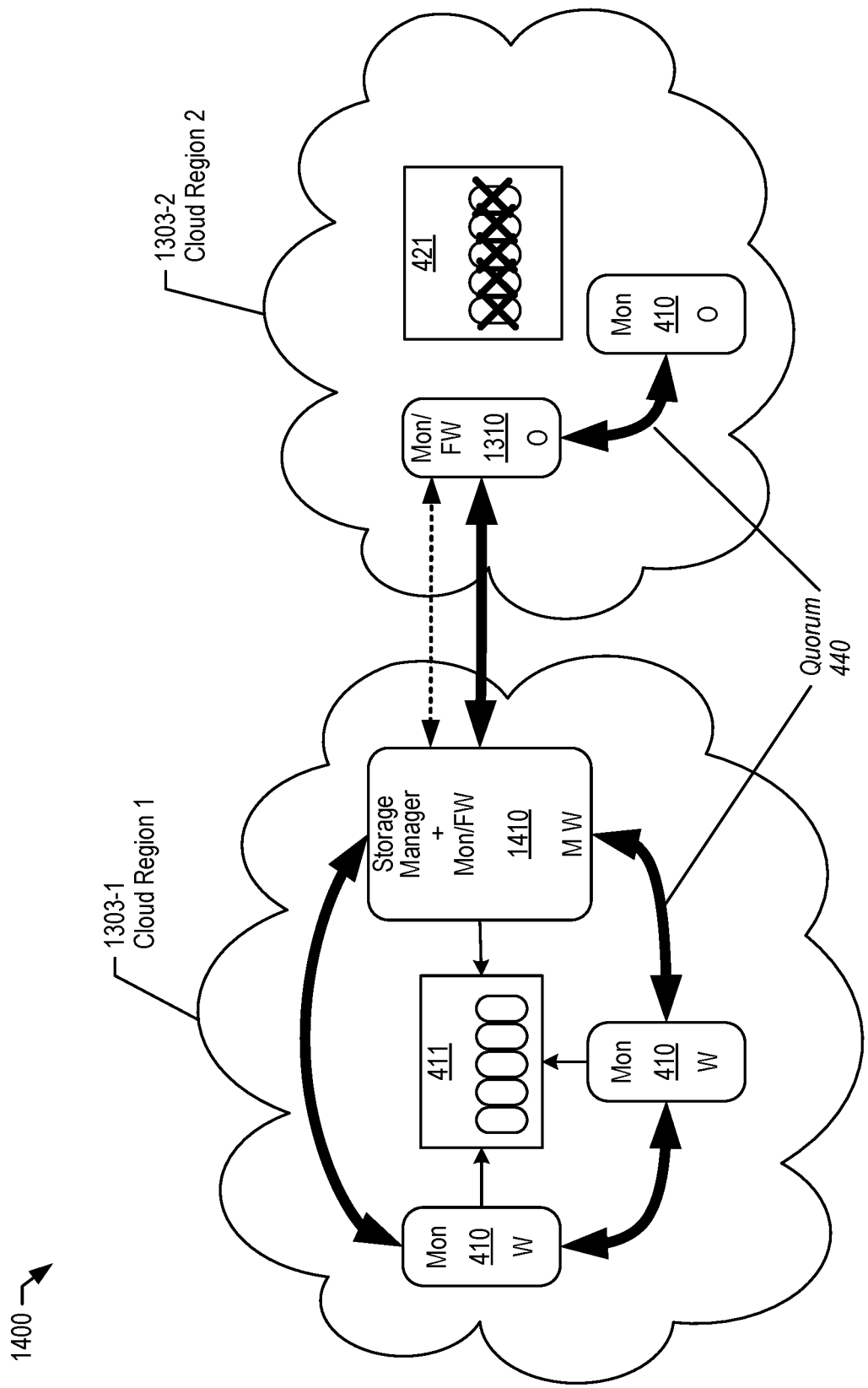
FIG. 14  System 1400 For Heartbeat Monitoring Of VMs For Initiating Cloud-to-Cloud Failover And/or Failback Ops. Using An Integrated Storage-manager-and-heartbeat-monitor-node 1410

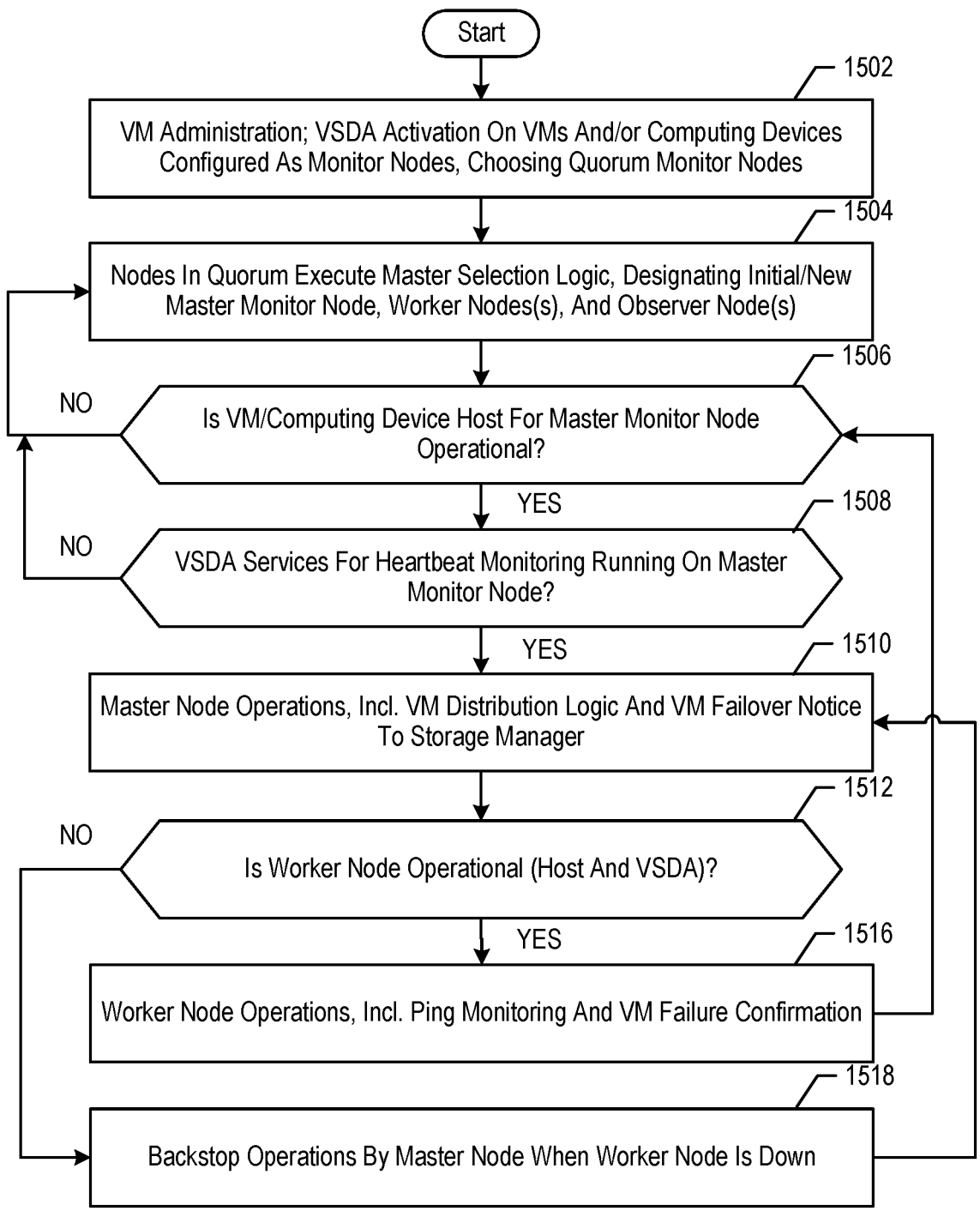
FIG. 15 Illustrative Framework For Performing Virtual Machine (VM) Heartbeat Monitoring In A Data Storage Management System FIG. 18    Illustrative VM Distribution Rules 6122 Applied By VM Distribution Logic 608

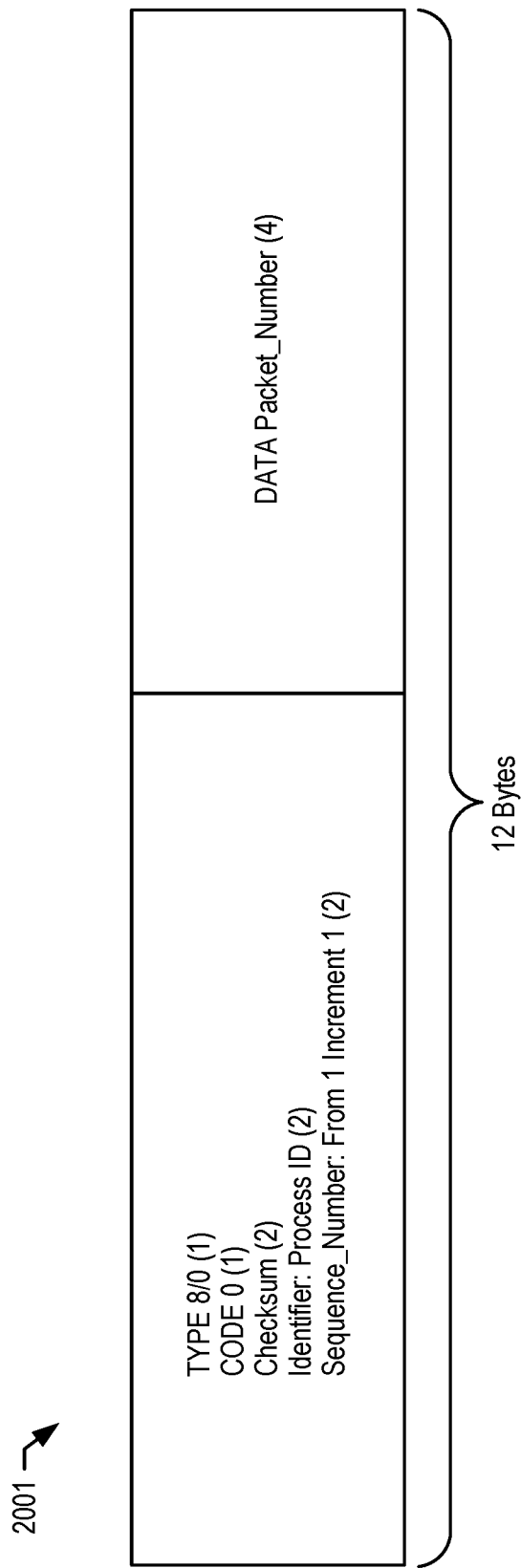
FIG. 20  Illustrative Heartbeat Packet For Pinging A Target VM By A Heartbeat Monitor Node

HEARTBEAT MONITORING OF VIRTUAL MACHINES FOR INITIATING FAILOVER OPERATIONS IN A DATA STORAGE MANAGEMENT SYSTEM, INCLUDING OPERATIONS BY A MASTER MONITOR NODE

INCORPORATION BY REFERENCE TO ANY PRIORITY APPLICATIONS

The present application is a continuation of, and claims priority to, U.S. patent application Ser. No. 15/716,391, filed Sep. 26, 2017 and titled "HEARTBEAT MONITORING OF VIRTUAL MACHINES FOR INITIATING FAILOVER OPERATIONS IN A DATA STORAGE MANAGEMENT SYSTEM, INCLUDING OPERATIONS BY A MASTER MONITOR NODE," which claims priority to U.S. Provisional Patent Application Ser. No. 62/402,269, filed on Sep. 30, 2016 and titled "Heartbeat Monitoring of Virtual Machines for Initiating Failover Operations in a Data Storage Management System;" and to U.S. Provisional Patent Application Ser. No. 62/604,988, filed on Jul. 28, 2017, and titled "Heartbeat Monitoring of Virtual Machines for Initiating Failover and/or Failback Operations in a Data Storage Management System," each of which is hereby incorporated by reference herein in its entirety. Any and all applications for which a foreign or domestic priority claim is identified in the Application Data Sheet of the present application are hereby incorporated by reference in their entireties herein under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

The popularity of virtual machines (VMs) in today's data centers tends to make them more important. VM failures need to be quickly discovered, so that standby or backup VM(s) can take over promptly.

SUMMARY

The present inventors devised systems and methods for monitoring virtual machines (VMs) within the umbrella of a data storage management system. Certain VMs are specially targeted for ongoing heartbeat monitoring. Failed target VMs are called for failover to corresponding pre-configured replica VMs. The ongoing heartbeat monitoring is performed by heartbeat monitor nodes executing in other VMs and/or on nonvirtualized computing devices—the so-called "worker monitor nodes" ("worker nodes" or "worker heartbeat monitor nodes"). The worker heartbeat monitor nodes are part of a larger "VM heartbeat monitoring network" or "VM heartbeat monitoring system" that also comprises a "master monitor node" and one or more "observer monitor nodes" which play key roles in maintaining a robust architecture, which features built-in coordination and redundancy. To increase robustness, observer nodes are also configured in cloud-based computing resources.

Upon detecting a target-VM failure and confirming the failure with the VM's host server and/or VM data center controller to ensure that the VM is really in a failed state that requires failover, the illustrative worker monitor node notifies the master monitor node, which in turn carries out its responsibility for notifying a storage manager of this and any other failed VMs in the system. The storage manager not only invokes and manages failover operations for the failed target VM(s) after receiving proper notice from the master monitor node, but also manages other storage management operations throughout the data storage management system, such as backups, replication, archiving, content indexing, restores, etc. Likewise, the storage manager manages failback operations from a site that was previously considered to be a failover destination back to the former source site, e.g., after the source data center recovers, after a failed over VM recovers, etc.

The illustrative VM heartbeat monitoring system comprises an illustrative ping monitoring logic that worker monitor nodes use for determining whether their target VMs are operational. To optimize operational efficiency, a master monitor node can be configured to also operate as a worker monitor node, thus performing a dual role. To further optimize operational efficiency, the VMs targeted for heartbeat monitoring are assigned (distributed) to available worker nodes based on an illustrative VM distribution logic that favors monitor nodes which are "close to" the target VMs from a network topology perspective, e.g., same-network, same-server, low hop count, low round-trip latency, etc. To further optimize operational efficiency, the illustrative master monitor node selection logic also favors "closeness" to the main locus of monitoring action, e.g., the source data center where most, if not all, target VMs operate. The master monitor executes the illustrative VM distribution logic and informs worker monitor nodes of their respective target VM lists. The master monitor node re-distributes target VMs when a worker monitor node fails.

The illustrative architecture supports a variety of source and destination data centers. One illustrative configuration includes (i) a source data center, where the target VMs, master monitor node, and worker monitor node operate; (ii) a destination data center where VMs are replicated in case of a failover; (iii) one or more cloud-based observer monitor nodes that are meant to survive any catastrophic failures at the source and to help the VM heartbeat monitoring network transition to the failover destination; and (iv) a storage manager. A second illustrative configuration includes (i) a source data center configured in a first region of a service provider's "public cloud"; (ii) a destination data center configured in a second region of the service provider's "public cloud"; and (iii) a storage manager. The second illustrative configuration comprises specialized cloud-to-cloud support logic that tunnels communications to and from the storage manager through a firewalled master monitor node and also opens ports on certain heartbeat monitor nodes for master node failover scenarios. A third illustrative configuration optimizes operational efficiency by integrating the storage manager into the firewalled master monitor node so that communications pathways are reduced and network topology is simplified. These illustrative configurations can be combined without limitation according to the architecture described herein.

Some of the monitor nodes are specially configured to be members of a so-called quorum arrangement, e.g., master monitor node, worker monitor node(s), cloud-based observer node(s), and destination-based observer node(s). The quorum will survive failure of a minority of its members, thus enabling observer(s) at the destination to be promoted to worker node(s) and/or further enabling a new master node to emerge in case the present master monitor fails. Not every heartbeat monitor node in the illustrative systems need be a quorum member as the quorum should be configured with a view to long-term survivability rather than load-balancing of target VM monitoring; accordingly worker monitor nodes can perform heartbeat monitoring of target VMs without participating in quorum operations.

On failover from source to destination, replica VMs are activated to take the place of the corresponding target VMs that failed at the source. Accordingly, one or more observer monitors at the destination are re-configured into worker monitor nodes for heartbeat monitoring of the newly activated target VMs at the destination, thus necessitating that VM distribution logic be executed anew. To do so, it may be necessary to elect a new master monitor node, if the existing master has failed.

The heartbeat monitor nodes communicate with each other by updating certain specially-configured data files that reside within a distributed file system having an instance on each heartbeat monitor node. The illustrative data files are specially configured to comprise information needed for managing heartbeat monitoring and for communicating information among monitor nodes, e.g., each worker node's current list of target VMs, indications of failed target VMs, network and addressing information for the target VMs, etc. The updated data files are promulgated to all heartbeat monitor nodes by the distributed file system. Thanks to so-called "watch" processes, changes received in the updated data files are detected by each heartbeat monitor node, thus serving as a way of communicating information among heartbeat monitor nodes. Specially configured watch processes detect whether quorum member nodes have failed, whether any worker monitor nodes have failed, as well as detecting other important changes in the system.

The mutually coordinating infrastructure implemented among the illustrative heartbeat monitor nodes is based on but is not identical to the ZooKeeper service devised by the Apache Software Foundation. Thus, each illustrative heartbeat monitor node comprises an Apache ZooKeeper services, which is well known in the art and which enables highly reliable distributed coordination among a plurality of nodes. For example, the illustrative heartbeat monitoring distributed file system is coordinated and synchronized by underlying Apache ZooKeeper infrastructure. Illustratively, monitor nodes that are designated to be quorum members run ZooKeeper server and client services; on the other hand, monitor nodes that are designated to be workers but not quorum members need only run ZooKeeper client services, though the invention is not so limited. The data files' contents for node-to-node communications and the distributed file system organization are proprietary to the illustrative embodiments, while Apache ZooKeeper handles coordination of the distributed file system across monitor nodes. Thus, the illustrative architecture for VM heartbeat monitoring takes advantage of underlying Apache ZooKeeper utilities to coordinate and communicate information across heartbeat monitor nodes.

However, the illustrative architecture departs from the teachings of Apache ZooKeeper in regard to the organization and content of the distributed file system, watch process configurations, ping monitoring logic and associated ping packet design, VM distribution logic/rules, master node selection process, cloud-to-cloud support logic, node-to-node communications protocol using data files with specialized content for VM heartbeat monitoring, and administration/communication features to/from the storage manager and its management database. These heartbeat monitoring functional components as well as the underlying Apache ZooKeeper infrastructure are illustratively implemented in an enhanced data agent. The illustrative enhanced virtual server data agent also comprises features for performing other VM storage management operations though the invention is not so limited. In alternative embodiments, these functional components are separately deployed or combined with other data agents and/or media agents without limitation. Although certain ZooKeeper features and services are used for some of the underlying infrastructure of the illustrative heartbeat monitoring network, the invention is not so limited and numerous alternative implementations can be contemplated by someone having ordinary skill in the art after reading the present disclosure. Furthermore, the present invention is not limited to relying on the ZooKeeper features described herein, as will become clear to those having ordinary skill in the art after reading the present disclosure.

Depending on the nature of the storage management operations that kept track of and protected the now-failed VM, e.g., replication, live synchronization, etc., a suitable recovery operation is invoked by the storage manager for restoring a VM to an operational state at the destination data center to effectuate the failover. For failback operations, the reverse occurs, i.e., failback from destination to source. Thus, the heartbeat monitor network detects VM failures through VM heartbeat monitoring performed by monitor nodes and the storage manager takes over and manages the recovery process by initiating appropriate failover and/or failback operations.

BRIEF DESCRIPTION OF THE DRAWINGS

FIG. 1B is a detailed view of a primary storage device, a secondary storage device, and some examples of primary data and secondary copy data.

FIG. 3 is a block diagram illustrating some salient portions of a system 300 for heartbeat monitoring of virtual machines for initiating failover and/or failback operations, according to an illustrative embodiment of the present invention.

FIG. 5 is a block diagram illustrating heartbeat monitor nodes 410 in communication with storage manager 340; and also in communication with each other via heartbeat monitoring distributed file system 545.

FIG. 6 is a block diagram illustrating certain functional components and a distributed file system that are configured in an illustrative enhanced virtual server data agent which is configured as a heartbeat monitor node.

FIG. 6A is a block diagram illustrating a logical view of VM distribution logic 608.

FIG. 7 depicts an illustrative distributed file system 545 for VM heartbeat monitoring in system 300.

FIG. 8 depicts a template for content of an illustrative data file 712 used in illustrative distributed file system 545.

FIG. 9 depicts illustrative watch processes in heartbeat monitoring distributed file system 545 of system 300.

FIG. 10 depicts illustrative quorum 440 arrangements for heartbeat monitor nodes.

FIG. 11 is a block diagram illustrating failover of target VMs to replica VMs in system 1100.

FIG. 12 is a block diagram illustrating a system 1200 experiencing failure of the entire source data center, according to an illustrative embodiment of the present invention.

FIG. 13 is a block diagram illustrating a system 1300 for heartbeat monitoring of virtual machines for initiating cloud-to-cloud failover and/or failback operations, according to an illustrative embodiment of the present invention.

FIG. 14 is a block diagram illustrating a system 1400 for heartbeat monitoring of VMs for initiating cloud-to-cloud failover and/or failback operations using an integrated storage manager and heartbeat monitor node 1410, according to an illustrative embodiment of the present invention.

FIG. 15 is a flow chart illustrating a method 1500 for performing virtual machine heartbeat monitoring in a data storage management system, according to an illustrative embodiment of the present invention.

FIG. 20 is a block diagram depicting an illustrative heartbeat packet 2001 for pinging a target VM by a heartbeat monitor node designated as a worker node, e.g., 410, 1110, 1310, 1410.

DETAILED DESCRIPTION

Detailed descriptions and examples of systems and methods according to one or more illustrative embodiments of the present invention may be found in the section entitled HEARTBEAT MONITORING OF VIRTUAL MACHINES FOR INITIATING FAILOVER AND/OR FAILBACK OPERATIONS IN A DATA STORAGE MANAGEMENT SYSTEM, as well as in the section entitled Example Embodiments, and also in FIGS. 3-21 herein. Furthermore, components and functionality for VM heartbeat monitoring may be configured and/or incorporated into information management systems such as those described herein in FIGS. 1A-1H and 2A-2C.

Various embodiments described herein are intimately tied to, enabled by, and would not exist except for, computer technology. For example, VM heartbeat monitoring described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
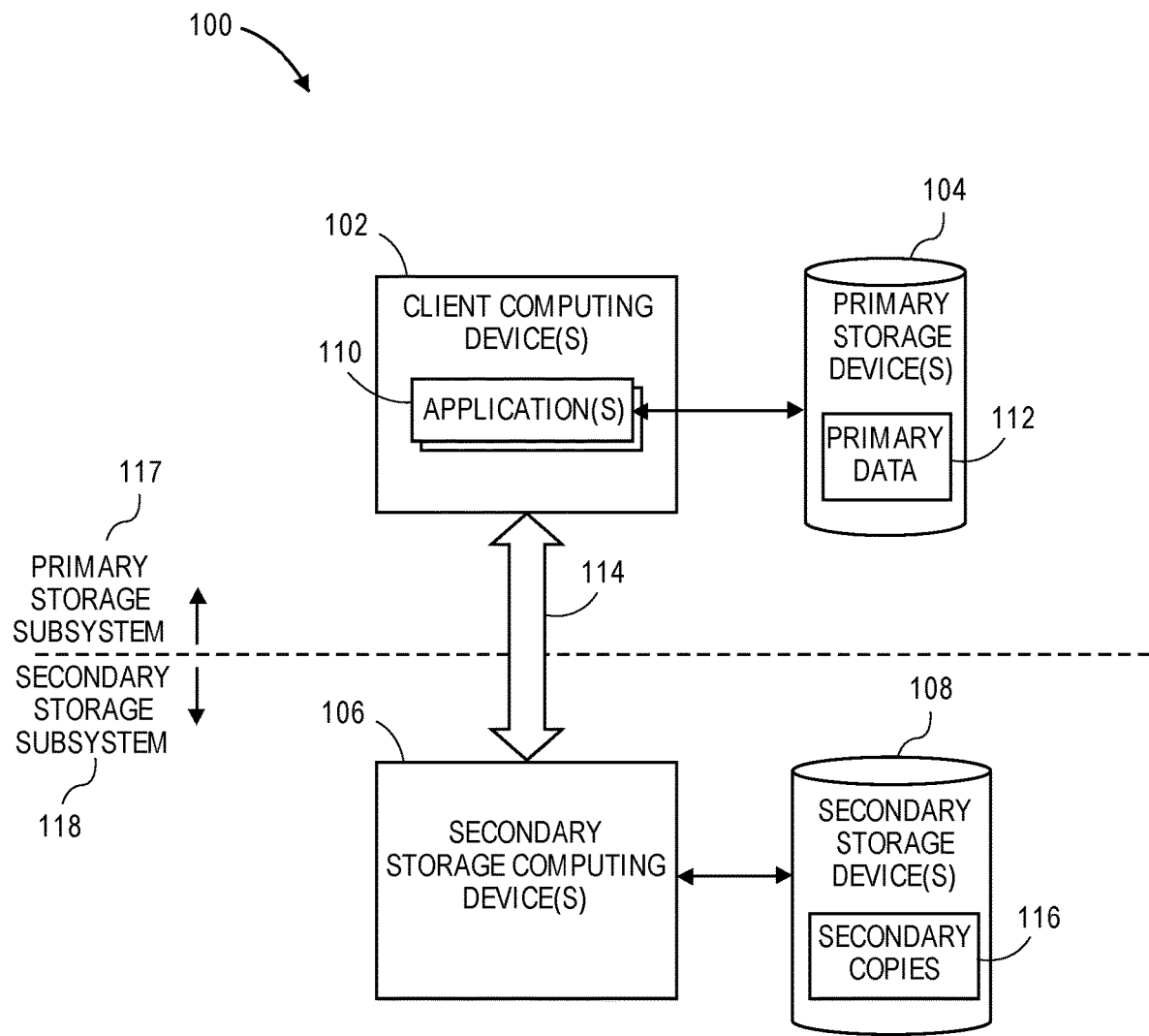
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. Pub. No. 2006/0224846, entitled "System and Method to Support Single Instance Storage Operations";
- U.S. Pat. Pub. No. 2014/0201170, entitled "High Availability Distributed Deduplicated Storage System";
- U.S. patent application Ser. No. 14/721,971, entitled "Replication Using Deduplicated Secondary Copy Data";
- U.S. Patent Application No. 62/265,339 entitled "Live Synchronization and Management of Virtual Machines across Computing and Virtualization Platforms and Using Live Synchronization to Support Disaster Recovery";
- U.S. Patent Application No. 62/273,286 entitled "Redundant and Robust Distributed Deduplication Data Storage System";
- U.S. Patent Application No. 62/294,920, entitled "Data Protection Operations Based on Network Path Information";
- U.S. Patent Application No. 62/297,057, entitled "Data Restoration Operations Based on Network Path Information"; and
- U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
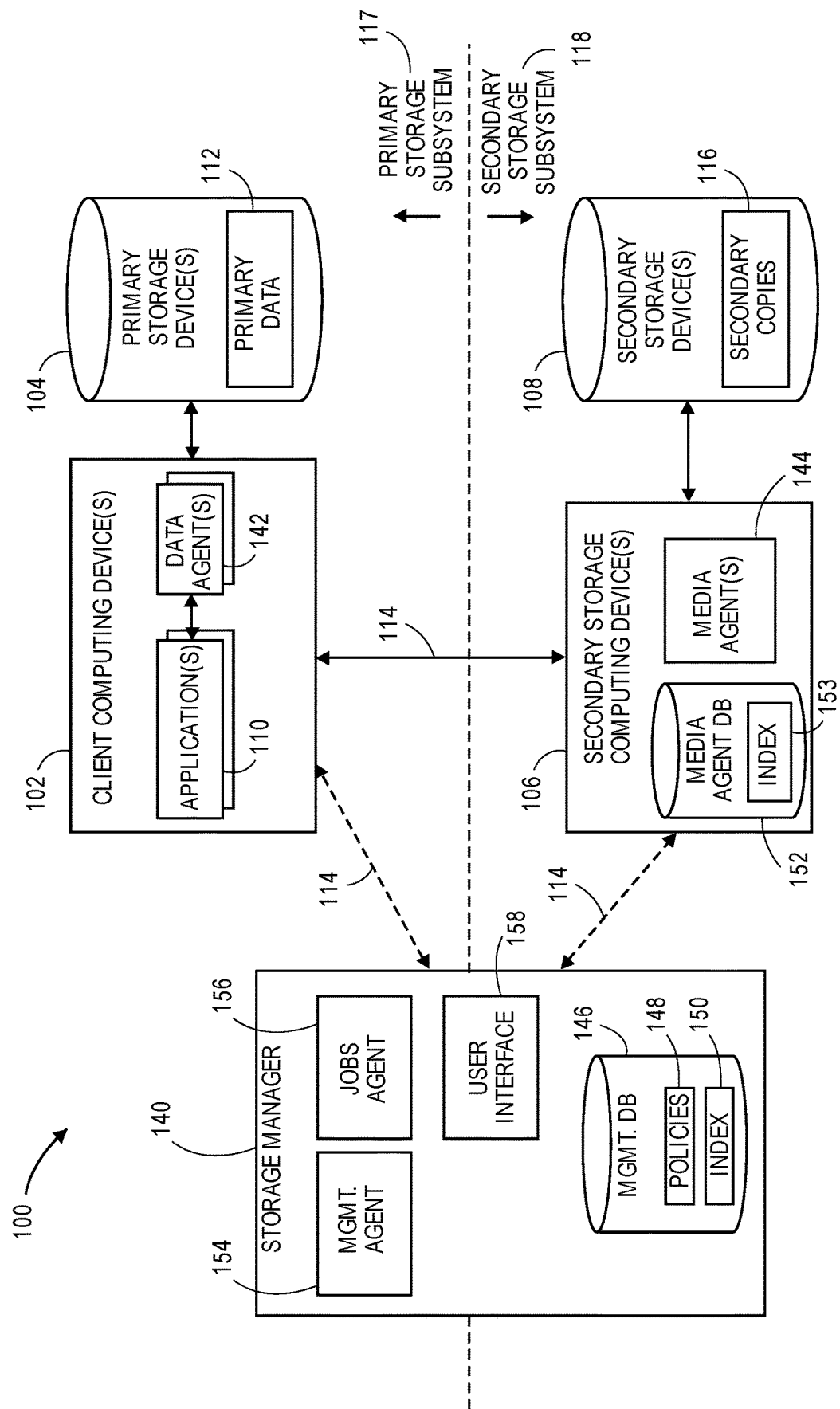
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta11, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information management that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
  communicating with data agents 142 and media agents 144, including transmitting instructions, messages, and/or queries, as well as receiving status reports, index information, messages, and/or queries, and responding to same;
  initiating execution of information management operations;
  initiating restore and recovery operations;
  managing secondary storage devices 108 and inventory/capacity of the same;
  allocating secondary storage devices 108 for secondary copy operations;
  reporting, searching, and/or classification of data in system 100;
  monitoring completion of and status reporting related to information management operations and jobs;
  tracking movement of data within system 100;
  tracking age information relating to secondary copies 116, secondary storage devices 108, comparing the age information against retention guidelines, and initiating data pruning when appropriate;
  tracking logical associations between components in system 100;
  protecting metadata associated with system 100, e.g., in management database 146;
  implementing job management, schedule management, event management, alert management, reporting, job history maintenance, user security management, disaster recovery management, and/or user interfacing for system administrators and/or end users of system 100;
  sending, searching, and/or viewing of log files; and
  implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
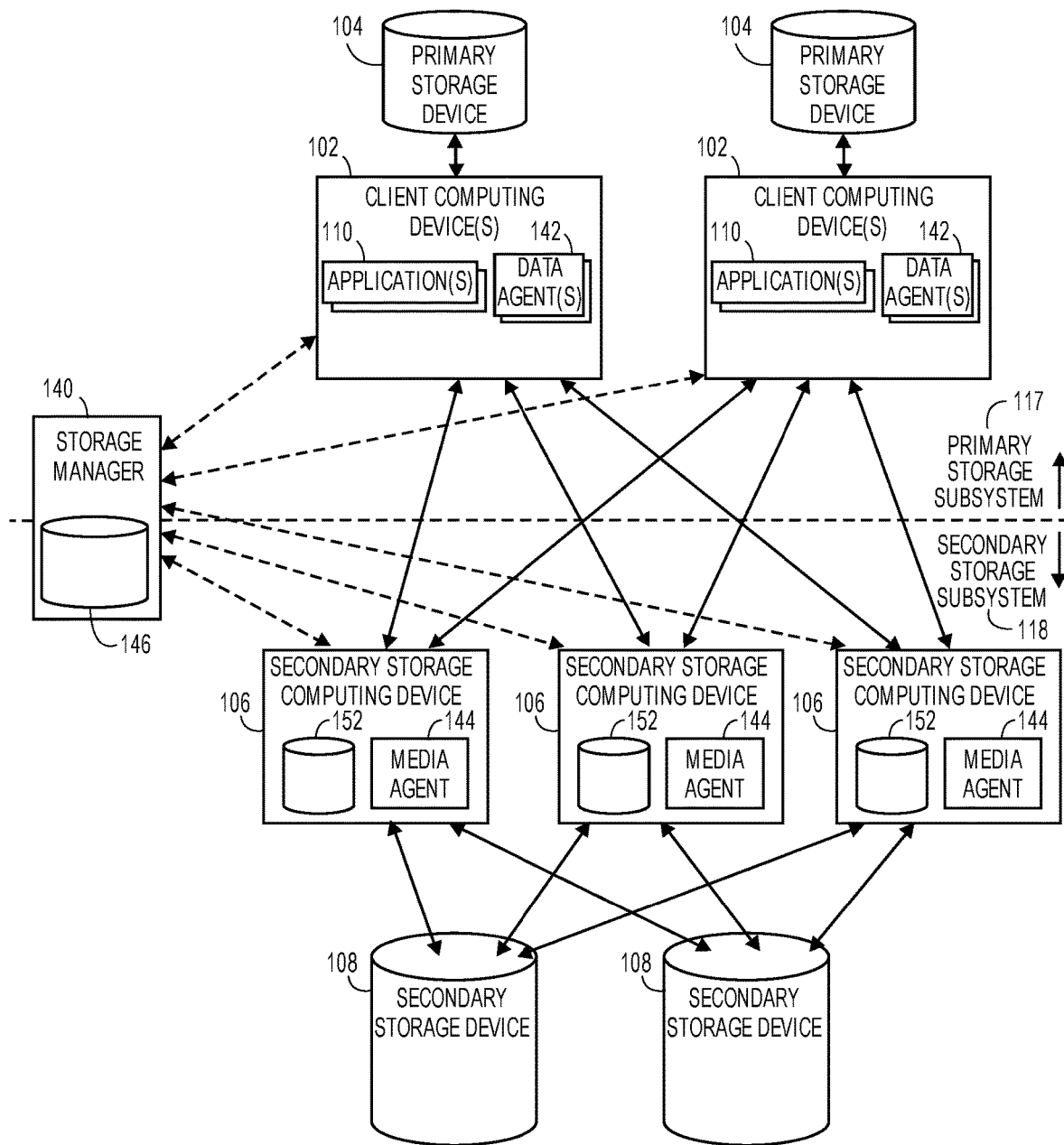
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and makes recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
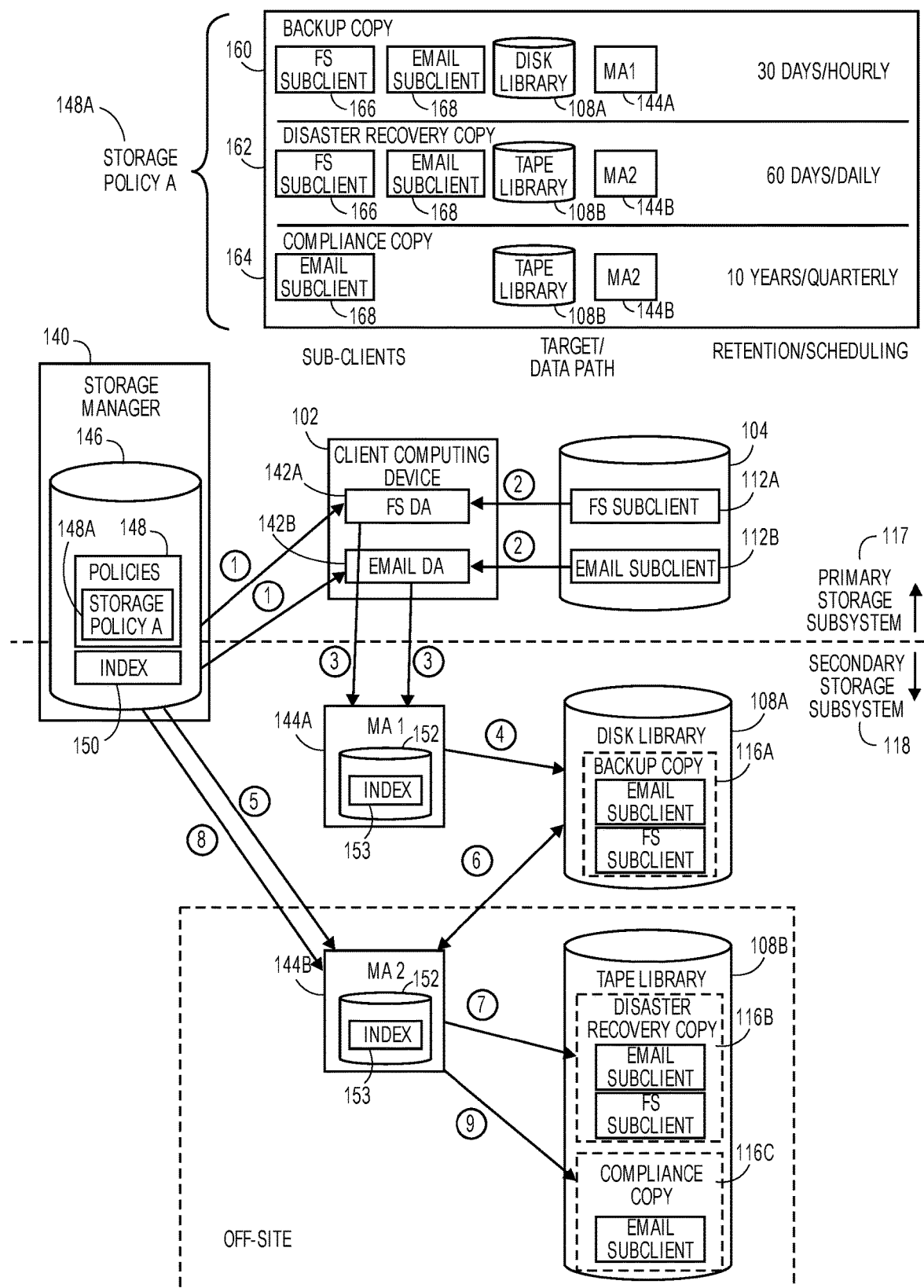
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
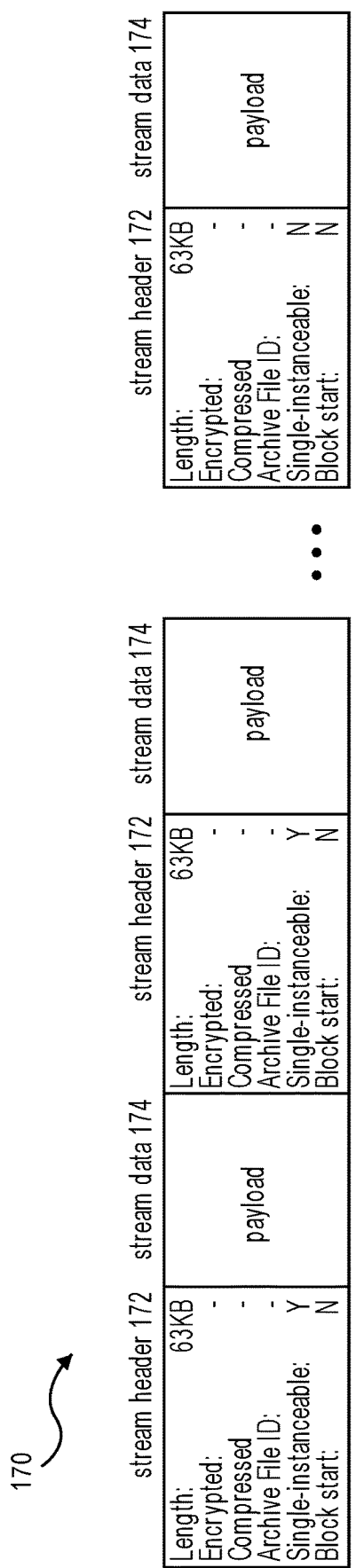
FIGS. 1F-1H are block diagrams illustrating suitable data structures that may be employed by the information management system.
Figure 1G:
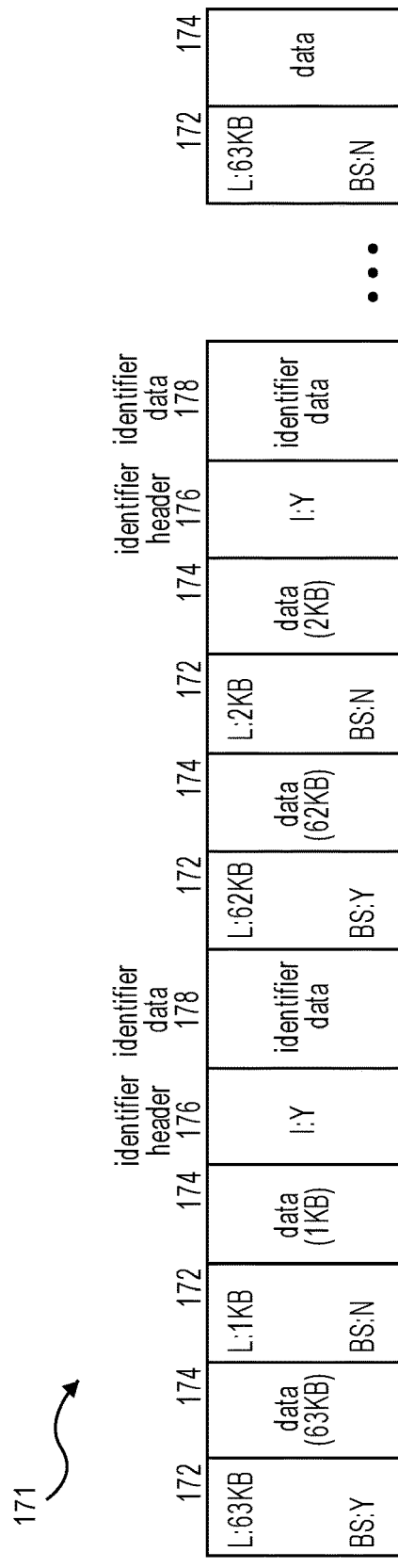

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
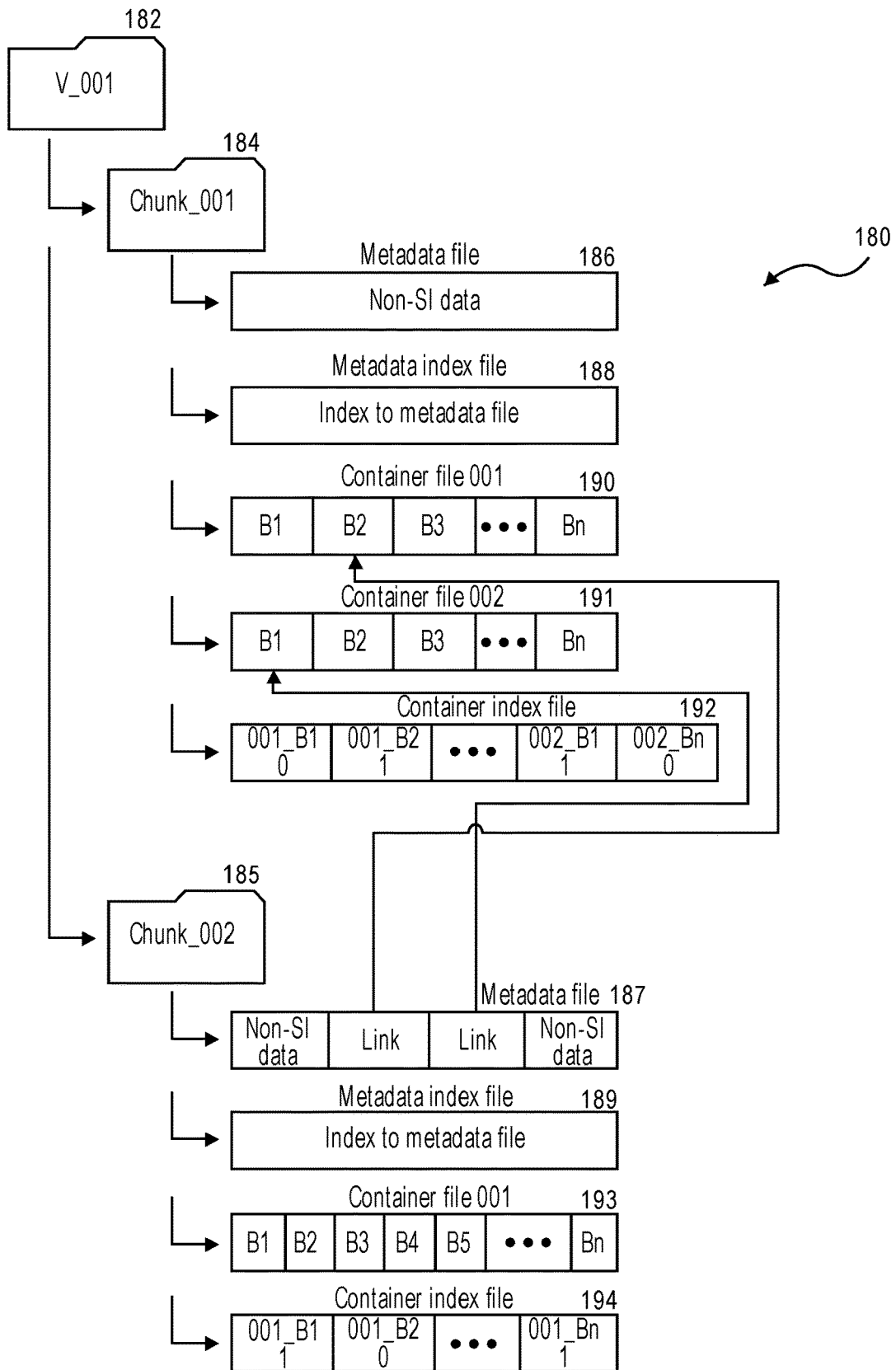

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
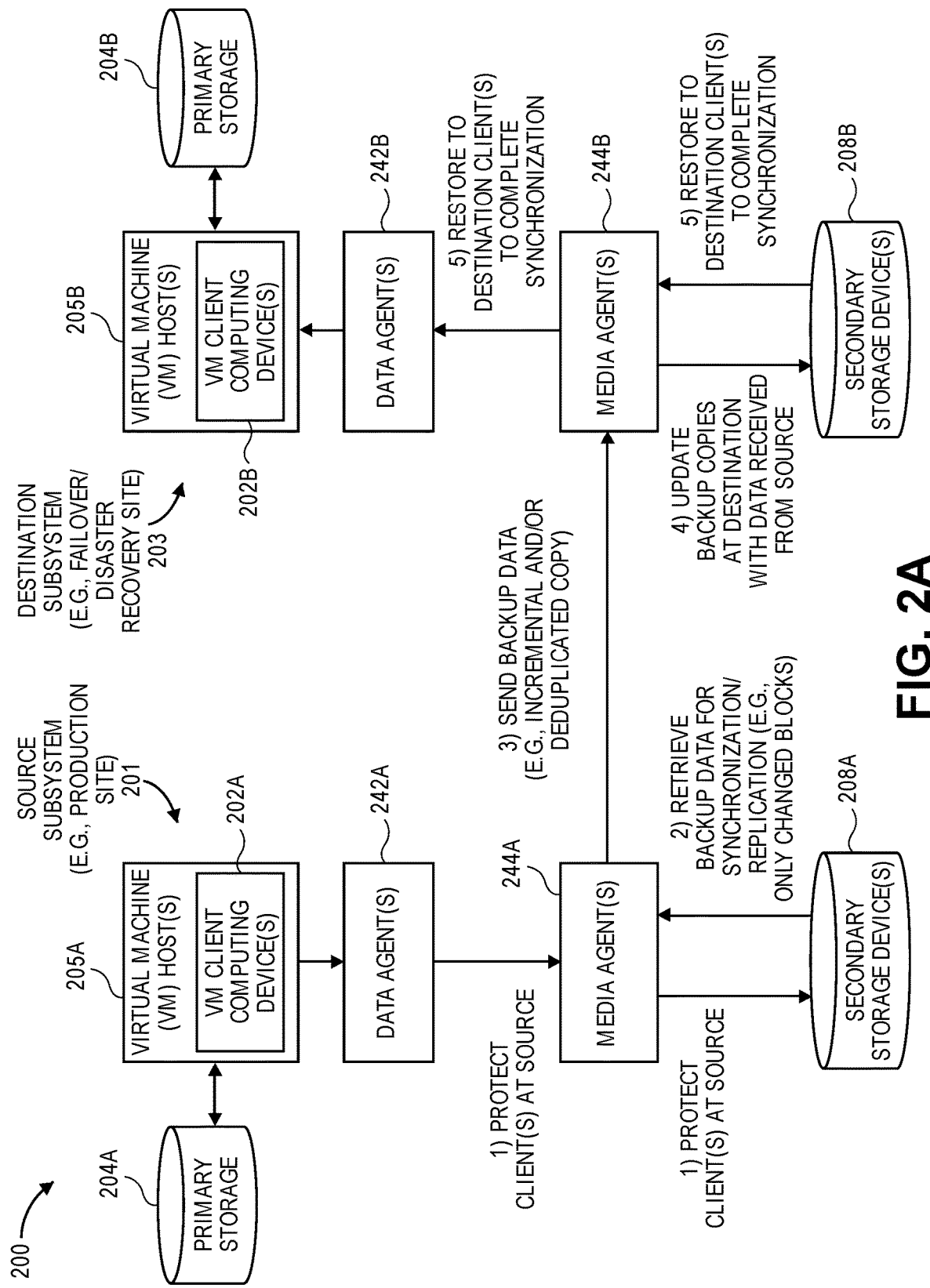
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
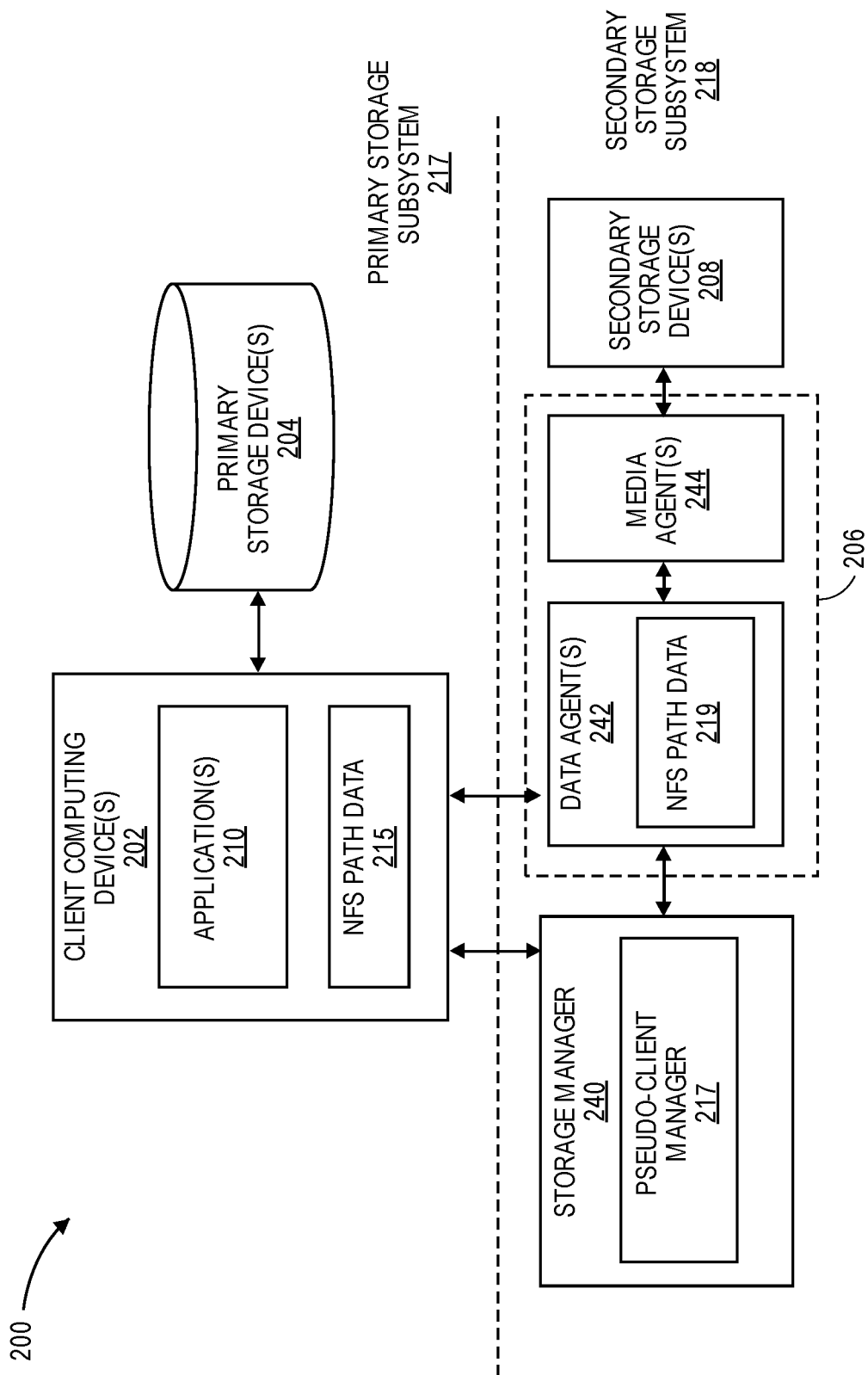
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
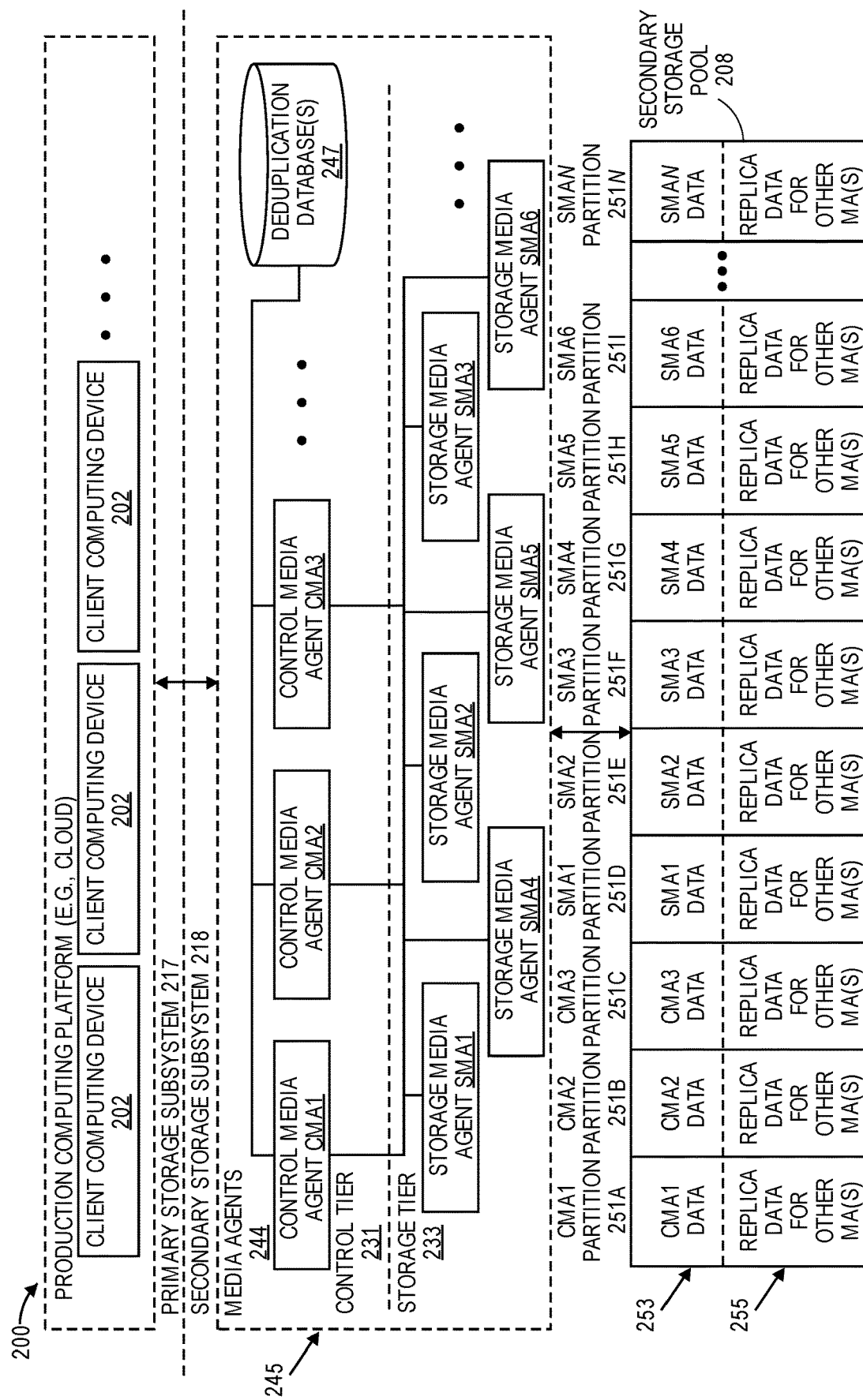
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Heartbeat Monitoring of Virtual Machines for Initiating Failover and/or Failback Operations in a Data Storage Management System FIG. 3 is a block diagram illustrating some salient portions of a system 300 for heartbeat monitoring of virtual machines for initiating failover and/or failback operations, according to an illustrative embodiment of the present invention. As shown here, system 300 comprises: VM data center 301; VM data center 302; cloud computing resources 303; and storage manager 340 comprising management database 346.

System 300 is also referred to herein as a "VM heartbeat monitoring system" at least because it comprises a plurality of heartbeat monitor nodes that monitor respective one or more target virtual machines (VMs). Because system 300 is also a data storage management system, certain components are configured to handle failover and failback operations for failed target VMs.

VM data center 301 represents a data center comprising a production computing environment including virtual machines (VMs) to be described in more detail in another figure. Because the production data center can fail over to another data center, data center 301 is referred to herein as a source relative to a failover to data center 302, which is referred to as a destination. In a failback scenario, the original destination becomes the failback source and the original source is the failback destination. VM data center 301 is generally distinguished herein from a cloud-based environment such as 303, by being based in and directly managed by the enterprise that also owns/operates the illustrative data storage management system 300, such as a data center in a corporate information technology department.

VM data center 302 represents a data center comprising a computing environment including replicated virtual machines (VMs) to be described in more detail in another figure. VM data center 302 is the failback destination relative to VM data center 301. VM data center 302 is generally distinguished herein from a cloud-based environment such as 303, by being based in and directly managed by the enterprise that also owns/operates the illustrative data storage management system 300, such as a data center in a corporate information technology department.

Cloud computing resources, or cloud-based data center, 303 comprises computing resources available from a cloud services provider, e.g., Microsoft Azure, Amazon Web Services, etc. The invention is not limited to these public-cloud service providers, however, because any private and/or public cloud infrastructure can be configured as cloud computing resources 303 in system 300.

Storage manager 340 is analogous to storage manager 140 and further comprises additional features needed for operating within system 300. Storage manager 340 is said to manage system 300, which includes management of storage operations (such as failover operations for failed VMs and/or other failed computing devices) as well as configuring the heartbeat monitor nodes, keeping track of the current master monitor node, configuring certain monitor nodes as members of a quorum, etc., as described in further detail herein. For example, storage manager 340 receives notifications from heartbeat monitor nodes sufficient for storage manager 340 to call failover (or conversely, to call failback) on VMs reported failed based on the illustrative VM heartbeat monitoring network. The operations involved in executing and managing VM failovers/failbacks are available in other data storage management systems and are known in the art as managed by storage manager 340. In contrast, the framework disclosed herein for VM heartbeat monitoring leading to a notice of failure to the storage manager is part of the illustrative embodiments according to the present invention.

Management database 346 is a logical sub-component of storage manager 340. Management database 346 is analogous to management database 146 described elsewhere herein and further comprises information used by storage manager 340 to manage VM heartbeat monitoring in system 300. See also FIG. 6A.

Although the present figure depicts one source data center, one destination data center, and one cloud-based data center, the present invention is not so limited, as described in further detail in other figures herein. Any number or combination of source, destination, and/or cloud-based data centers can be configured for VM heartbeat monitoring and failover and/or failback operations. As shown in FIGS. 13 and 14, the present invention also includes VM heartbeat monitoring for initiating cloud-to-cloud failover and/or failback operations. Likewise included are VM heartbeat monitoring for initiating data-center-to-cloud and cloud-to-data-center failover and/or failback operations.

Figure 4:
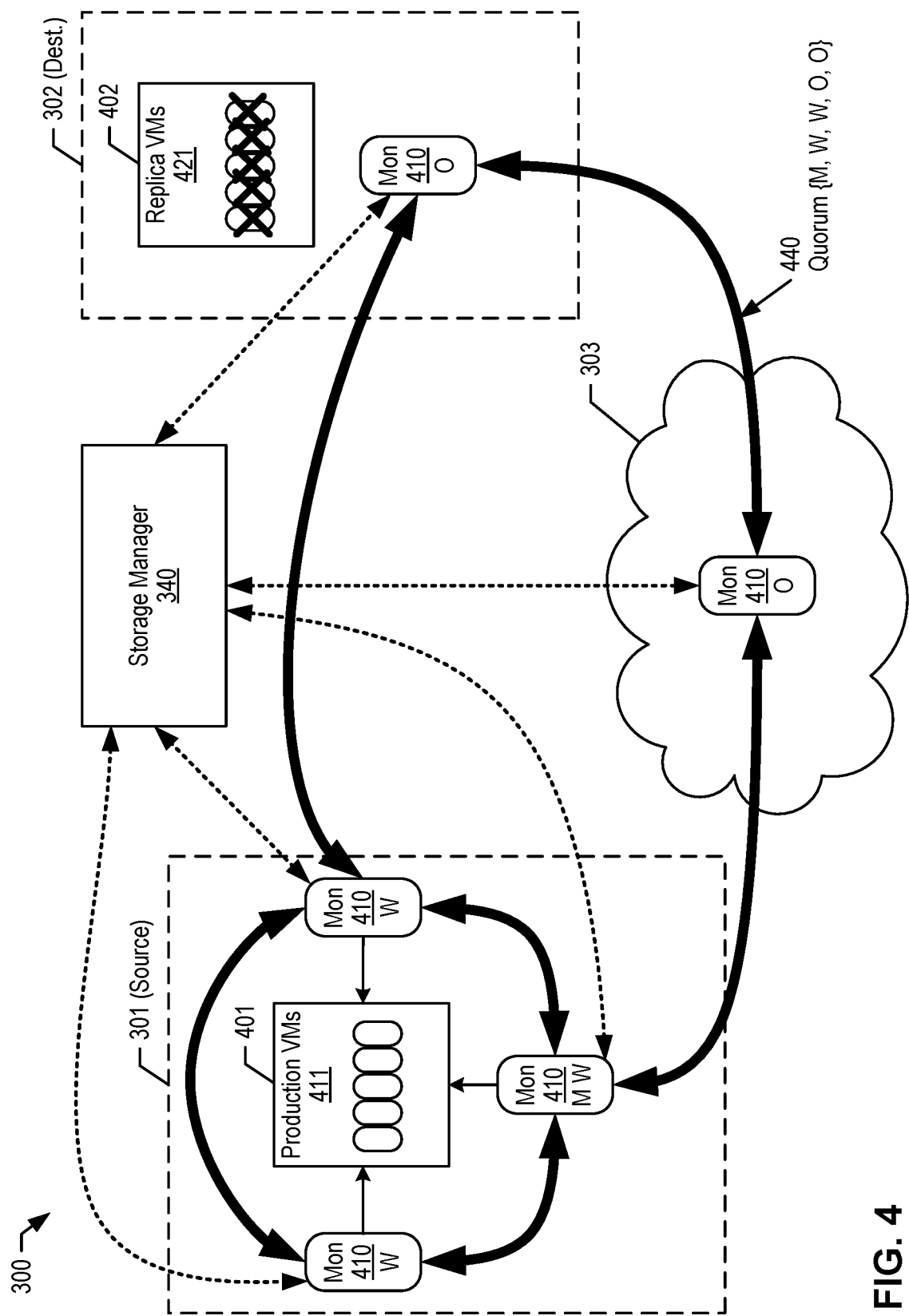
FIG. 4 is a block diagram illustrating certain details of system 300, including a plurality of heartbeat monitor nodes in a quorum configuration.

FIG. 4 is a block diagram illustrating certain details of system 300, including a plurality of heartbeat monitor nodes 410. FIG. 4 depicts: source data center 301, comprising VM host/server 401, production VMs 411, and three heartbeat monitor nodes 410; destination data center 302, comprising VM host/server 402, replica VMs 421, and one heartbeat monitor node 410; cloud computing resources 303 comprising one heartbeat monitor node 410; storage manager 340; and quorum 440 comprising the five depicted monitor nodes 410.

The unidirectional arrows depict heartbeat monitoring of production VMs 411 performed by three heartbeat monitor nodes 410 in source data center 301, e.g., using ping monitoring logic 610. The dotted bidirectional arrows depict a communicative coupling between each heartbeat monitor node 410 and storage manager 340, e.g., using enhanced virtual server data agent 542. The bold bidirectional arrows depict a quorum relationship among the five heartbeat monitor nodes 410, which form quorum 440, e.g., using heartbeat monitoring distributed file system 545, data files 712, and watch processes 900.

VM host/server 401 is a computing device comprising one or more processors and suitable computer memory for hosting one or more virtual machines (VMs), such as virtual machines 411. As is known in the art, a VM host such as 401 also comprises a hypervisor, without limitation on the type or technology thereof. Although VM host/server 401 is depicted here as one computing device, in alternative embodiments component 401 is a collective arrangement such as a VM data center that operates as a unified grouping of VMs and comprises more than one VM host/server computing device. VM host/server computing devices and VM data centers are well known in the art.

VM host/server 402 is a computing device comprising one or more processors and suitable computer memory for hosting one or more virtual machines (VMs), such as virtual machines 421. As is known in the art, a VM host such as 402 also comprises a hypervisor, without limitation on the type or technology thereof. Although VM host/server 402 is depicted here as one computing device, in alternative embodiments component 402 is a collective arrangement such as a VM data center that operates as a unified grouping of VMs and comprises more than one VM host/server computing device. VM host/server computing devices and VM data centers are well known in the art.

Heartbeat monitor nodes 410 are active components that form the backbone of the VM heartbeat monitoring systems disclosed herein. Each heartbeat monitor node 410 is in communication with storage manager 340 as shown by the dotted bidirectional arrows. Each depicted heartbeat monitor node 410 is designated "M" for master, "W" for worker, and/or "O" for observer, each of which carries out a distinct role. In some embodiments, a master monitor node also carries out a worker role, and is designated "M W" to so denote its dual role. A given heartbeat monitor node can be configured to execute on a virtual machine and can also be configured to execute on a computing device without virtualization, without limitation (see FIG. 5). Heartbeat monitor nodes 410 depicted in the present figure are all part of quorum 440, but in alternative configurations a heartbeat monitor node (e.g., 1110 in FIG. 11) can perform VM heartbeat monitoring operations as a worker node without participating in quorum 440. In other embodiments, heartbeat monitor nodes comprise not only the functionality of a heartbeat monitor node 410 but also firewall functionality (e.g., 1310 in FIG. 13) and even include storage manager functionality (e.g., 1410 in FIG. 14).

Each VM 411 is a virtual machine executing in source data center 301. VM 411 is referred to herein as a production VM, because its illustrative role here is to host applications used in a "live" production data processing environment, and therefore VM 411 is a component that is managed under the data storage management system 300, e.g., backup and failover. Any VM technology, size, type, underlying hypervisor, size, and/or configuration is suitable for the present invention, without limitation. Virtual machines are well known in the art. According to the illustrative embodiments each VM 411 is targeted by and monitored by a heartbeat monitor node 410 while the target VM is active and operational. The process for assigning each VM 411 as a target to a suitable heartbeat monitor node is referred to herein as "VM distribution logic" and is described in more detail elsewhere herein, e.g., FIGS. 6A and 18.

Each VM 421 is a virtual machine configured in destination data center 302. VM 421 is referred to herein as a replica VM, because it undergoes continuous replication and/or live synchronization from its counterpart production VM 411. Each VM 421 is pre-configured (e.g., via storage manager 340) as a suitable replacement able to take over operations in a failover scenario when the corresponding source VM 411 fails. Thus, VM 421 is pre-configured to correspond to a certain source VM 411 so that VM 421 is suitably configured for failover. Typically, VM 421 is configured to be as close to its corresponding source VM 411, though absolute identity is not a requirement. Configuring replica VMs (e.g., using continuous replication and/or live sync features) for failover/failback is well known in the art. According to the illustrative embodiments VMs 421 are not monitored by heartbeat monitor nodes pre-failover, although the invention is not so limited.

Quorum 440 comprises the five depicted heartbeat monitor nodes 410. Source data center 301 comprises a master node also operating as a worker node (M W) and two worker nodes (W); one observer node (O) in cloud 303; and another observer node (O) in destination data center 302. The quorum concept is well known in Apache ZooKeeper networks, but other novel aspects are introduced herein according to the illustrative embodiments of the present invention, e.g., what constitutes a quorum node in the VM heartbeat monitoring system, quorum node relationships with storage manager 340, including when the master is established, how the quorum operates after a failover/failback, and other aspects without limitation. Likewise, the Apache ZooKeeper concepts of master, observer, and worker in a quorum are also well known, but other novel aspects are introduced herein according to the illustrative embodiments of the present invention, e.g., each monitor node in communication with storage manager 340, configuration of the distributed file system, node-to-node communications protocol and data file content/format, special configurations for facilitating cloud-to-cloud failover/failback, master node selection logic, VM distribution logic, ping monitoring logic, and other aspects without limitation. See also FIGS. 5 and 6.

FIG. 5 is a block diagram illustrating heartbeat monitor nodes 410 in communication with storage manager 340; and also in communication with each other via heartbeat monitoring distributed file system 545. FIG. 5 depicts: storage manager 340; VM host/server 401 comprising heartbeat monitor node 410-1 represents a VM that executes enhanced virtual server data agent 542 comprising heartbeat monitoring distributed file system 545, wherein the hosting VM is supported by hypervisor 520; and unvirtualized computing device 501 comprising heartbeat monitor node 410-2 executing an enhanced virtual server data agent 542 comprising heartbeat monitoring distributed file system 545.

Heartbeat monitor node 410-1 represents a VM supported by hypervisor 520 executing on VM host/server 401. Heartbeat monitor node 410-1 is therefore referred to herein as a "virtualized monitor node." According to an illustrative embodiment, the host VM is functionally dedicated to operate as heartbeat monitor node 410-1, though the invention is not so limited. Heartbeat monitor node 410-1 need not be hosted by the same VM host/server or VM center as production VMs 411, although its "distance" from any given VM 411 may affect whether node 410-1 will be chosen to monitor the given target VM 411. See e.g., VM distribution rules in FIG. 18. Although heartbeat monitor node 410-1 is shown here hosted by a component of source data center 301, a virtualized heartbeat monitor node such as 410-1 can operate in other data centers that include virtualized resources such as destination data center 302, cloud-based computing resources 303, cloud regions 1303-1 and/or 1302-2 (FIGS. 13, 14), etc., without limitation.

Heartbeat monitor node 410-2 is hosted by an unvirtualized computing device 501, not by a virtual machine, and therefore this heartbeat monitor node is referred to herein as an "unvirtualized monitor node." According to an illustrative embodiment, the hosting computing device 501 is functionally dedicated to operate as a heartbeat monitor node 410-2, though the invention is not so limited. Heartbeat monitor node 410-2 comprises all the functional components necessary to perform VM heartbeat monitoring of any number of target VMs (e.g., 411). An unvirtualized heartbeat node such as 410-2 can operate in any data center that includes unvirtualized resources, e.g., data center 301 and/or 302, without limitation.

Computing device 501 comprises one or more processors and suitable computer memory for executing computer programs. Computing device 501 lacks a hypervisor and does not host virtual machines and is therefore referred to herein as "unvirtualized." Computing device 501 can operate in any data center that includes unvirtualized resources, e.g., data center 301 and/or 302, without limitation Hypervisor 520 executes on VM host/server 401 in a manner well known in the art. Hypervisors are well known in the art and the present invention is not limited to any particular hypervisor version, make, or model. VM host/server 402 also has a hypervisor (not shown) for hosting VMs 421. Likewise, other depicted virtualized monitor nodes, e.g., in cloud-based computing resources 303, in cloud region 1303-1, in cloud region 1303-2 also have corresponding hypervisors for hosting the respective VM.

Enhanced virtual server data agent 542 (or "data agent 542") is analogous to data agent 142 configured for protecting virtual machines and further comprises additional functionality for operating as a heartbeat monitor node in the illustrative systems herein such as system 300, 1100, 1200, 1300, 1400, etc. without limitation. Data agent 542 is in communication with storage manager 340 as depicted by the dotted bidirectional arrow therebetween, including communications relating to VM heartbeat monitoring as well as pertaining to storage management operations, e.g., backups.

Heartbeat monitoring distributed file system 545 is part of data agent 542 and is used for communicating information among heartbeat monitor nodes. The distributed file system is kept coordinated and synchronized across nodes by underlying Apache ZooKeeper services that are well known in the art (see, e.g., component 601 in FIG. 6). However, Apache ZooKeeper does not teach content, organization, and/or arrangement of the distributed file system's constituent parts. According to embodiments of the present invention, the organization and arrangement of heartbeat monitoring distributed file system 545 is specific to and suitable for the VM heartbeat monitoring systems disclosed herein, e.g., node-to-node communications protocol based on data files distributed among nodes; file system hierarchy; designating master, worker, and observer roles; designating members of the quorum; indicating which target VMs are assigned to which monitor node; indicating target VMs confirmed failed; etc. See also FIGS. 7, 8, 9.

Heartbeat monitor nodes (e.g., 410, 1110, 1310, 1410) communicate with each other by locally (on the monitor node) creating and updating data files (e.g., 712) that the underlying Apache ZooKeeper services (e.g., 601) coordinate and synchronize to the other monitor nodes within the illustrative distributed file system 545 as depicted by the solid bold bidirectional arrow. Thus, the data file 712 contents and the file system organization structure are proprietary to the illustrative embodiments, while the inter-node coordination is handled by Apache ZooKeeper services 601. See also FIGS. 6, 8.

FIG. 6 is a block diagram illustrating certain functional components and a distributed file system that are configured in an illustrative enhanced virtual server data agent configured as a heartbeat monitor node. FIG. 6 depicts: enhanced virtual server data agent 542, which comprises VM heartbeat monitoring framework 600, which in turn comprises a number of functional components: Apache ZooKeeper 601, node-to-node communications module 602, cloud-to-cloud support logic 604, master node selection logic 606, VM distribution logic 608, ping monitoring logic 610, and heartbeat monitoring distributed file system 545. In some alternative embodiments, one or more of these functional components are dormant or absent, depending on the implementation needs, e.g., no cloud-to-cloud support logic 604 needed when source and destination are conventional data centers not cloud-based.

An instance of heartbeat monitoring distributed file system 545 is configured in each heartbeat monitor node (e.g., 410, 1110) that executes enhanced virtual server data agent 542 as shown in the present figure. See also FIGS. 7, 8, 9. Logically, heartbeat monitoring distributed file system 545 is part of VM heartbeat monitoring framework 600.

VM heartbeat monitoring framework 600 represents a logical envelope for providing VM heartbeat monitoring services according to an illustrative embodiment. Thus, configuring a computing platform (e.g., VM, computing device, etc.) with an enhanced virtual server data agent 542 that comprises VM heartbeat monitoring framework 600 enables the computing platform to operate as a heartbeat monitor node, whether in a master, worker, and/or observer role, and whether at a source, destination, or other neutral site that is neither source nor destination for VM failover/failback purposes (e.g., cloud computing resources 303).

Apache ZooKeeper services 601 is a functional component of VM heartbeat monitoring framework 600 that comprises an Apache ZooKeeper services infrastructure, which is well known in the art and which enables highly reliable distributed coordination among a plurality of nodes. See, e.g., https://zookeeper.apache.org/. "ZooKeeper is a centralized service for maintaining configuration information, naming, providing distributed synchronization, and providing group services. All of these kinds of services are used in some form or another by distributed applications." https://zookeeper.apache.org/. "ZooKeeper aims at . . . a very simple interface to a centralized coordination service. The service itself is distributed and highly reliable. Consensus, group management, and presence protocols will be implemented by the service so that the applications do not need to implement them on their own. Application specific uses of these will consist of a mixture of specific components of ZooKeeper and application specific conventions." https://cwiki.apache.org/confluence/display/ZOOKEEPER/Index.

The illustrative heartbeat monitor nodes (e.g., 410, 1110) comprise applications that are built on top of Apache ZooKeeper services designed to take care of inter-monitor-node coordination. For example, the illustrative heartbeat monitoring distributed file system 545 is based on underlying Apache ZooKeeper services infrastructure. Illustratively, monitor nodes that are designated to be members of quorum 440 run ZooKeeper server and client services; on the other hand, monitor nodes that are designated to be workers but not members of quorum 440 need only run ZooKeeper client services, though the invention is not so limited.

Node-to-node communications module 602 is a functional and organizational component of VM heartbeat monitoring framework 600 that comprises functionality for communicating information among the illustrative heartbeat monitor nodes (e.g., 410). For example, node-to-node communications module 602 uses the illustrative protocol depicted in FIG. 8 to organize information and populate illustrative data file 712 therewith. Apache ZooKeeper takes care of coordinating the distribution of data files 712 to all monitor nodes via distributed file system 545. See also FIGS. 7, 8.

Cloud-to-cloud support logic 604 is a functional component of VM heartbeat monitoring framework 600 that comprises functionality for specially configuring components so that VM heartbeat monitoring and failover/failback can be supported across two or more distinct cloud regions (e.g., Amazon web services region 1 versus Amazon web service region 2), i.e., when source and destination are each implemented in a cloud-based computing resource rather than as a conventional data center. See also FIGS. 13, 14.

Master node selection logic 606 is a functional component of VM heartbeat monitoring framework 600 that comprises functionality for establishing a master monitor node within quorum 440 in collaboration with storage manager 340. See also FIG. 16.

VM distribution logic 608 is a functional component of VM heartbeat monitoring framework 600 that comprises functionality for determining which target VM(s) in the illustrative data storage management system are to be monitored by which heartbeat monitor node (e.g., 410, 1110). VMs that are targeted for heartbeat monitoring are "distributed" to suitable heartbeat monitor nodes according to certain rules applied by VM distribution logic 608. See also FIGS. 6A, 17, 18.

Ping monitoring logic 610 is a functional component of VM heartbeat monitoring framework 600 that comprises functionality whereby a given heartbeat monitor node pings its target VMs to determine whether they are operational. According to the illustrative embodiments, a heartbeat monitor node that is designated a "worker" node executes the illustrative ping monitoring logic 610 relative to the target VMs assigned thereto by illustrative VM distribution logic 608. A node that is designated a master also can operate as a worker node in some embodiments. Observer nodes do not operate as worker nodes according to the illustrative embodiments. See also FIGS. 19, 20, 20A.

The abovementioned components of VM heartbeat monitoring framework 600 are shown here as distinct elements to ease understanding of the various features. However, an implementation need not be so limited, and therefore these components can be combined into one or more integrated groupings without limitation. In some embodiments, the illustrative enhanced virtual server data agent 542 need not include and/or need not activate all these components when they are not needed, e.g., lacking cloud-to-cloud support logic 604 when source and destination are not cloud-based; lacking ping monitoring logic for heartbeat monitor nodes configured as observers; deactivating VM distribution logic in nodes that are outside the quorum and thus will not be candidates for master role; etc.

FIG. 6A is a block diagram illustrating a logical view of VM distribution logic 608 (part of VM heartbeat monitoring framework 600 not shown here). FIG. 6A comprises: storage manager 340 comprising management database 346; VM host/server 401 hosting VMs 411 and hypervisor 520; heartbeat monitor node 410 designated to operate as a "master" and comprising validated target-VM list 6120, validated worker-VM list 6121, and VM distribution rules 6122; target VM list 6102; workers list 6104; validate operation 6106; and worker-to-VM mapping 6130. This block diagram is a logical representation intended to ease understanding of how VM distribution logic 608 operates within the illustrative data storage management systems herein. VM distribution logic 608 is a functional component of VM heartbeat monitoring framework 600 (not shown in the present figure) is executed by a particular heartbeat monitor node 410 which has emerged as the master node as described in more detail in blocks 1504 and 1510 (see, e.g., FIG. 15). VM distribution logic 608 determines which VMs defined as heartbeat monitor targets are to be monitored by which suitable heartbeat monitor node (e.g., 410, 1110). The unidirectional arrows depict a logical flow of operations, ultimately resulting in the illustrative worker-to-VM mapping 6130, which indicates a set of target VM(s) assigned to each heartbeat monitor node that operates as a worker. In general, the objective of VM distribution logic 608 is for a given target VM (e.g., 411) to be distributed (assigned to) a heartbeat monitor node that is more suitable that other heartbeat monitor nodes to perform ping monitoring of the given target VM, such as assigning a heartbeat monitor node that is more logically proximate to the target than other monitor nodes. Logical proximity (e.g., in the same VM network and host server, fewer hops, etc.) ensures less communication burden between monitor node and target, as well as better responsiveness by the monitor node when the target VM fails. VM distribution rules are discussed in more detail in FIG. 18.

Target VM list 6102, which is initially administered into and stored in management database 346 is a first element for consideration. Target VM list 6102 identifies all VMs 411 that are to be subjected to heartbeat monitoring according to the illustrative embodiments. Notably, every production VM 411 that operates in system 300 need not be designated as a target for VM heartbeat monitoring, since some VMs of relatively low importance will not require the resources needed for ongoing heartbeat monitoring.

Workers list 6104, which is initially administered into and stored in management database 346 is another element for consideration. Workers list 6104 identifies all nodes in system 300 that are designated as heartbeat monitor worker nodes. Notably, any number of monitor nodes are VMs such as heartbeat monitor node 410-1 in FIG. 5, and any number are computing devices such as heartbeat monitor node 410-2 in FIG. 5, in any combination without limitation. There is no limit on the total number of heartbeat monitor nodes in system 300, and likewise there is no limit on how many heartbeat monitor nodes are designated workers. See also FIG. 10.

Validate operation 6106 receives target VM list 6102 and/or workers list 6104 as inputs. Validate operation 6106 is executed by VM distribution logic 608 to determine whether the VMs as identified in the administered lists 6102 and 6104 are actually operational in system 300 according to respective hypervisor(s) 520 in one or more VM host/servers such as 401, 402, etc. Typically, a hypervisor 520 is queried by VM distribution logic 608 according to techniques well known in the art and in response reports on active VMs executing over the said hypervisor 520. After comparing the administered lists 6102 and 6104 against the reports received from hypervisor(s) 520, VM distribution logic 608 generates a respective validated target-VM list 6120 and a validated worker-VM list 6121. In alternative embodiments, these lists are consolidated into a single data structure or are otherwise shown as validated, without limitation, so long as the VMs are verified to be operational.

Once the validated lists 6120 and 6121 have been created, VM distribution logic 608 applies VM distribution rules 6122 to assign each active target VM to a suitable "worker" heartbeat monitor node (e.g., 410-1, 410-2, 1110) that will be responsible for ping monitoring the target VM. See also FIG. 18. The result of applying VM distribution rules 6122 to the validated VM list 6120 is a worker-to-VM mapping 6130 in which each worker heartbeat monitor node (whether VM-based 410-1 or computing device-based 410-2) has an assigned set of one or more target VMs. There is no limit on how many target VMs are assigned to a given worker node. Illustratively, worker-to-VM mapping 6130 is a data structure stored in master monitor node 410, but in alternative embodiments it is instead and/or in addition stored to management database 346.

The information in the worker-to-VM mapping 6130 that results from executing VM distribution logic 608 at the master node is then distributed to the respective worker nodes using the illustrative VM heartbeat monitoring distributed file system 545, e.g., using data file 712. When changes to worker-to-VM mapping 6130 occur, e.g., due to a failover operation and/or changes in master/worker/observer node roles, the changes are likewise distributed using the illustrative VM heartbeat monitoring distributed file system 545 and changes are detected using the watch processes implemented therein. See also FIGS. 7, 8, 9.

Figure 17:
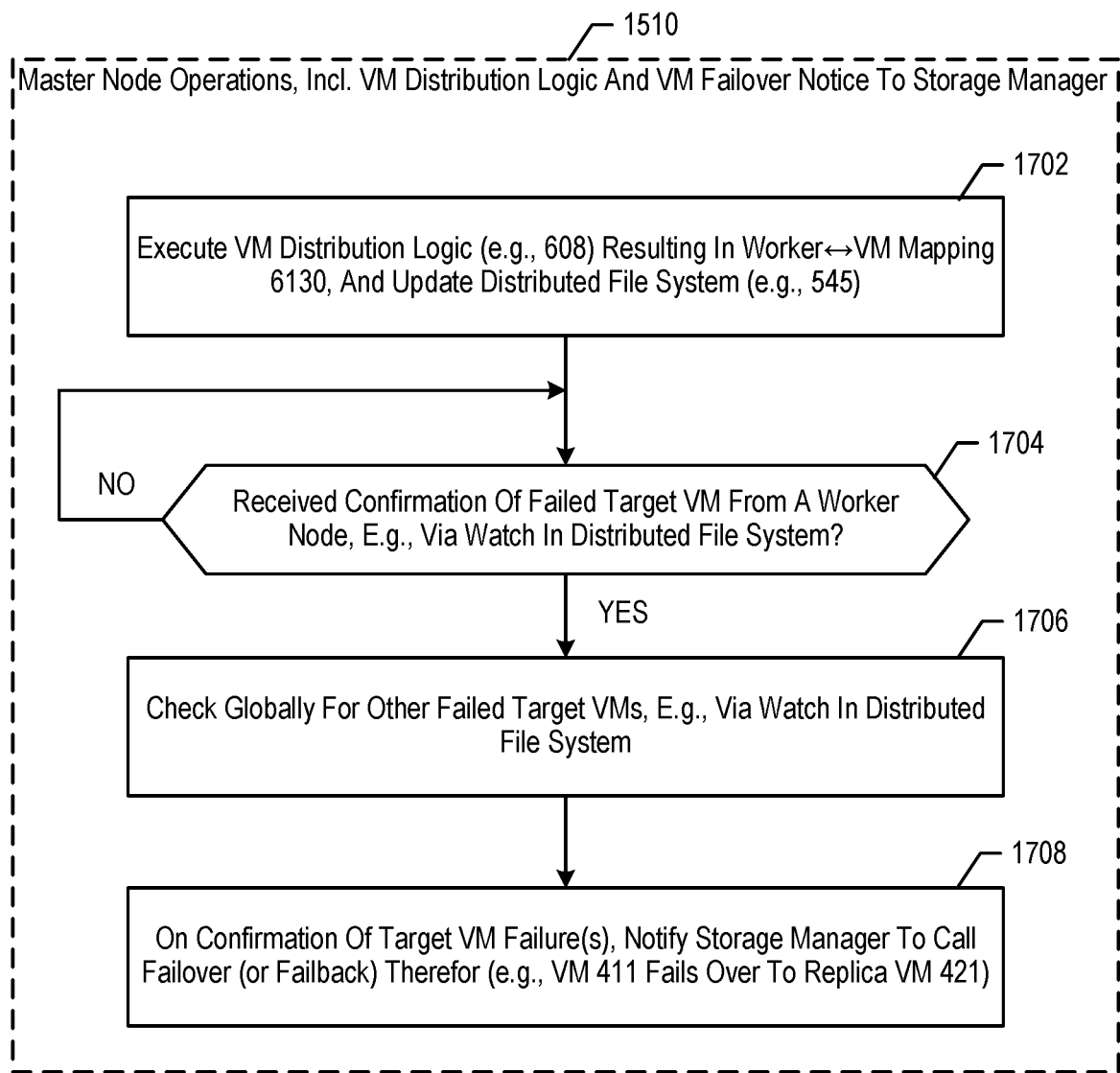
FIG. 17 is a flow chart illustrating some salient details of block 1510 in method 1500.
Figure 18:
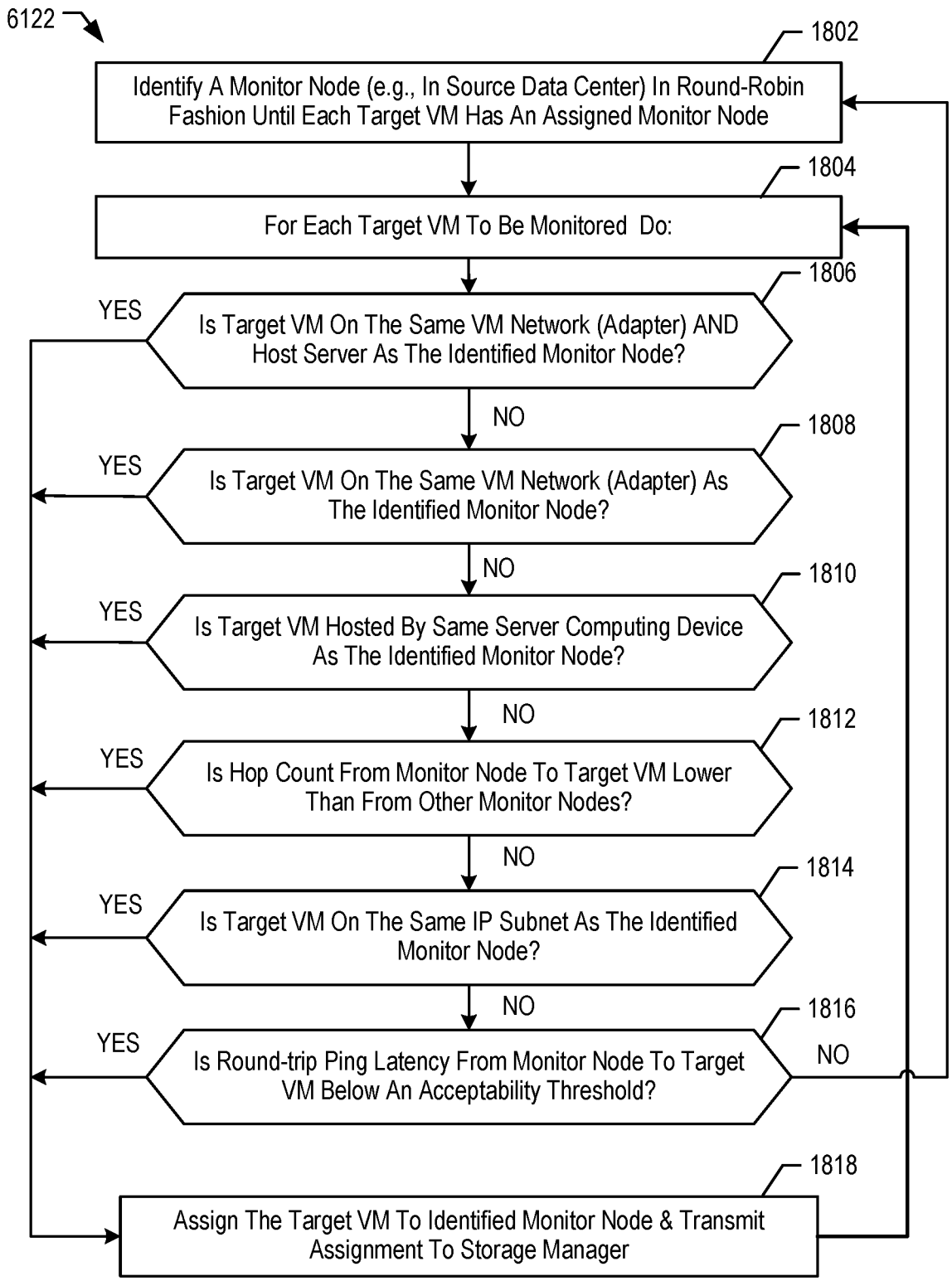
FIG. 18 is a flow chart illustrating VM distribution rules 6122 applied by VM distribution logic 608, when illustratively executed by the master monitor node, e.g., at block 1702.

An illustrative process for VM distribution is described in more detail in FIGS. 17 and 18 herein, as well as in U.S. Provisional Patent Application Ser. No. 62/402,269, filed on Sep. 30, 2016 and entitled "Heartbeat Monitoring of Virtual Machines for Initiating Failover Operations in a Data Storage Management System," which is incorporated by reference herein. The illustrative VM distribution process comprises a number of threads to reach the point wherein the resulting worker-to-VM mapping 6130 is generated. Three such threads are described next, including VM Distribution Main thread, VM Distribution Back End thread #1, VM Distribution Back End thread #2, and many VM Distribution Worker threads. VM Distribution Worker threads count varies with the number of VMs to distribute. Illustrative default number of VM distribution worker threads is five and maximum is ten. Communication among threads is accomplished via six illustrative synchronized queues. Each synchronized queue is filled with VM Info data structure 808 from the heartbeat messaging protocol (see, e.g., FIG. 8). An illustrative Master thread communicates with the VM Distribution Main thread, VM Distribution Back End thread #1 and VM Distribution Back End thread #2 with the help of vmQueue1, vmQueue2, vmQueue3. VM Distribution Main thread communicates with each of the VM Distribution Worker threads by vmQueue1 (worker thread). VM Distribution Back End thread #1 communicates with each of the VM Distribution Worker threads by vmQueue2 (worker thread) and VM Distribution Back End thread #2 communicates with each of the VM Distribution Worker threads by vmQueue3 (worker thread).

Each VM Distribution Thread illustratively performs the following tasks.

VM Distribution Main thread first gets the target VM list 6102 and Workers list 6104 by contacting storage manager 340 and management database 346. Data center discovery follows, to validate these lists against actual operational hypervisor (e.g., 520) information. If a given VM is powered off or not eligible for monitoring it will be filtered out of the validated VM list 6120. Workers also are validated for their respective power states. Information such as UUID, subnets, hosts, network adapters, known networks and switches are gathered for all VMs and workers from the data center discovery query. If the worker is an unvirtualized computing device (e.g., 501) then BIOS UUID, subnets, network adapters and switches are gathered by contacting the computing device's underlying operating system. This information is then updated in two illustrative local synchronized maps (VMInfo map, Workerinfo map) (not shown here). VM Distribution Main thread then updates the VMInfo data associated with a given monitor node in data structure 802 in the heartbeat messaging protocol (e.g., data file 712) and updates the vmQueue1 (worker thread). After computation of the worker-to-VM mapping 6130, VM Distribution Main thread updates this map to the master monitor node (e.g., data file 712 in/Master 702 in distributed file system 545—see, e.g., FIG. 7). The master monitor node will then distribute the individual target VM assignments to the respective /Worker nodes (e.g., VM heartbeat info data structure 802).

VM Distribution Worker threads compute the worker-to-VM mapping 6130, e.g., by applying VM distribution rules 6122 to the appropriate target VMs in VM distribution list 6120 obtained from the vmQueue1 (see also FIG. 18). The number of concurrent VM distribution worker threads varies with the number of target VMs to distribute (illustrative default being five). If the target VMs number over a thousand, then illustratively concurrent VM distribution worker threads rises up to ten.

VM Distribution Back End Thread #1 distributes a few VMs in case of any worker failures. The master monitor node distributes a failed worker's target VMs ("orphaned target VMs") to another healthy worker(s). This back end thread runs continuously and master thread will communicate with the VMs to re-distribute by filling up vmQueue2. This thread gets the orphaned target VMs to re-distribute from the vmQueue2 and identifies the currently alive workers at that point in time. This thread performs the data center discovery for the orphaned target VMs and alive workers to validate. This thread then filters out ineligible or failed orphans. This thread then updates the VMInfo data in vmQueue2 (worker thread) to communicate to the VM Distribution Worker threads. After the computation of worker-to-VM mapping 6130 by the VM Distribution Worker threads, the mapping is updated to the master monitor node.

VM Distribution Back End Thread #2 is mainly used to perform dynamic VM re-distribution of VMs especially to workers chosen on the basis of hop count and latency criteria—the chosen worker receiving all target VMs. Master thread receives this data with the help of heartbeat monitoring change notification system. Master thread then updates this information in the local maps VMinfo, Workerinfo synchronized maps. Master thread then fills the vmQueue3 with the (Workerinfo, VMInfo) messaging structure. VM distribution back end thread #2 receives the object (Workerinfo, VMInfo) messaging structure from the vmQueue3. This thread then computes the best worker for a VM from the input object and local maps VMInfo, Workerinfo. For example, if worker-1, worker-2, worker-3 send VMinfo with hop counts 1, 2, 3, respectively, then the thread selects worker-1 with minimum hop-count as 1. Same goes with latency calculations too. After this computation is done for all the VMs and workers, the thread updates this information in the worker-to-VM mapping 6130, which is then updated to the workers, e.g., via data file 712.

FIG. 7 depicts a hierarchical view of the illustrative distributed file system 545 comprising: root FS-node/VM-Heartbeat 702; four subtending FS-nodes including: /Failed_Masters 704, /Failed_Workers 706, /Quorum 708, and/Master 720 comprising a data file 712; five/Quorum subtending FS-nodes/Q_Node-n 710, each one comprising a data file 712; and three/Master subtending FS-nodes /Worker-m 722, each one comprising a data file 712 and a subtending /Is_Alive flag. The illustrative distributed file system 545 is based on underlying Apache ZooKeeper infrastructure 601 which maintains the namespace and coordination of information among heartbeat monitor nodes that each comprise an instance of distributed file system 545. The term "file-system-node" or "FS-node" herein refers to aspects of the illustrative distributed file system 545, including data structures (e.g., directories, files, hierarchical relationships) in distributed file system 545, which comprise information and/or represent certain entities in heartbeat monitoring system 300. In some alternative embodiments these FS-nodes are referred to as "ZooKeeper-nodes" or "Znodes" since they are implemented over the ZooKeeper services infrastructure (e.g., 601). FS-nodes and Znodes are distinguishable from the term "heartbeat monitor node" or "monitor node" such as components 410, 1110, 1310, 1410, which are functional operators (executing enhanced virtual server data agents 542) that are responsible for monitoring target VMs, such as according to exemplary method 1500 in FIG. 15. See also U.S. Provisional Patent Application Ser. Nos. 62/402,269 and 62/604,988, which are incorporated by reference herein.

Heartbeat Monitoring Distributed File System 545 is built on top of Apache ZooKeeper services (e.g., 601) to store information and to coordinate information among different heartbeat monitor nodes. An instance of distributed file system 545 is configured in each monitor node and is coordinated and synchronized by Apache ZooKeeper services 601, which also ensures that any updates are processed in ordered fashion. The replication and synchronization tasks are performed by Apache ZooKeeper services 601, thus advantageously leveraging the reliability of these basic services. The master monitor node creates the hierarchical tree-structured files in heartbeat monitoring distributed file system 545 (see, e.g., block 1608). The root FS-node is the entry point of the file system. All other child FS-nodes prepend with this root designation.

Distributed file system 545 reflects in its constituent FS-nodes different roles played by the heartbeat monitor nodes, and therefore distinguishes between quorum membership, e.g., including an FS-node for each master, worker, and/or observer in quorum 440 (e.g., FS-nodes 708 and 710), versus master-worker hierarchy regardless of whether any given worker is also in the quorum (e.g., FS-nodes 720 and 722) and/or whether it is also the designated master monitor node. Thus, a heartbeat monitor node 410 that is in quorum 440, has been elected master, and also operates as a worker monitor node is represented by FS-node 710, FS-node 720, and FS-node 722, respectively—thus representing each distinct role within the distributed file system.

702. FS-node/VMHeartbeat 702 represents the highest-level or root of the illustrative distributed file system. Four subtending nodes are depicted.

704. FS-node/Failed_Masters 704 subtends to FS-node/VMHeartbeat 702 and identifies any heartbeat monitor node(s) 410 that were designated as master monitor nodes. This is a synchronized queue containing the previous masters which participated in the heartbeat monitoring process.

706. FS-node/Failed_Workers 706 subtends to FS-node/VMHeartbeat 702 and identifies any heartbeat monitor node(s) 410, 1110 that were designated as worker monitor nodes but which subsequently failed. This is a synchronized queue depicting all the worker nodes which previously went down and currently are not participating in the heartbeat monitoring system.

708. FS-node/Quorum 708 subtends to FS-node/VM-Heartbeat 702 and through its subtending FS-nodes identifies any heartbeat monitor nodes 410 that are designated as members of quorum 440. Illustratively, five such quorum members are represented by subtending FS-nodes 710. A representation of the entire state of the heartbeat monitoring application is stored in the/Master FS-node 708. This is useful in case of current master's failure. After election of a new master, the new master monitor node gets the whole state of the heartbeat monitoring application by querying the heartbeat monitoring distributed file system 545 so that the information can be reliably and rapidly recovered and available for use by the new master monitor node.

710. Five FS-nodes/Q_Node-1 . . . /Q_Node-5 710 subtend to FS-node/Quorum 708 and each represents a member of quorum 440, i.e., represents a heartbeat monitor node 410 that participates in quorum 440, whether in the role of master, worker, and/or observer. Quorum 440 illustratively comprises five monitor nodes as shown in FIG. 4, each of which is represented in distributed file system 545 by an FS-node/VMHeartbeat/Quorum/Q_Node-1 . . . /Q_Node-5. Each FS-node/Q_Node-n comprises a respective data file 712, which among other information identifies the operational heartbeat monitor node 410 that is a member of quorum 440 and further identifies its designated role as "master," "worker," and/or "observer." Illustratively, these are implemented as so-called ephemeral FS-nodes, so that when a quorum member fails, its FS-node 710 vanishes, automatically deleted by Apache ZooKeeper (and this change is detected via a watch process 902—see also FIG. 9). When one or more members of the quorum fail, quorum 440 may be able to survive, depending on the severity of the failure(s), as described in more detail in FIG. 10. Any number of heartbeat monitor nodes 410 can be configured into quorum 440 and therefore can be represented by corresponding FS-Nodes/Q_Node-n in distributed file system 545.

720. FS-node/Master 720 subtends to FS-node/VMHeartbeat 702 and comprises a data file 712, which among other information identifies the operational heartbeat monitor node 410 that is designated the master among the monitor nodes that form quorum 440. Heartbeat monitor nodes designated as workers are represented as subtending to the master, e.g., 722. /Master 720 represents the current master monitor node.

722. Three/Master subtending nodes /Worker-1 . . . /Worker-3 722 subtend to FS-Node/Master 720 and each represents a monitor node (e.g., 410, 1110) that operates as a worker monitor node, i.e., executes ping monitoring logic 610 relative to its respective list of target VMs 411. In FIG. 4, these three illustrative monitor nodes are shown in source data center 301. Illustratively, the monitor node that is designated master ("M") additionally operates as a worker monitor node in the illustrative embodiments, thus having a dual role as both master of quorum 440 and as a worker node responsible for monitoring its assigned target VMs (though this dual role is not required by the present invention). Therefore, the right-most depicted /Worker-3 722 data structure represents the monitor node in its worker role, whereas/Master 720 represents the self-same monitor node in its master role. Each FS-node /Worker-m comprises a respective data file 712, which among other information identifies the operational heartbeat monitor node 410, 1110 that is designated to operate as a worker heartbeat monitor node.

724. Subtending to each FS-node /Worker-m is a /Is_Alive 724 flag that tracks whether the respective heartbeat monitor note is operational or "alive." These are illustratively implemented as ephemeral FS-nodes. Thus, if a worker monitor node fails, the corresponding worker's /Is_Alive FS-node 724 vanishes, automatically deleted by Apache ZooKeeper (and this change is detected via a watch process 924—see also FIG. 9).

As explained in further detail in FIG. 9, changes to these data structures are detected within the distributed file system 545 via a number of so-called "watch" processes that are implemented by the Apache ZooKeeper infrastructure 601. The heartbeat monitoring distributed file system 545 illustrated here is only one example of how to represent the VM heartbeat monitoring network of system 300 shown in FIG. 4. However, the invention is not so limited and in other embodiments distributed file system 545 takes a different form/hierarchy for representing the salient components and their distinctive roles.

FIG. 8 depicts a template for content of an illustrative data file 712 used in illustrative distributed file system 545. As explained elsewhere herein (e.g., FIG. 7), data files 712 are generally used for storing information that pertains to certain salient components of system 300 and thanks to the coordination and watch processes performed by the underlying Apache ZooKeeper infrastructure 601, changes in a given data file 712 stored in a given monitor node are communicated to other data files 712 in the other monitor nodes. An illustrative template is presented here for storing information in a data file 712, including: VM heartbeat information 802, machine information 804, network information 806, and VM information 808. Illustratively, file 712 is configured as an XML file, but the invention is not so limited. Thus, node-to-node communications among heartbeat monitor nodes (e.g., 410, 1110, 1310, 1410) uses the illustrative protocol embodied by data file 712 and its constituent parts depicted here.

VM heartbeat information data structure 802 (e.g., XML file) comprises information about the monitor nodes that operate as master, worker(s), and observer(s) in system 300, using pointers as needs to some of the other data structures in file 712. Selected portions of Worker-to-VM mapping 6130 are stored in respective entries of VM heartbeat information data structure 802, so that the set of target VMs to be monitored by a given worker monitor node is associated with that worker's entry in the VM heartbeat information data structure 802. Illustratively, an entry for the master monitor node points to its corresponding machine information. Illustratively, entries for each worker monitor node point to the corresponding machine information, the target VM list assigned to the given worker monitor node ("All_VM") (e.g., obtained from worker-to-VM mapping 6130), and a list of target VMs that are confirmed failed ("Failed_VM"). Illustratively, entries for observer monitor nodes point to the corresponding machine information.

Machine information data structure 804 (e.g., XML file) comprises information about a particular machine (e.g., computing device 501, VM host/server 401) that hosts a given master, worker, or observer monitor node. Illustrative information includes machine name, DNS (domain name system) name, IP address, universally unique identifier (UUID), host name, power state (e.g., active, inactive), location, ranking based on network information, etc., without limitation.

Network information data structure 806 (e.g., XML file) comprises information about the data network in which a given machine belongs. Illustrative information includes network name, network label, whether the machine is connected, subnet identification (subnet in IP address), etc. without limitation.

VM information data structure 808 (e.g., XML file) comprises information about a particular target VM 411 assigned to a worker monitor node. In the case of replica VMs 421, information such as a Replica ID is also included to help correlate a production VM 411 with its corresponding replica VM 421. Illustrative information includes VM name, DNS (domain name system) name, IP address, universally unique identifier (UUID), replica ID, host name, power state, pointer to network information, measure of latency, hop count, etc. without limitation.

The template illustrated here is only one example of how to represent the contents of a data file 712. However, the invention is not so limited and in other embodiments data file 712 takes a different form/hierarchy for representing the salient information.

How the node-to-node communication protocol works for communicating among the illustrative heartbeat monitor nodes. The illustrative XML structure protocol of data file 712 is used by master and all workers in serialized format for inter-monitor-node communication purposes. If the master monitor node has to send data to one or more worker monitor nodes it updates the "From" field in data structure 802 to "master" and makes other suitable changes in data file 712, e.g., a change in All_VM list for a given worker. Worker nodes "receive" this message by detecting changes to data file 712 via watch processes, e.g., 923, and then will process the updated content of data file 712. Likewise, if a worker monitor node has to send data to the master monitor node, the worker updates the "From" field in data structure 802 to "worker ID" and makes other suitable changes in data file 712, e.g., updating its Failed_VM list to indicate that certain of its target VMs are confirmed failed. Master "receives" this message by detecting changes to data file 712 via watch processes, e.g., 922, and then will process the updated content as appropriate, e.g., notifying storage manager 340 to call failover for the target VMs confirmed failed. Thus, updates to data files 712 provide node-to-node communications. Observer nodes likewise receive all updates. Data file 712 is created/updated and stored to a local cache on the computing device (e.g., 401, 501) that hosts the heartbeat monitor node. Apache ZooKeeper takes care of transmitting updated data files 712 in a sequential and coordinated manner among all monitor nodes that are part of distributed file system 545. Apache ZooKeeper further takes care of the watch processes that detect changes in the updated data files 712. See also FIG. 9.

FIG. 9 depicts illustrative watch processes in heartbeat monitoring distributed file system 545 of system 300. Apache ZooKeeper infrastructure 601 comprises a so-called watch functionality that is used for detecting changes and change notification in a ZooKeeper-based distributed files system such as heartbeat monitoring distributed file system 545. "A watch event is a one-time trigger, sent to the [entity] that set the watch, which occurs when the data for which the watch was set changes." https://zookeeper.apache.org/doc/r3.4.5/zookeeperProgrammers.html#ch_zkWatches. Apache ZooKeeper watch setting and change detecting as well as the underlying watch processes are well known in the art.

Accordingly, the unidirectional double-line arrows in the present figure depict a number of Apache ZooKeeper watch processes that are active in the illustrative VM heartbeat monitoring distributed file system 545. Watch processes enable the watching entities to become aware of changes (a "change detection and notification system"), effectively acting as a communications protocol among heartbeat monitor nodes. In some cases, the detected changes will cause remedial action to be taken, e.g., re-targeting ping monitoring to other target VMs, finding a new master monitor node, etc.

Watch processes 902 represent a scheme whereby each member of quorum 440 watches for changes in a designated "neighbor" quorum node. The neighbor need not be geographically proximate. Watch processes 902 are concerned with quorum integrity. When data file 712 in a watched Q_node changes or if the watched Q_node changes or the neighbor Q_node vanished (ephemeral FS-node), the watching "neighbor" quorum node becomes aware of the change and triggers remedial action. Remedial action examples upon a quorum node failure include determining whether the quorum 440 can still survive (see, e.g., FIG. 10), electing a new master monitor node (see, e.g., FIG. 16), changing a node's role from observer to worker, re-establishing "neighbor" watches in a surviving quorum scenario, etc., without limitation.

Watch processes 922 enable the master monitor node to watch for changes in worker monitor nodes. Watch processes 922 are concerned with detecting changes in worker nodes. Notably, not every worker monitor node needs be a member of quorum 440. Changes in a data file 712 that resides in a /Worker FS-node (e.g., in /Worker-1) will be detected by /Master via a watch process 922 and may, if necessary, result in remedial action, e.g., a change in network topography may require a reset, an addition to a worker's Failed_VM list in data structure 802 requiring notice be sent to storage manager 340 to call failover, etc., without limitation.

Watch processes 923 enable each worker monitor node to monitor itself for relevant changes, e.g., after a re-distribution of target VMs as reflected in data structure VM heartbeat information 802 of data file 712, and further acts as a way of each worker detecting changes distributed by the master monitor node via data file 712. Based on a revised list of target VMs (All_VM)—typically promulgated by the master monitor node after executing VM distribution logic 608—a given worker monitor node would detect the change via watch process 923 and would re-target its ping monitoring. Some detected changes may not trigger action at the watching worker monitor node, e.g., when another worker's list of target VMs changes without affecting the watching worker.

Watch processes 924 enable the master monitor node to watch for vanishing "Is_Alive" flags 724 at its worker nodes. Watch processes 924 are concerned with worker integrity. A disappearance of a watched /Is_Alive FS-node 724 (implemented as an ephemeral FS-node) indicates to the watching master monitor node that the watched worker node has failed, necessitating remedial action, such as re-distributing VMs using VM distribution logic 608 (see, e.g., FIG. 21).

Watch processes 932 enable the master monitor node to watch for and detect changes in a list of failed masters. The Failed_Masters list may be maintained for historical and reporting purposes, e.g., when a given master monitor node failed.

Watch processes 933 enable the master monitor node to watch for and detect changes in a list failed worker nodes. The Failed_Workers list may be maintained for historical and reporting purposes, e.g., when a given worker node failed.

The watch processes depicted here are suitable to the illustrative VM heartbeat monitoring distributed file system 545, but are not limiting. Other watches can be established by the implementers of a VM heartbeat monitoring network according to the present invention, without limitation.

FIG. 10 depicts illustrative quorum 440 arrangements for heartbeat monitor nodes. Four scenarios are depicted—labeled A, B, C, and D.

In scenario A, an illustrative arrangement for a quorum 440 is depicted as shown in FIG. 4. Accordingly, a master monitor node and two worker monitor nodes are configured in source data center 301; an observer monitor node is configured in destination data center 302; and an observer monitor node is configured in cloud-based computing resources 303. Thus, quorum 440 comprises five quorum nodes, of which the majority of three is configured in the source data center 301.

Scenario B depicts two failed worker nodes at the source data center 301 of scenario A. The failed worker nodes have been replaced by a worker node in destination data center 302 (previously merely operating as an observer node in scenario A), resulting in a working quorum 440 comprising only three working quorum nodes. If the master monitor node in source data center 301 were to fail also (e.g., catastrophic failure at the source data center), quorum 440 would fail altogether, as only two of five quorum nodes would still be operational. A complete reset of the VM heartbeat monitoring system 300 would be necessary to re-establish a working arrangement and configuration of quorum nodes, as well as suitable worker nodes able to handle the VM heartbeat monitoring of target VMs. Scenario B thus demonstrates a weakness in configuring a majority of quorum nodes at the source data center, since a catastrophic failure at the source will take down quorum 440 and the VM heartbeat monitoring infrastructure. Scenarios C and D present an alternative and more robust approach.

In scenario C, an illustrative arrangement for a quorum 440 is depicted. A master monitor node and one worker monitor node are configured in source data center 301; two observer monitor nodes are configured in destination data center 302; and an observer monitor node is configured in cloud-based computing resources 303. Thus, quorum 440 comprises five quorum nodes, of which the majority of three is configured outside of the source data center 301.

Scenario D depicts a failed master monitor node and a failed worker monitor node at the source data center 301 of scenario C, as depicted in FIG. 12. The failed nodes have been replaced by a master and a worker node in destination data center 302 (previously merely operating as observer nodes in scenario C). Quorum 440 survives this catastrophic failure at the source data center 301, because the majority of quorum nodes are configured and remain operational elsewhere. Therefore, this arrangement of quorum nodes is more robust than the arrangement of scenario A and FIG. 4. Notably, one or more other worker monitor nodes can be configured in source data center 301 to handle the load of monitoring any number of target VMs there, but if these other worker monitor nodes are not part of quorum 440, the quorum can survive the catastrophic failure of data center 301 and re-establish appropriate failover monitor nodes at the destination data center 302. Likewise, any number of worker monitor nodes can be configured at destination data center 302 without making these nodes part of quorum 440.

The configuration scenarios for quorum 440 shown here are illustrative and the invention is not so limited. Any number of quorum nodes may be configured in any arrangement suitable to the implementers of a VM heartbeat monitoring system according to the present invention. Likewise, any number of additional worker nodes that are not quorum members also may be configured.

FIG. 11 is a block diagram illustrating failover of target VMs to replica VMs and to another monitor node(s) in system 1100. FIG. 11 depicts a system 1100, which is analogous to system 300 in FIG. 4 with some exceptions: some target VMs 411 at source data center 301 have failed over to replica VMs 421 at destination data center 302; destination data center 302 comprises a worker monitor node 410 that held an observer role in quorum 440 in FIG. 4 when replica VMs 421 were inactive and is now activated as a worker monitor node for certain replica VMs 421 (solid unidirectional arrow); destination data center 302 further comprises another worker monitor node 1110 that actively monitors some of replica VMs 421 (solid unidirectional arrow). As in FIG. 4, all monitor nodes 410, 1110 are in communication with storage manager 340 but for simplicity not all such communicative couplings are shown in the present figure by dotted bidirectional arrows.

Failover of a failed VM is called and managed by storage manager 340 according to technology known in the art, but the technology whereby storage manager 340 reaches the point of calling failover for a given VM is performed according to the illustrative embodiments disclosed herein, including the VM heartbeat monitoring network shown here comprising monitor nodes 410 and 1110. See also FIG. 15.

Heartbeat monitor node 1110 is analogous to heartbeat monitor nodes 410 (e.g., executing an enhanced virtual server data agent 542), but node 1110 is not configured to be part of quorum 440. Node 1110 is configured as a worker monitor node with a set of target VMs to monitor, and node 1110 is subtending to a master monitor node 410 (e.g., node 410 "M W" shown here in source data center 301). Node 1110, like other illustrative heartbeat monitor nodes 410, participates in the heartbeat monitoring distributed file system 545, wherein it is represented by a corresponding FS-node 722. Accordingly, the dashed bidirectional arrow depicts a communication pathway between node 1110 and another heartbeat monitor node 410 (e.g., in destination data center 302).

However, monitor node 1110 is not part of quorum 440 and is not involved in quorum operations such as selecting a new master monitor node and watching a "neighbor" quorum node—and thus node 1110 is not represented in distributed file system 545 by a FS-node 710. Like other heartbeat monitor nodes, node 1110 is in communication with storage manager 340 as depicted by the dotted bidirectional arrow between them.

The present figure is only one example scenario of VM failover according to an illustrative embodiment of the present invention, but other embodiments are possible. Other embodiments support not only failover of target production VMs (e.g., 411) to replica VMs (e.g., 421), but also support failback from target VMs 421 back to target VMs 411. Moreover, failover of heartbeat monitor nodes (e.g., 410, 1110) also is supported as described in further detail elsewhere herein. The present invention imposes no limits on the number of production VMs 411, replica VMs 421, heartbeat monitor nodes (e.g., 410, 1110), size of quorum 440, data centers (e.g., 301, 302, 303), and failover/failback operations.

FIG. 12 is a block diagram illustrating a system 1200 experiencing failure of the entire source data center, according to an illustrative embodiment of the present invention. System 1200 is analogous to system 300 in FIG. 4 with some exceptions: all of source data center 301 has failed, including the two heartbeat monitor nodes 410 therein and the production VMs; quorum 440 survives (bold bidirectional arrows) with two monitor nodes 410 (one master, one worker) at the destination data center 302 and one monitor node 410 (observer) at cloud-based computing resources 303; replica VMs 421 have been activated on failover and are now active target VMs being monitored by the two heartbeat monitor nodes 410 in destination data center 402 (solid unidirectional arrows). The operational heartbeat monitor nodes 410 are in communication with storage manager 340 (dotted bidirectional arrows).

The present figure is only one example scenario of data center failover that includes failed production VMs and heartbeat monitor nodes thereof according to an illustrative embodiment of the present invention. Other embodiments also support failback from destination data center 302 back to source data center 301. The present invention imposes no limits on the number of production VMs 411, replica VMs 421, heartbeat monitor nodes (e.g., 410, 1110), size of quorum 440, data centers (e.g., 301, 302, 303), and failover/failback operations.

FIG. 13 is a block diagram illustrating a system 1300 for heartbeat monitoring of virtual machines for initiating cloud-to-cloud failover and/or failback operations, according to an illustrative embodiment of the present invention. System 1300 comprises: storage manager 340; cloud region 1303-1 comprising production VMs 411, two worker monitor nodes 410, and one master monitor node 1310; cloud region 1303-2 comprising replica VMs 421, one observer monitor node 410, and another observer monitor node 1310. Quorum 440 comprises the five aforementioned monitor nodes.

According to the illustrative embodiment depicted here, VMs that operate in a public cloud are monitored and failed over from cloud region 1 to cloud region 2, and vice-versa. Public clouds are generally known in the art and are understood to mean cloud based computing resources provided by a cloud service provider such as Amazon Web Services or Microsoft Azure or any other similar provider, without limitation. Because VMs operate in a third party-provided public cloud, the user and/or administrator of the illustrative VM heartbeat monitoring system 1300 has limited access to and limited control over the underlying computing resources at these public cloud data centers, which leads to certain security concerns and enhancements in the illustrative components described herein.

In contrast to data centers 301 and 302, wherein every heartbeat monitor node is in communication with storage manager 340 (see, e.g., FIG. 4), security concerns prevent such a communication pattern in the cloud-based data centers here. Therefore, communications with storage manager 340 are managed through a firewall function ("FW") that is activated at the master monitor node 1310 in the source region 1303-1 and also at an observer monitor node 1310 in the destination region 1303-2. Accordingly, the master monitor node 1310 at source region 1303-1 acts as a gateway to storage manager 340 and tunnels all communications between storage manager 340 and the other heartbeat monitor nodes 410 operating in source region 1303-1.

To account for the possibility that the master monitor node may fail and be replaced by another heartbeat monitor node at source region 1303-1, it is advantageous to enable a rapid and automatic process that can take hold with no or minimal administrator intervention in case the present master fails. Accordingly, cloud-to-cloud support logic 604 (see, e.g., FIG. 6) provides an enhanced firewall feature that opens certain ports on the other (non-master) heartbeat monitor nodes 410, so that upon being elected a new master, a heartbeat monitor node with the open ports can immediately establish communications with storage manager 340 and take over the firewall function in cloud region 1303-1. Thus, it can be said that master monitor node 1310 comprises the enhanced firewall feature that opens other monitor nodes' ports for secure communications with storage manager 340. Likewise, cloud-to-cloud support logic 604 executing in observer monitor node 1310 at destination region 1303-2 also comprises this enhanced firewall feature so that destination region 1303-2 can smoothly transition in case of a failover thereto, including a partial failure or a total failover from region 1303-1. Accordingly, the enhanced firewall feature will automatically open certain ports on the other heartbeat monitor nodes 410/1110 at destination region 1303-2, so that a heartbeat monitor node with the open ports can immediately establish communications with storage manager 340 and take over the firewall function if need be. Although the ports are set open by the enhanced firewall feature, communications with storage manager 340 are disabled so long as another heartbeat monitor node carries on the master role.

Upon notice received by storage manager 340 that a target VM or a heartbeat monitor node has failed (received from the master monitor node), storage manager 340 will manage failover operations for the failed VM(s) and/or monitor node(s), including failovers from one cloud region to the other region (e.g., 1303-1 to 1303-2).

Cloud regions 1303 (e.g., 1303-1, 1303-2) are logically distinct sections of public cloud computing resources of a cloud service provider (e.g., Microsoft Azure, Amazon Web Services (AWS), etc., without limitation). Though offered by the same cloud services provider, these distinct cloud regions behave as mutually independent cloud-based computing resources, and therefore must be treated by the illustrative embodiment as respectively distinct source and destination data centers for purposes of VM heartbeat monitoring and failover/failback operations. Thus, one region (e.g., 1303-1) comprises production VMs 411 and is treated as the source data center, whereas the other region (e.g., 1303-2) comprises replica VMs 421 and is treated as a destination data center. Accordingly, cloud-to-cloud failover enabling cloud-to-cloud failover (e.g., from region 1303-1 to region 1303-2) and cloud-to-cloud failback enabling cloud-to-cloud failover (e.g., from region 1303-2 to region 1303-3) is enabled—and as in other illustrative embodiments, storage manager 340 calls failover/failback and manages the operations therefor.

Heartbeat monitor nodes 1310 are analogous to heartbeat monitor nodes 410 (e.g., part of quorum 440, designated as master and observer respectively) and further comprise a firewall function (e.g., Commvault Firewall). The firewall function, which is generally known in the art, blocks unauthorized access to portions of system 1300 that operate in a given region (e.g., 1303-1) from any components outside the given region. Thus, communicative couplings (dotted bidirectional arrows) from the given cloud region with storage manager 340 and the other cloud region (e.g., 1303-2) are funneled through the region's firewall component, e.g., heartbeat monitor node 1310—and vice-versa relative to cloud region 1303-2. Communications between other, non-firewalled monitor nodes 410 and storage manager 340 are directed through (funneled via) the firewalled component 1310 (dotted bidirectional arrows).

Component 1310 in cloud region 1303-1 also performs as a heartbeat monitor node, illustratively as a member of quorum 440, as a master monitor node, and also as a worker monitoring certain target VMs 411 (solid unidirectional arrow). Component 1310 in cloud region 1303-2 is also a member of quorum 440 and is currently carrying on an observer role—though after a failover it could become a master and possibly also a worker monitoring certain replica VMs 421.

The present figure is only one example configuration enabling cloud-to-cloud failover and/or failback (e.g., from region 1303-1 to region 1303-2 and vice-versa) according to an illustrative embodiment of the present invention. The present invention imposes no limits on the number of production VMs 411, replica VMs 421, heartbeat monitor nodes (e.g., 410, 1110, 1310), size of quorum 440, number of cloud regions (e.g., 1303-1, 1303-2) and failover/failback operations.

FIG. 14 is a block diagram illustrating a system 1400 for heartbeat monitoring of VMs for initiating cloud-to-cloud failover and/or failback operations using an integrated storage manager and heartbeat monitor node 1410, according to an illustrative embodiment of the present invention. System 1400 comprises: cloud region 1303-1 comprising production VMs 411, two worker monitor nodes 410, and one integrated master monitor node plus storage manager 1410; cloud region 1303-2 comprising replica VMs 421, one observer monitor node 410, and another observer monitor node 1310. Quorum 440 comprises the five aforementioned monitor nodes.

Component 1410 comprises the functionality of (a) a heartbeat monitor node and firewall 1310, and (b) a storage manager 340 (e.g., storage manager software, firewall, and enhanced virtual server data agent 542 executing on the same computing device host comprising one or more processors and suitable computer memory. Thus, component 1410 provides firewall protection to the components of system 1400 inside cloud region 1303-1. Component 1410 also acts as the storage manager of system 1400 (including management database 346 not shown here). Communications between heartbeat monitor nodes 410 inside cloud region 1303-1 and the storage manager of component 1410 are not shown here. Component 1410 also performs as a heartbeat monitor node, illustratively as a member of quorum 440, as a master monitor node, and also as a worker monitoring certain target VMs 411 (solid unidirectional arrow).

Communications between heartbeat monitor nodes (e.g., 410, 1110, 1310) in cloud region 1303-2 and the storage manager of component 1410 are funneled via the firewalled monitor node 1310 (dotted bidirectional arrow).

The present figure is only one example configuration enabling cloud-to-cloud failover and/or failback (e.g., from region 1303-1 to region 1303-2 and vice-versa) according to an illustrative embodiment of the present invention. In other embodiments, a standby storage manager is configured in the destination region (e.g., 1303-2) as a failover destination for the storage manager in component 1410 in cloud region 1303-1, whether as a stand-alone component such as 340 or as an integrated component such as 1410. The present invention imposes no limits on the number of production VMs 411, replica VMs 421, heartbeat monitor nodes (e.g., 410, 1110, 1310), size of quorum 440, number of cloud regions (e.g., 1303-1, 1303-2) and failover/failback operations.

FIG. 15 is a flow chart illustrating a method 1500 for performing virtual machine heartbeat monitoring in a data storage management system, according to an illustrative embodiment of the present invention. One or more components of illustrative systems 300, 1100, 1200, 1300, and/or 1400 execute the operations of method 1500 as described in further detail below and elsewhere herein. Components with an operational enhanced virtual server data agent 542 and which successfully execute VM heartbeat monitoring framework 600 therein also execute the Apache ZooKeeper infrastructure 601, which coordinates among monitor nodes and maintains the heartbeat monitoring distributed file system 545 (e.g., keeping watches 900, transmitting data files 712 among nodes, etc.).

At block 1502, a variety of preliminary administrative and activation operations take place in the system. These operations include without limitation: VM administration; VSDA 542 activation on VMs and/or computing devices configured as heartbeat monitor nodes (see, e.g., FIG. 5); designating which nodes are to be part of quorum 440; and any other administrative and activation operations that are needed for activating data centers 301, 302, 303, 1303-1, 1303-2, etc. and storage manager 340/1410.

At block 1504, monitor nodes designated to be in quorum 440 execute master node selection logic 606, designating an initial or new master monitor node, worker nodes(s), and observer node(s). See also FIG. 16.

At block 1506, which is a decision point, storage manager 340 determines whether the VM/computing device host for the master monitor node is operational. If not, control passes back to block 1504 for finding another master monitor node. If the host is operational, then control passes to block 1508.

At block 1508, which is a decision point, storage manager 340 determines whether VSDA services for heartbeat monitoring are running on the host of the master monitor node, i.e., is framework 600 operational in enhanced virtual server data agent 542? If not, the "neighbor" watching quorum node is notified of the master node's failure (e.g., using watch 902 which detects the vanishing of the master's Q_node 710 in distributed file system 545). According to the illustrative embodiment, the "neighbor" node that watched the failed master is the monitor node that is first to launch master selection logic 606 as described at block 1612 in FIG. 16. Of course, the rank of this first node may be unsuitable for its being elected master, in which case a next adjacent quorum node is considered, thus ultimately identifying a quorum member of sufficiently low rank to qualify as a proper master monitor node. See also FIG. 16. Control passes back to block 1504. If operational, the master monitor node is deemed to be healthy and control passes to block 1510.

Block 1510 comprises operations executed by the (healthy) master monitor node, including VM distribution logic and VM failover notice to the storage manager, as described in further detail in another figure herein (see, e.g., FIG. 17).

At block 1512, which is a decision point, storage manager 340 determines whether each worker node is operational as a monitor node (i.e., operational host executing VSDA 542 running VM heartbeat monitoring framework 600). If not, control passes to the master monitor node for appropriate backstop operations at block 1518. If operational, control passes to block 1516.

Figure 19:
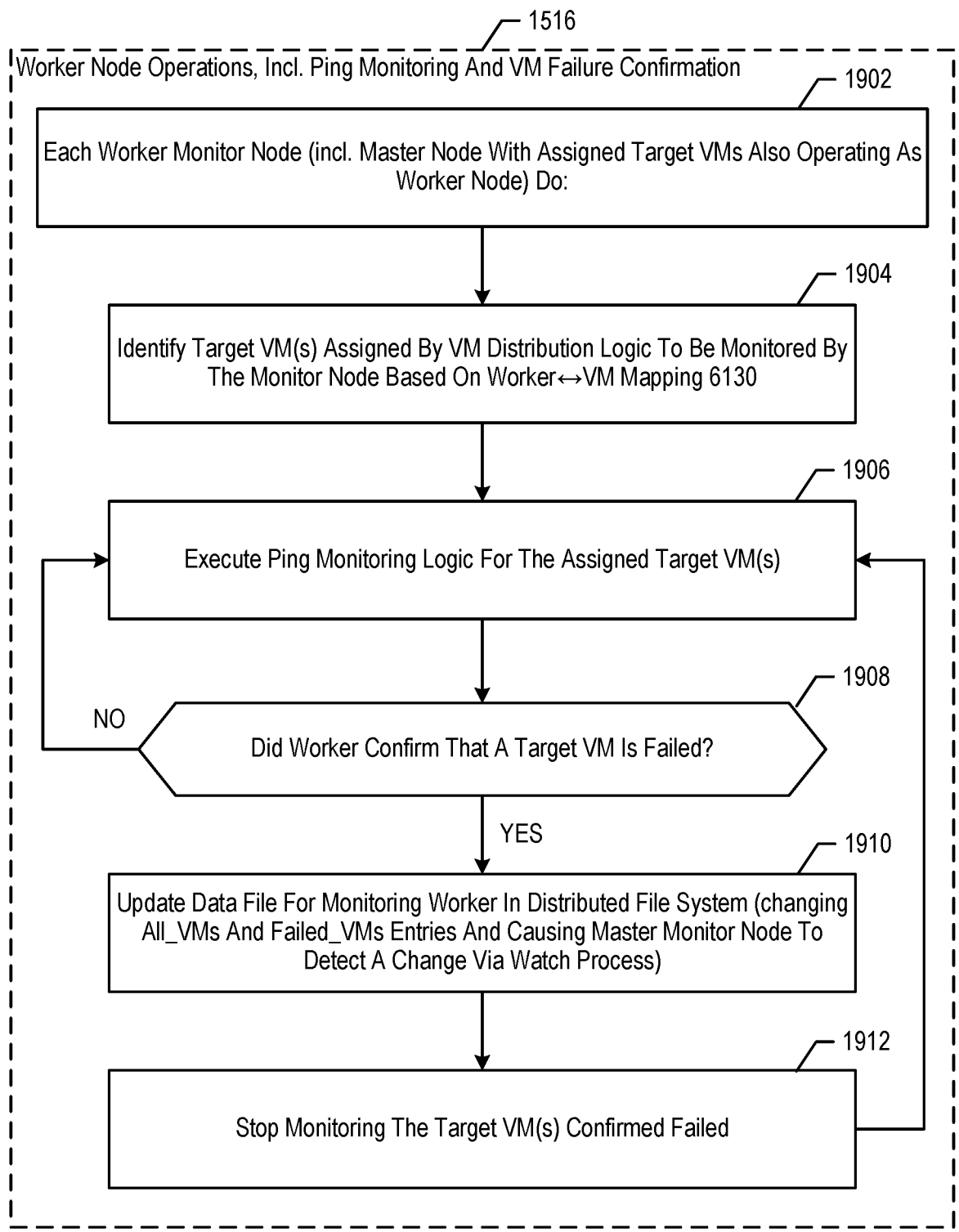
FIG. 19 is a flow chart illustrating certain salient operations in block 1516 of method 1500. Block 1516 is generally directed at operations performed by worker monitor nodes, including ping monitoring of target VMs and confirming whether target VMs have failed.
Figure 20A:
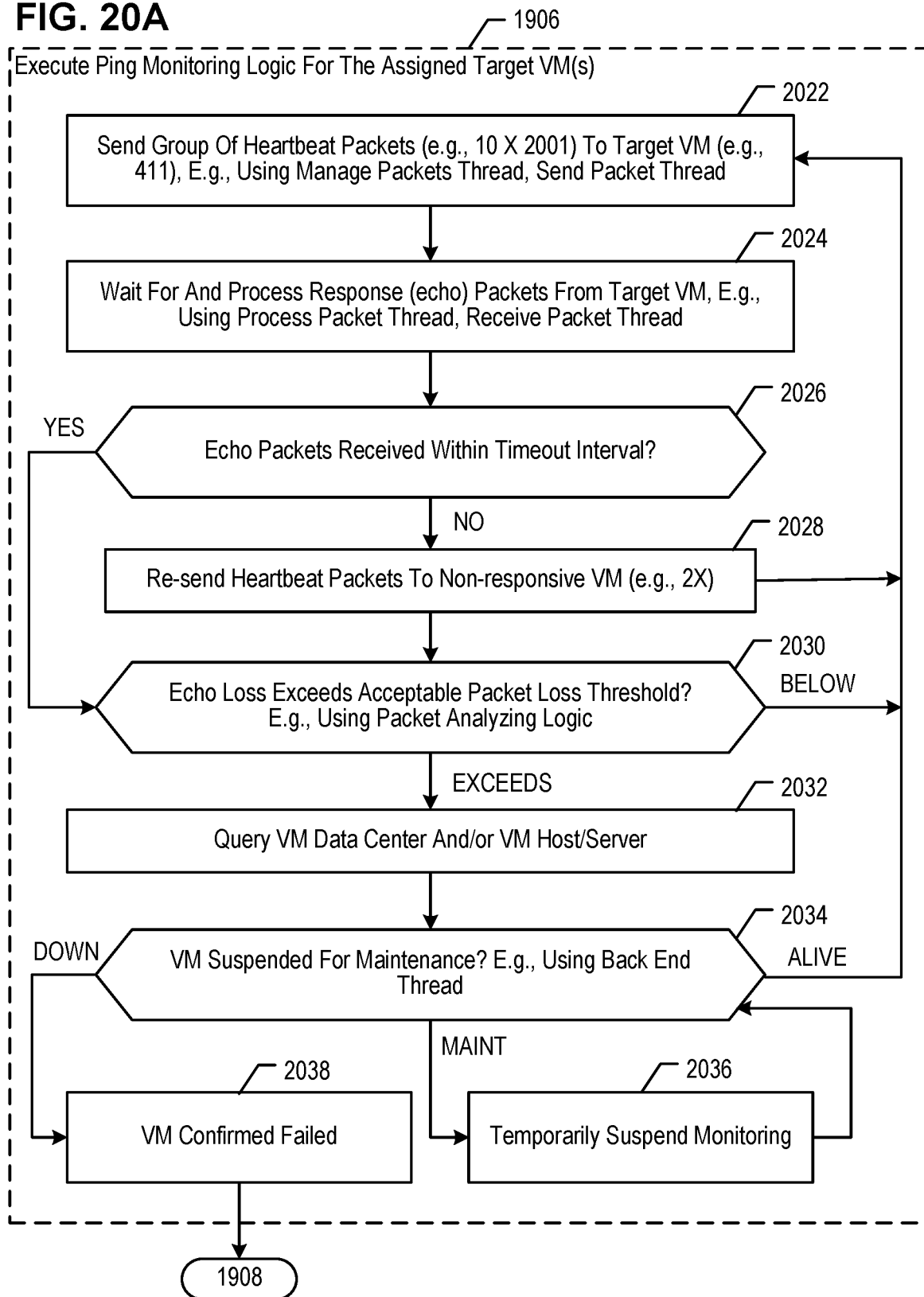
FIG. 20A is a flow chart illustrating certain salient operation in block 1906 of method 1500.

Block 1516 comprises operations executed by each worker monitor node (including worker operations performed by a master monitor node that is also configured as a worker), including ping monitoring of target VMs and VM failure confirmation—as described in further detail in another figure herein (see, e.g., FIGS. 19, 20A).

Figure 21:
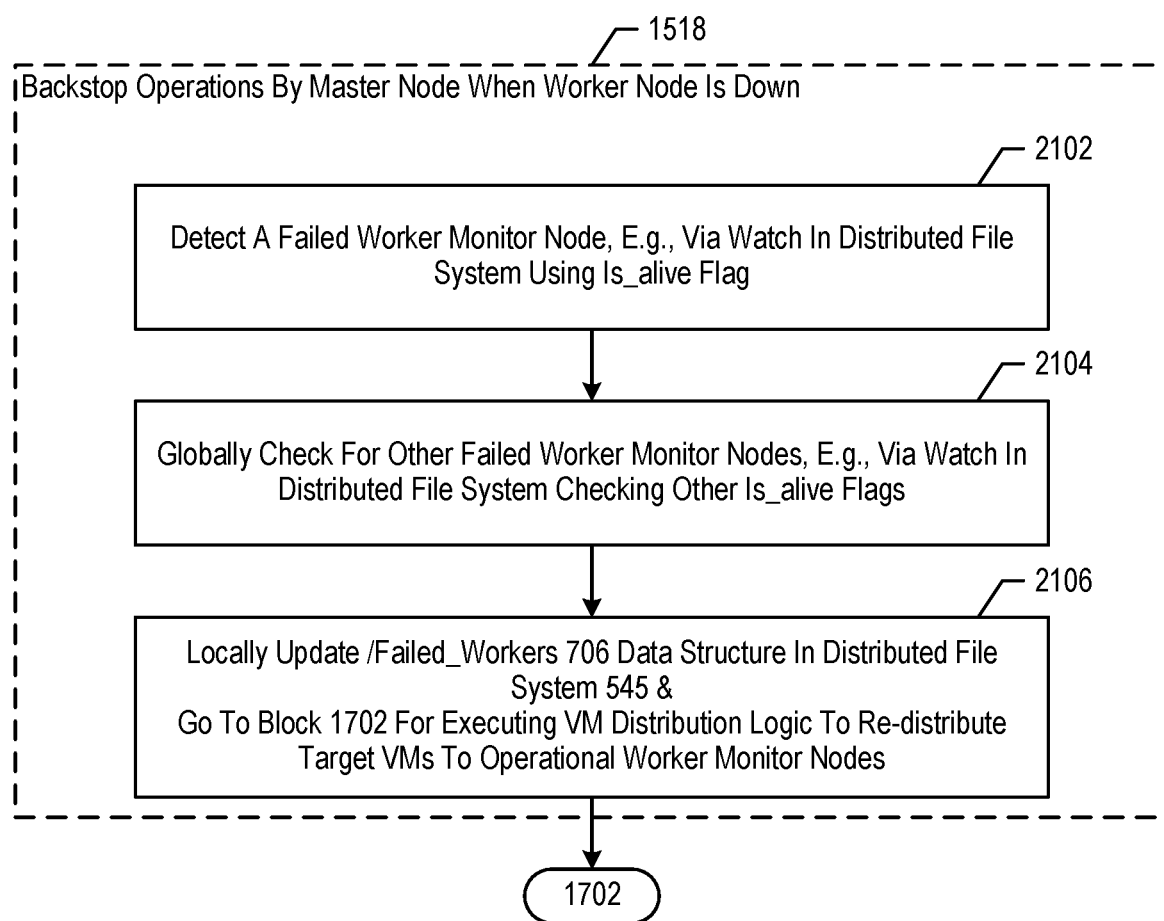
FIG. 21 is a flow chart illustrating certain salient operations in block 1518 of method 1500.

Block 1518 comprises so-called backstop operations performed by the master monitor node when one or more worker monitors node are down—as described in further detail in another figure herein (see, e.g., FIG. 21).

The present figure provides only an illustrative framework for VM heartbeat monitoring for initiating failover and/or failback operations in a data storage management system. A number of variations are contemplated, depending on the actual configuration of the system in which method 1500 executes, e.g., 300, 1100, 1200, 1300, 1400, etc. without limitation. Although the term "failover" is used here, it is to be understood that failback operations are also included when a target VM at a former destination data center fails back to a VM in the former source data center. Thus after switching roles, a failover destination is the failback source and a failover source is the failback destination.

Figure 16:
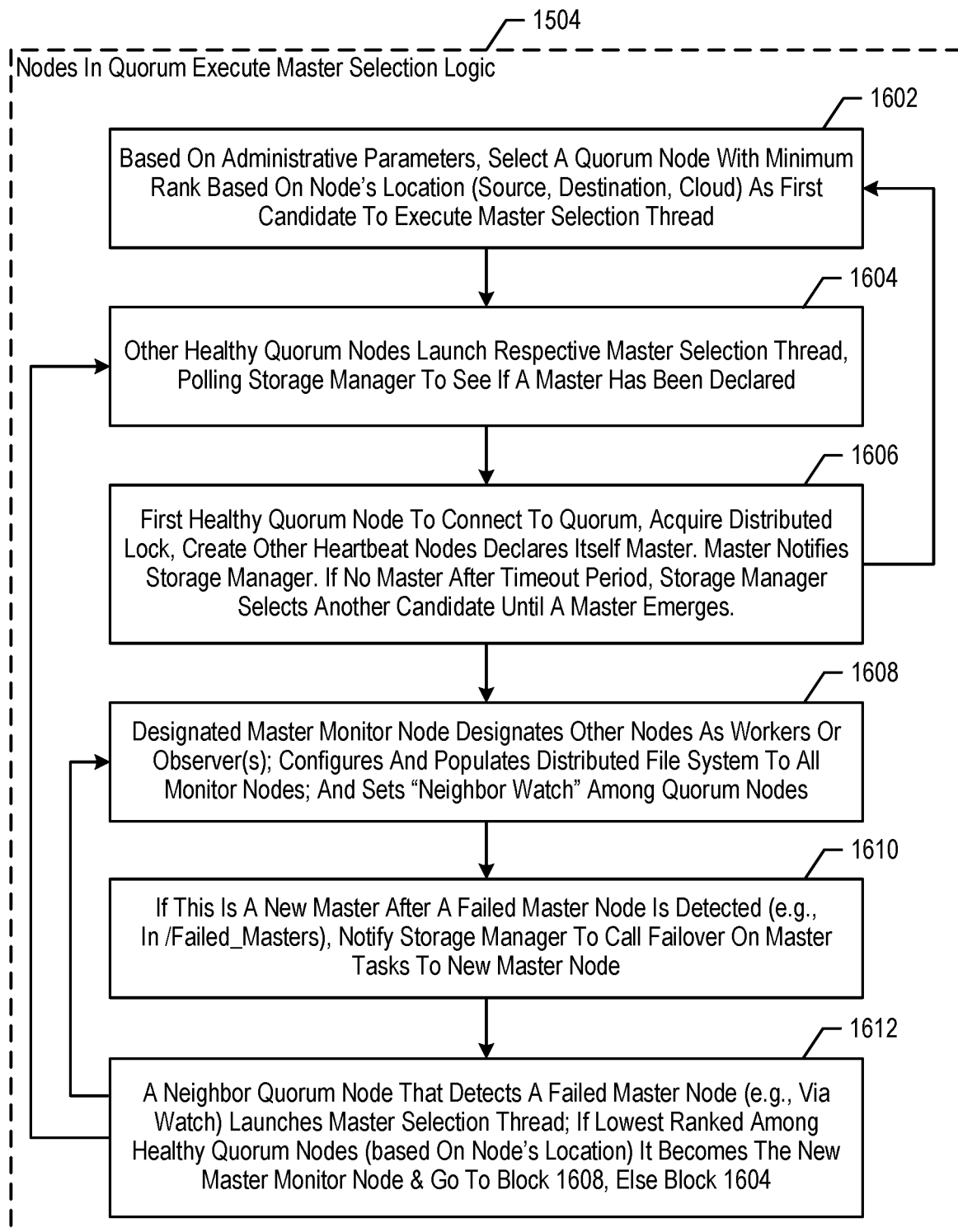
FIG. 16 is a flow chart illustrating certain salient operations of block 1504 in method 1500.

FIG. 16 is a flow chart illustrating certain salient operations of block 1504 in method 1500. Block 1504 is generally directed at master selection logic being executed by quorum 440 member nodes (e.g., 410, 1310, 1410).

At block 1602, based on administrative parameters in storage manager 340 (e.g., stored in management database 346) in which certain nodes were designated to be part of quorum 440, a quorum node is selected that has minimum rank based on the node's location (source, destination, cloud) to execute a master selection thread. Illustratively, storage manager 340 finds a quorum node with a minimum rank (i.e., at the source data center) and notifies it to begin executing a master selection thread, thus becoming the first master candidate. As noted earlier, a quorum node can run on a nonvirtualized computing device (e.g., 410-2), or on a VM (e.g., 410-1, 1310, 1410), without limitation. The selected node may or may not ultimately emerge as the master monitor node, as described below. The rank is computed based on the location of the selected candidate—a candidate in the source data center has a lower rank than candidates in the destination data center 302 or cloud 303, and therefore for an operational source data center, the first master candidate will be located at the source data center, e.g., 301. If there are several candidates at the source data center, storage manager 340 will arbitrarily choose one as the first candidate according to an illustrative embodiment, but the invention is not so limited.

At block 1604, other healthy designated quorum nodes launch a respective master selection thread after the first candidate node launched its master selection thread. Additionally, they will also poll storage manager 340 to see if a master has already been elected. If a master has been established, these other quorum nodes back off, terminating the master selection thread; otherwise, they continue to process the master selection thread until the master has been elected. Electing a master node within a quorum is an Apache ZooKeeper feature well known in the art. However, polling storage manager 340 to determine whether a new master has emerged is not provided by Apache Zookeeper.

At block 1606, a first healthy quorum node to connect to quorum 440 and acquire a distributed lock is tentatively elected master according to Apache ZooKeeper functionality. On confirmation with storage manager 340 that the tentative master also has a lowest rank (see block 1602), the tentative master declares itself master also according to Apache ZooKeeper techniques. The declared master notifies storage manager 340 of its master status, which is captured in management database 346. As above, communications with storage manager 340 and storage manager operations are not provided by Apache Zookeeper.

Storage manager 340 maintains a timer measuring elapsed time since it picked the first candidate master at block 1602. If after a pre-defined timeout period no master has declared itself, storage manager 340 selects another candidate by passing control back to block 1602. After the master has been declared, control passes to block 1608.

At block 1608, the designated master monitor and proceeds to designate other heartbeat monitor nodes as worker nodes or observer nodes; configures and populates distributed file system 545 to all monitor nodes; and sets "neighbor watch" processes or "adjacent watch") among quorum nodes (see, e.g., FIG. 9). Configuring distributed file system 545 so that it comprises information useful for VM heartbeat monitoring is a feature of the illustrative embodiment. However, designating nodes as workers or observers, populating distributed file system 545 to other monitor nodes, and setting watch processes is performed according to Apache ZooKeeper techniques that are known in the art.

At block 1610, if the present master is newly established after a failed master node is detected (e.g., in/Failed_Masters), the present master monitor node notifies storage manager 340 to call failover on pending master tasks. Accordingly, storage manager 340 assigns tasks that are pending from the failed master node to the newly declared master monitor node, according to the illustrative embodiment—thus managing a failover of master tasks to the newly declared master.

At block 1612, a "neighbor" (or adjacent) quorum node that detects a failed master node (e.g., via watch) launches a master selection thread within itself. If the present "neighbor" (or adjacent) quorum node has the lowest rank among healthy quorum nodes (based on node's location as in block 1602) it becomes the new master monitor node and control passes back to block 1608; otherwise control passes to block 1604 for other quorum nodes to vie for master role.

Eventually, a lowest-rank node in a still-operational source data center would become the new master monitor node. On the other hand, if the source data center has catastrophically failed, the node scoring the lowest rank would likely be in the destination data center, which is the failover destination.

FIG. 17 is a flow chart illustrating some salient details of block 1510 in method 1500. In general, block 1510 is directed at the operations performed by a heartbeat monitor node (e.g., 410, 1310, 1410) in its role as master monitor node in quorum 440.

At block 1702, the master monitor node executes VM distribution logic (e.g., 608), resulting in a worker-to-VM mapping 6130. Master monitor node updates heartbeat monitoring distributed file system 545 accordingly, e.g., updating target VM lists for each heartbeat monitor node (e.g., in data structure 802 of a data file 712). This operation generally occurs only when changes are detected (e.g., via watch), such as at the initial system configuration, on the election of a new master monitor node, if a worker monitor node is down, when new production VMs are put in service, etc.

At block 1704, which is a decision point, the master monitor node determines whether it received confirmation of failed target VM from a worker node, e.g., via watch in distributed file system 545 (see, e.g., FIG. 9 and block 1910). Confirmation of a failed target VM is generally required according to the illustrative embodiments, to ensure that failovers are called judiciously. Worker monitor nodes are responsible for confirming that target VMs are really in a failed state (see, e.g., FIG. 19). If no such confirmation is received, the master monitor node takes no action, and control loops back to the start of block 1704. When confirmation of a failed VM is received from a worker monitor node—using the watch system over distributed file system 545—control passes to block 1706. Notably, the watch system ensures that a master monitor node that also operates as a worker node receives suitable notification from the watch process over the co-resident worker—see, e.g., FIG. 9.

At block 1706, the master monitor node takes the opportunity to further check globally for other failed target VMs, e.g., via watch in distributed file system 545. Accordingly, the master monitor node assembles a list of all target VMs that are confirmed failed by their respective heartbeat monitor node.

At block 1708, having assembled a list of one or more target VMs that are conformed failed, the master monitor node notifies storage manager 340 to call failover (or failback) for all the one or more confirmed failed target VMs. As noted elsewhere herein, upon receipt of the notification from the master monitor node, storage manager (e.g., 340, 1410) undertakes the management of failing over (or failback) of the confirmed failed VMs 411, e.g., activating the replica VMs 421 at destination data center 302, or at second cloud region 1303-2, etc. Managing VM failover by a storage manager such as 340, 1410 is well known in the art—after receiving notice from the master monitor node according to the illustrative embodiments.

FIG. 18 is a flow chart illustrating certain VM distribution rules 6122 applied by VM distribution logic 608, when illustratively executed by the master monitor node, e.g., at block 1702.

At block 1802, VM distribution logic 608 identifies a monitor node designated as a worker (e.g., in source data center)—in round-robin fashion until each target VM has an assigned worker monitor node.

Block 1804 starts a loop: each target VM to be monitored execute blocks 1806 through 1808 (as appropriate).

At block 1806, which is a decision point, VM distribution logic 608 determines whether the present target VM is on the same VM network (as configured in the network adapter) AND host server as the identified worker monitor node. If yes, control passes to block 1818; otherwise, control passes to block 1808.

At block 1808, which is a decision point, VM distribution logic 608 determines whether the present target VM is on the same VM network (as configured in the network adapter) as the identified worker monitor node. If yes, control passes to block 1818; otherwise, control passes to block 1810.

At block 1810, which is a decision point, VM distribution logic 608 determines whether the present target VM is hosted by same server computing device as the identified worker monitor node. If yes, control passes to block 1818; otherwise, control passes to block 1812.

At block 1812, which is a decision point, VM distribution logic 608 determines whether the hop count from the identified worker monitor node to the present target VM is lower than from other monitor nodes (e.g., less than 10 hops). If yes, control passes to block 1818; otherwise, control passes to block 1814.

At block 1814, VM distribution logic 608 determines whether the present target VM is on the same subnet as defined in the IP address as the identified worker monitor node. If yes, control passes to block 1818; otherwise, control passes to block 1816.

At block 1816, which is a decision point, VM distribution logic 608 determines whether the round-trip ping latency from the identified worker monitor node to the present target VM is below an acceptability threshold. The acceptability threshold depends on the implemented network topography and will be administered as a parameter in management database 346. If not, the identified worker monitor node is deemed unsuitable for the present target VM and control passes back to block 1802 to identify another worker monitor node candidate; otherwise, control passes to block 1818.

At block 1818, VM distribution logic 608 (executed by the master monitor node) assigns the present target VM to the identified worker monitor node, e.g., filling in worker-to-VM mapping 6130. VM distribution logic 608 (executed by the master monitor node) transmits the assignment to storage manager 340, wherein the information is stored to management database 346.

FIG. 19 is flow chart illustrating certain salient operation in block 1516 of method 1500. Block 1516 is generally directed at operations performed by worker monitor nodes, including ping monitoring of target VMs and confirming whether target VMs have failed.

At block 1902, each worker monitor node (incl. a master node with assigned target VMs also operating as a worker node) performs blocks 1904 through 1912.

At block 1904, the present worker monitor node identifies one or more target VM(s) (e.g., 411) assigned thereto by VM distribution logic 608, based on worker-to-VM mapping 6130 information reflected in data structure 802 (see, e.g., FIG. 8).

At block 1906, the present worker monitor node executes ping monitoring logic 610 relative to the assigned target VM(s) (e.g., 411). This includes continuously sending customized packets to each target VM, waiting for a responsive packet, analyzing the response, if any, and provisionally determining that the target VM has failed when no response is received, followed by confirmation. More details are given in other figures herein (see, e.g., FIGS. 20, 20A).

At block 1908, which is a decision point, the present worker monitor node passes control back to block 1906 to continue pinging working target VMs; if the present worker monitor node has confirmed that one or more of its target VMs have failed, control passes to block 1910. Threads operate concurrently as appropriate to continue pinging working VMs and to react to failed target VMs.

At block 1910, the present working monitor node updates data file 712 in distributed file system 545 at corresponding FS-node 722, e.g., updating the assigned VM target list and/or VMs confirmed failed in data structure 802 (see, e.g., "All_VM List" and "Failed_VM List" in FIG. 8). The change to data file 712 will be detected by watch processes and the change will be promulgated by the underlying Apache ZooKeeper infrastructure 601. Accordingly, the master monitor node will become aware of the status change(s) of the failed VMs such as via watch process 922 (see, e.g., FIG. 9 and block 1704).

At block 1912, the present worker monitor node stops monitoring the target VM(s) confirmed failed the present worker monitor continues ping monitoring of healthy target VMs.

FIG. 20 is a block diagram depicting an illustrative heartbeat packet 2001 for pinging a target VM by a heartbeat monitor node designated as a worker node, e.g., 410, 1110, 1310, 1410.

The illustrative heartbeat packet 2001 that is transmitted to target VMs by each worker monitor node is a lightweight modified Internet Control Message Protocol (ICMP) Echo requests/reply message packet, preferably 12 bytes in size. The illustrative embodiments leverage the ICMP protocol structure to send/receive heartbeat packets.

Any machine (e.g., target VM 411) that receives an echo request such as packet 2001 formulates an echo reply packet (not shown) and returns it to the original sender, e.g., worker monitor node. The echo request and associated reply are used to test whether a target VM is reachable and responding. Because both the request packet and reply packet travel in IP datagrams, successful receipt of a reply verifies that major pieces of the transport system work. First, IP software on the source computer (e.g., worker monitor node) must route the datagram. Second, intermediate routers between the source and target VM must be operating and must route the datagram correctly. Third, the target VM must be running (or at least respond to interrupts), and both ICMP and IP software must be working. Finally, all routers along the return path must have correct routes.

ICMP protocol. TYPE in the ICMP message protocol represents echo request/echo reply message. The echo request is type 8 when sender sends to destination. When a target VM receives a type 8, it replies with a type 0. When the reply is sent, the source and destination addresses in the packet switch places as well. After both of those changes, the CHECKSUM is recomputed, and the reply packet is sent. There is only one CODE for both of these types, and is always set to 0. IDENTIFIER is set in the request packet 2001, and echoed back in the reply packet, to be able to keep different ping requests and replies together. IDENTIFIER is set as unique key of process ID. SEQUENCE NUMBER— The sequence number for each host. DATA comprises optional content.

According to the illustrative embodiments the heartbeat packet 2001 is filled with the following information. TYPE-8 for ICMP Echo and 0 for ICMP Echo reply (1 byte). CODE always set to 0 (1 byte). CHECKSUM is computed for each packet (2 bytes). IDENTIFIER (2 bytes): the process ID low (& operation of (Process ID, 0xFFFF flag)). SEQUENCE NUMBER (2 bytes) generally starts from 1 and is incremented by one for each packet. DATA (4 bytes) comprises the packet number and the same packet number is validated in the echo reply packet, thus tracking of all the heartbeat packets sent.

Other implementations of the heartbeat packet 2001 and of corresponding echo reply packets are possible in alternative embodiments without limitation.

FIG. 20A is a flow chart illustrating certain salient operation in block 1906 of method 1500. Block 1906 is generally directed at ping monitoring operations, including ping monitoring logic 610 executed by worker monitor nodes. The illustrative heartbeat packets 2001 transmitted by worker monitor nodes towards their target VMs are described in more detail in FIG. 20.

Illustratively, ping monitoring logic 610 comprises a number of features, executed by corresponding threads— illustratively five threads running in parallel to accomplish the monitoring of target VMs: Send Packet Thread, Process Packet Thread, Receive Packet Thread, Manage Packet Thread and Back End Thread. Additional details are given in U.S. Provisional Patent Application Ser. No. 62/402,269, filed on Sep. 30, 2016 and entitled "Heartbeat Monitoring of Virtual Machines for Initiating Failover Operations in a Data Storage Management System," which is incorporated by reference herein.

Illustratively, ping monitoring logic 610 uses non-blocking sockets to send/receive heartbeat packets (e.g., 2001) continuously and concurrently to optimize packet distribution across VMs efficiently. Advantageously, shorter wait times are achieved when there is a network partition and VMs are not responsive. Statistics on packets are maintained in a synchronized map (e.g., Ping Stats map—not shown here). All the above threads constantly communicate with the synchronized map to update/get/remove packet entries therein. There are also, illustratively, three separate event queues (not shown here) for communication between threads: Send Queue—send VM packets constantly through send ( )non-blocking socket; Receive Queue—receives echo reply packets continuously from the VMs; and Wait Queue—puts any maintenance VMs in wait state.

Heartbeat packets (e.g., 2001) are filled in the Send Queue by the Manage Packet Thread. In a first round, the first heartbeat packet for each target VM are sent. In the next iteration, the second heartbeat packet for each target VM are sent. This iterative process repeats until a last (preferably tenth) round of transmissions is completed, without limitation. By using this technique, pings are distributed to all target VMs with reduced wait times and not ignoring any target VMs. The ping monitoring threads are described in more detail next.

Send Packet Thread runs continuously and picks up the packets to be sent to target VMs from the Send Queue; constructs heartbeat packets (e.g., 2001) and sends heartbeat packets continuously through send 0 non-blocking socket. It also updates packet statistics in the synchronized map. Each heartbeat packet sent out via the non-blocking socket is tracked in the synchronized map.

Process Packet Thread runs continuously and constantly listens to the recv ( ) non-blocking socket forming an event loop. Whenever a responsive echo reply packet arrives to the socket, this thread picks it up and puts in the Receive Queue. If the socket is suddenly closed, this thread re-opens the non-blocking socket to continue monitoring.

Receive Packet Thread runs continuously and picks up echo reply packets put in the Receive Queue. It unpacks each echo reply packet and validates the receive times of echo reply packets and updates the synchronized map. If the echo reply packet arrives within a pre-defined maximum packet timeout period, then the packet's entries in the synchronized map are deleted; otherwise (arrival past the timeout period) the packet's entries are updated in the synchronized map for the Manage Packet Thread to analyze.

Manage Packets Thread runs continuously. This thread initially receives the worker monitor node's list of target VMs. Manage Packets Thread fills the Send Queue as described above. Manage Packets Thread in between each fill also analyzes by using Packet Analyzing Logic, described in more detail below.

Back End Thread runs in the background to refrain from heartbeat monitoring certain VMs if a maintenance timeout is set for the respective target VM (e.g., set by a user)—so-called "maintenance VMs." The Back End Thread temporarily pauses the monitoring of maintenance VMs by placing them into a wait queue. A timer is started for each maintenance VM and when the timer expires, these VMs are no longer considered to be under maintenance and are put back to the main queue for heartbeat monitoring. The parent Back End Thread will create child threads for each maintenance VM and starts a corresponding timer for each one. The Back End Thread is useful when a user wants to refrain from monitoring target VMs while performing maintenance thereupon.

Packet Analyzing Logic. Entries in the synchronized map illustratively comprise: destination VM IP address, packet number, start time, end time, and maximum timeout for each heartbeat packet (e.g., 2001). These are filled in by the Send Packet Thread. Whenever the echo reply packet arrives after the timeout period or no echo reply packet is received at all, the illustrative Receive Packet Thread does not delete the packet's entries in the synchronized map. The illustrative Manage Packets Thread analyzes the packet by computing the number of rows in the synchronized map divided by the actual number of heartbeat packets sent to the target VM. If this ratio is less than a predefined packet loss threshold then the VM is considered to be alive (at least from the perspective of heartbeat monitoring logic). Example: (number of packet rows for each VM)/(number of heartbeat packets sent to the VM)<Max_packet_loss_threshold➔ VM is alive.

Illustratively, the Max_packet_loss_threshold is initialized to 75%, thus allowing for up to 75% packet loss for the given target VM. If the packet loss percentage exceeds this threshold, the ping monitoring logic assumes that the target VM is not reachable and the Manage Packets Thread confirms the given VM's status by illustratively querying the VM data center and/or the VM's host/server (e.g., 401) to check the VM's power state. If the VM power state is confirmed to be offline then the target VM is considered to be down. The Manage Packets Thread updates this down state to the worker monitor node (e.g., by updating data structure 802 in the /Worker FS-node of distributed file system 545); in turn, this change is picked up by the watch process 922 of the/Master FS-node, and cause the master monitor node to notify storage manager 340 to call failover of the given VM (e.g., block 1708). On the other hand, if the query response from the VM data center and/or VM host/server indicates that the given target VM is online, then the Manage Packets Thread treats the unresponsiveness as a false alarm and heartbeat monitoring continues.

The flow chart in the present figure comprises the following operations, without limitation. Since the disclosed threads run on an ongoing basis and concurrently in any given worker monitor node, the operations shown in the flow chart are not to be taken as exclusively sequential and are to be read in light of the thread descriptions given in the abovementioned paragraphs, and in further light of the ping monitoring system architecture depicted and described in U.S. Provisional Patent Application Ser. No. 62/402,269, filed on Sep. 30, 2016 and entitled "Heartbeat Monitoring of Virtual Machines for Initiating Failover Operations in a Data Storage Management System," which is incorporated by reference herein.

At block 2022, groups of heartbeat packets (e.g., groups of ten packets 2001) are transmitted to each of the monitor node's target VMs (e.g., 411), e.g., using the Manage Packets Thread, and the Send Packet Thread. (e.g., {target1, packet1}, {target2, packet1}, {target3, packet1} . . . {target1, packet10}, {target2, packet10}, and {target3, packet10}).

At block 2024, ping monitoring logic 610 waits for and processes responsive echo reply packets arriving from target VMs in response to the groups of packets transmitted thereto at block 2022, e.g., using the Process Packet Thread, and the Receive Packet Thread.

At block 2026, which is a decision point, the Packet Analyzing Logic determines whether one or more (as many as ten, illustratively) responsive echo reply packets were received from a given target VM within a predefined timeout interval, e.g., five seconds. If so, the target VM is deemed to be operational and control passes to block 2030 to compute the response rate. Otherwise, when no responses are received from a given target VM, control passes to block 2028 to enable retries.

At block 2028, a group of heartbeat packets (e.g., ten packets 2001) is re-sent to the non-responsive VM to begin a process of confirming whether the given VM is alive or down. The number of re-sends is up to the implementers and the invention is not so limited. Illustratively, two re-sends are used, each followed by the pre-defined timeout interval (e.g., five seconds). Thus, control passes back to block 2022.

At block 2030, which is a decision point, the illustrative Packet Analyzing Logic determines whether as to a given target VM the packet response (echo) loss rate exceeds a predefined packet loss threshold considered to be acceptable (e.g., 75%). The illustrative threshold thus allows for substantial (e.g., 75%) packet loss in responding to VM heartbeat packets, resulting from a number of scenarios, such as heartbeat packets 2001 never reaching the target VM, target VMs being slow to respond, echo packets getting lost, or the target VM has failed altogether. If the packet loss rate falls below the predefined loss threshold (e.g., 50% loss rate <75% threshold), then the target VM is deemed to be operational and (at least superficially) healthy from the perspective of heartbeat monitoring, and therefore control passes back to block 2022 for continued heartbeat monitoring. Otherwise, when the packet loss rate exceed the generous acceptability threshold (e.g., 90% loss rate >75% threshold), further confirmatory action is needed and control passes to block 2032. The illustrative synchronization map is maintained here by the illustrative Packet Analyzing Logic.

At block 2032, ping monitoring logic 610 seeks to confirm a given target VM's power status by directly querying the given VM's infrastructure, e.g., VM data center and/or VM host/server (e.g., 401). Queries to and status responses from VM infrastructure are well known in the art, e.g., querying a hypervisor.

At block 2034, which is a decision point, ping monitoring logic 610, e.g., using Back End Thread, analyzes response(s) received from the VM infrastructure to determine whether the given VM is currently suspended for maintenance, typically suspended by user intervention. If the given VM is reportedly suspended for maintenance, control passes to block 2036. If the given VM is reported down (offline, dead, non-operational), the Back End Logic classifies the VM as failed and control passes to block 2038. Situations arise when the VM infrastructure reports the given VM to be alive (online, operational) despite the unacceptable (above-threshold) packet loss rate as determined at block 2030. Accordingly, the illustrative embodiments treat the VM as alive and control passes back to block 2022 for continued heartbeat monitoring. In alternative embodiments, the given VM is treated as unhealthy based on the excessive echo packet loss rate and control passes to block 2038.

At block 2036, when the given VM is reportedly suspended for maintenance, Back End Logic sets a timer to await the end of maintenance. Meanwhile, heartbeat monitoring (e.g., blocks 2022, 2024, etc.) is suspended and upon timer expiration control passes back to block 2034. According to the illustrative embodiments these timers may be renewed.

At block 2038, when the given VM is confirmed failed (or treated as such), control passes from block 1906 to block 1908 for confirming the VM failure to the master monitor node (so that it can notify storage manager 340 to call failover for the failed VM). When a worker node confirms a VM as failed (or treats it as such), the worker node updates its entry in data structure 802 (Failed_VM list), which change is detected by the master monitor node using a watch process 922.

FIG. 21 is a flow chart illustrating certain salient operations in block 1518 of method 1500. Block 1518 is generally directed at operations performed by the master monitor node when a worker monitor node has failed—so-called backstop operations.

At block 2102, the master monitor node detects a failed worker monitor node, e.g., via watch process 924 over the given worker node's /Is_alive flag 724 in distributed file system 545. See also FIG. 9.

At block 2104, the master monitor node further makes a global check for other failed worker monitor nodes, e.g., via watch process 924 over /Is_alive flags 724 in distributed file system 545.

At block 2106, the master monitor node locally updates the/Failed_Workers 706 data structure in its local instance of distributed file system 545 to indicate which of the worker monitor nodes are in a failed state. After this, control passes to block 1702 (within block 1510) for executing VM distribution logic to re-distribute target VMs to operational worker nodes and away from the non-operational worker node(s) detected above.

According to the illustrative embodiments, VMs that operate as worker nodes are not monitored, in order to reserve computational resources for monitoring important production VMs, but the invention is not so limited. Therefore, in some alternative embodiments, the master monitor node could be configured to monitor worker nodes.

The enumerated functionality above is presented without limitation, and it will be understood by those having ordinary skill in the art, after reading the present disclosure, that substantial additional functionality is enabled by the disclosed architecture herein. In regard to the figures included and described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

According to an illustrative embodiment of the present invention, a method comprising: receiving, by a first data agent configured as a master monitor node in a data storage management system, a first notice of a first virtual machine that is confirmed failed, wherein the first data agent is in communication with a storage manager that manages storage management operations in the data storage management system, and wherein the first data agent executes on one of (i) a nonvirtualized computing device comprising one or more processors and computer memory, and (ii) a first virtual machine executing on a computing device comprising one or more processors and computer memory and executing a hypervisor; based on the first notice, checking, by the master monitor node, whether other virtual machines are also confirmed failed; and notifying, by the master monitor, the storage manager to call failover for the first virtual machine and any of the other virtual machines that are also confirmed failed based on the checking.

The above-recited method further comprising: managing, by the storage manager, a failover operation for the first virtual machine, wherein the failover operation activates a second virtual machine located in a second data center to operate in place of the failed first virtual machine located in a first data center. The above-recited method further comprising: managing, by the storage manager, a failover operation for the first virtual machine, wherein the failover operation activates a second virtual machine located in a second region of a cloud service provider to operate in place of the failed first virtual machine located in a first region of a cloud service provider. The above-recited method further comprising: managing, by the storage manager, a failover operation for the first virtual machine, wherein the failover operation activates a second virtual machine to operate in place of the failed first virtual machine, wherein prior to the failover operation, the storage manager managed a replication operation of the first virtual machine to the second virtual machine. The above-recited method further comprising: managing, by the storage manager, a failover operation for the first virtual machine, wherein the failover operation activates a second virtual machine to operate in place of the failed first virtual machine, wherein prior to the failover operation, the storage manager managed a live synchronization operation of the first virtual machine to the second virtual machine. The above-recited method wherein the first notice of the first virtual machine being confirmed failed is received by the master monitor node from a second data agent configured as a worker monitor node in the data storage management system, and wherein the second data agent executes on one of (i) a nonvirtualized computing device comprising one or more processors and computer memory, and (ii) a first virtual machine executing on a computing device comprising one or more processors and computer memory and executing a hypervisor. The above-recited method wherein the first data agent is also configured to operate as a first worker monitor node which performs heartbeat monitoring of the first virtual machine and generates the first notice of the first virtual machine being confirmed failed.

According to another illustrative embodiment, a computer-readable medium, excluding transitory propagating signals, storing instructions that, when executed by a computing device, cause the computing device to perform operations comprising: receiving, by a first data agent configured as a master monitor node, a first notice of a first virtual machine that is confirmed failed, wherein the first data agent is in communication with a storage manager that manages storage management operations in a data storage management system, and wherein the first data agent executes on the computing device comprising one of: (i) one or more processors and computer memory, and (ii) a first virtual machine hosted by a hypervisor executing on one or more processors and computer memory; based on the first notice, checking, by the master monitor node, whether other virtual machines are also confirmed failed; and notifying, by the master monitor, the storage manager to call failover for the first virtual machine and any of the other virtual machines that are also confirmed failed based on the checking.

The above-recited computer-readable medium further comprising: managing, by the storage manager, a failover operation for the first virtual machine, wherein the failover operation activates a second virtual machine located in a second data center to operate in place of the failed first virtual machine located in a first data center. The above-recited computer-readable medium further comprising: managing, by the storage manager, a failover operation for the first virtual machine, wherein the failover operation activates a second virtual machine located in a second region of a cloud service provider to operate in place of the failed first virtual machine located in a first region of a cloud service provider. The above-recited computer-readable medium further comprising: managing, by the storage manager, a failover operation for the first virtual machine, wherein the failover operation activates a second virtual machine to operate in place of the failed first virtual machine, wherein prior to the failover operation, the storage manager managed a replication operation of the first virtual machine to the second virtual machine. The above-recited computer-readable medium further comprising: managing, by the storage manager, a failover operation for the first virtual machine, wherein the failover operation activates a second virtual machine to operate in place of the failed first virtual machine, wherein prior to the failover operation, the storage manager managed a live synchronization operation of the first virtual machine to the second virtual machine. The above-recited computer-readable medium wherein the first notice of the first virtual machine being confirmed failed is received by the master monitor node from a second data agent configured as a worker monitor node in the data storage management system, and wherein the second data agent executes on one of (i) a nonvirtualized computing device comprising one or more processors and computer memory, and (ii) a first virtual machine executing on a computing device comprising one or more processors and computer memory and executing a hypervisor. The above-recited computer-readable medium wherein the first data agent is also configured to operate as a first worker monitor node which performs heartbeat monitoring of the first virtual machine and generates the first notice of the first virtual machine being confirmed failed.

According to yet another illustrative embodiment, a system for assigning virtual machines as targets for heartbeat monitoring by heartbeat monitor nodes in a data storage management system, the system comprising: a first data agent that executes on a computing device comprising one of: (i) one or more processors and computer memory, and (ii) a first virtual machine hosted by a hypervisor executing on one or more processors and computer memory, wherein the first data agent is configured to operate as a master monitor node in the data storage management system, and wherein the first data agent is in communication with a storage manager that manages storage management operations in the data storage management system; and wherein the master monitor node is configured to: receive a first notice of a first virtual machine that is confirmed failed, based on the first notice, check whether other virtual machines are also confirmed failed, and notify the storage manager to call failover for the first virtual machine and any of the other virtual machines that are also confirmed failed based on the check operation.

The above-recited system further comprising: managing, by the storage manager, a failover operation for the first virtual machine, wherein the failover operation activates a second virtual machine located in a second data center to operate in place of the failed first virtual machine located in a first data center. The above-recited system further comprising: managing, by the storage manager, a failover operation for the first virtual machine, wherein the failover operation activates a second virtual machine located in a second region of a cloud service provider to operate in place of the failed first virtual machine located in a first region of a cloud service provider. The above-recited system further comprising: managing, by the storage manager, a failover operation for the first virtual machine, wherein the failover operation activates a second virtual machine to operate in place of the failed first virtual machine, wherein prior to the failover operation, the storage manager managed a replication operation of the first virtual machine to the second virtual machine. The above-recited system further comprising: managing, by the storage manager, a failover operation for the first virtual machine, wherein the failover operation activates a second virtual machine to operate in place of the failed first virtual machine, wherein prior to the failover operation, the storage manager managed a live synchronization operation of the first virtual machine to the second virtual machine. The above-recited system wherein the first notice of the first virtual machine being confirmed failed is received by the master monitor node from a second data agent configured as a worker monitor node in the data storage management system, and wherein the second data agent executes on one of (i) a nonvirtualized computing device comprising one or more processors and computer memory, and (ii) a first virtual machine executing on a computing device comprising one or more processors and computer memory and executing a hypervisor. The above-recited system wherein the first data agent is also configured to operate as a first worker monitor node which performs heartbeat monitoring of the first virtual machine and generates the first notice of the first virtual machine being confirmed failed.

According to another example embodiment a method comprising: configuring a first data agent as a master monitor node in a data storage management system, wherein the first data agent is in communication with a storage manager that manages storage management operations in the data storage management system, and wherein the first data agent executes on one of (i) a nonvirtualized computing device comprising one or more processors and computer memory, and (ii) a first virtual machine hosted by a hypervisor executing on a computing device comprising one or more processors and computer memory, and wherein the master monitor node comprises an instance of a distributed file system; configuring a second data agent as a first worker monitor node in a data storage management system, wherein the first worker monitor node performs heartbeat monitoring of a plurality of virtual machines assigned thereto by the master monitor node, wherein the second data agent executes on one of (i) a nonvirtualized computing device comprising one or more processors and computer memory, and (ii) a second virtual machine hosted by a hypervisor executing on a computing device comprising one or more processors and computer memory, and wherein the first worker monitor node comprises an instance of the distributed file system; detecting, by the master monitor node, based on a change in the distributed file system, that the first worker monitor node has failed; querying one of: (a) the nonvirtualized computing device, (b) the hypervisor that hosts the second virtual machine, and (c) a controller of a virtual machine data center comprising the second virtual machine about an operational status of the first worker monitor node; and if, responsive to the querying, the operational status of the first worker monitor node is reported to be failed, (I) updating a list of failed worker monitor nodes in the distributed file system, and (II) re-assigning, by the master monitor node, the plurality of virtual machines assigned to the failed first worker monitor node to a second worker monitor node in the data storage management system.

The above-recited method wherein after the re-assigning, the second worker monitor node performs heartbeat monitoring of the plurality of virtual machines assigned thereto by the master monitor node. The above-recited method wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system. The above-recited method wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system; and detecting, by the second worker monitor node, based on a change in the distributed file system, that the plurality of virtual machines have been re-assigned thereto. The above-recited method further comprising: if, responsive to the querying, the operational status of the first worker monitor node is reported to be failed, before the re-assigning of the plurality of virtual machines, (III) determining whether any of the plurality of virtual machines are also confirmed failed in the data storage management system, and (IV) notifying the storage manager to call failover for any of the plurality of virtual machines confirmed failed. The above-recited method further comprising: managing, by the storage manager, a respective failover operation for any of the plurality of virtual machines confirmed failed, wherein the respective failover operation activates a corresponding second virtual machine to operate in place of a failed first virtual machine. The above-recited method further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a replication operation of the first virtual machine to the second virtual machine. The above-recited method further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a live synchronization operation of the first virtual machine to the second virtual machine.

According to another example embodiment, a computer-readable medium, excluding transitory propagating signals, storing instructions that, when executed by a computing device, cause the computing device to perform operations comprising: configuring a first data agent as a master monitor node in a data storage management system, wherein the first data agent is in communication with a storage manager that manages storage management operations in the data storage management system, and wherein the first data agent executes on the computing device comprising one of: (i) one or more processors and computer memory, and (ii) a first virtual machine hosted by a hypervisor executing on one or more processors and computer memory, and wherein the master monitor node comprises an instance of a distributed file system; configuring a second data agent as a first worker monitor node in the data storage management system, wherein the first worker monitor node performs heartbeat monitoring of a plurality of virtual machines assigned thereto by the master monitor node, wherein the second data agent executes on one of (i) a nonvirtualized computing device comprising one or more processors and computer memory, and (ii) a second virtual machine hosted by a hypervisor executing on a computing device comprising one or more processors and computer memory, and wherein the first worker monitor node comprises an instance of the distributed file system; detecting, by the master monitor node, based on a change in the distributed file system, that the first worker monitor node has failed; querying one of: (a) the nonvirtualized computing device, (b) the hypervisor that hosts the second virtual machine, and (c) a controller of a virtual machine data center comprising the second virtual machine about an operational status of the first worker monitor node; and if, responsive to the querying, the operational status of the first worker monitor node is reported to be failed, (I) updating a list of failed worker monitor nodes in the distributed file system, and (II) re-assigning, by the master monitor node, the plurality of virtual machines assigned to the failed first worker monitor node to a second worker monitor node in the data storage management system.

The above-recited computer-readable medium wherein after the re-assigning, the second worker monitor node performs heartbeat monitoring of the plurality of virtual machines assigned thereto by the master monitor node. The above-recited computer-readable medium wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system. The above-recited computer-readable medium wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system; and detecting, by the second worker monitor node, based on a change in the distributed file system, that the plurality of virtual machines have been re-assigned thereto. The above-recited computer-readable medium further comprising: if, responsive to the querying, the operational status of the first worker monitor node is reported to be failed, before the re-assigning of the plurality of virtual machines, (Ill) determining whether any of the plurality of virtual machines are also confirmed failed in the data storage management system, and (IV) notifying the storage manager to call failover for any of the plurality of virtual machines confirmed failed. The above-recited computer-readable medium further comprising: managing, by the storage manager, a respective failover operation for any of the plurality of virtual machines confirmed failed, wherein the respective failover operation activates a corresponding second virtual machine to operate in place of a failed first virtual machine. The above-recited computer-readable medium further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a replication operation of the first virtual machine to the second virtual machine. The above-recited computer-readable medium further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a live synchronization operation of the first virtual machine to the second virtual machine.

According to yet another example embodiment, a system for assigning virtual machines as targets for heartbeat monitoring by heartbeat monitor nodes in a data storage management system, the system comprising: a first data agent that executes on a computing device comprising one of: (i) one or more processors and computer memory, and (ii) a first virtual machine hosted by a hypervisor executing on one or more processors and computer memory, wherein the first data agent is configured to operate as a master monitor node in the data storage management system, and wherein the first data agent is in communication with a storage manager that manages storage management operations in the data storage management system; and wherein the master monitor node comprises an instance of a distributed file system; a second data agent that executes on a computing device comprising one of: (i) one or more processors and computer memory, and (ii) a first virtual machine hosted by a hypervisor executing on one or more processors and computer memory, wherein the second data agent is configured to operate as a first worker monitor node in the data storage management system, and wherein the second data agent is in communication with a storage manager that manages storage management operations in the data storage management system; wherein the first worker monitor node comprises an instance of the distributed file system; wherein the master monitor node is configured to: detect, based on a change in the distributed file system, that the first worker monitor node has failed, query one of: (a) the nonvirtualized computing device, (b) the hypervisor that hosts the second virtual machine, and (c) a controller of a virtual machine data center comprising the second virtual machine about an operational status of the first worker monitor node, and if, responsive to the querying, the operational status of the first worker monitor node is reported to be failed, (I) updating a list of failed worker monitor nodes in the distributed file system, and (II) re-assigning, by the master monitor node, the plurality of virtual machines assigned to the failed first worker monitor node to a second worker monitor node in the data storage management system.

The above-recited system wherein after the re-assigning, the second worker monitor node performs heartbeat monitoring of the plurality of virtual machines assigned thereto by the master monitor node. The above-recited system wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system. The above-recited system wherein a third data agent is configured as the second worker monitor node, and wherein the third data agent executes on one of (i) a nonvirtualized computing device comprising one or more processors and computer memory, and (ii) a third virtual machine hosted by a hypervisor executing on a computing device comprising one or more processors and computer memory, and wherein the second worker monitor node comprises an instance of the distributed file system; and detecting, by the second worker monitor node, based on a change in the distributed file system, that the plurality of virtual machines have been re-assigned thereto. The above-recited system further comprising: if, responsive to the querying, the operational status of the first worker monitor node is reported to be failed, before the re-assigning of the plurality of virtual machines, (III) determining whether any of the plurality of virtual machines are also confirmed failed in the data storage management system, and (IV) notifying the storage manager to call failover for any of the plurality of virtual machines confirmed failed. The above-recited system further comprising: managing, by the storage manager, a respective failover operation for any of the plurality of virtual machines confirmed failed, wherein the respective failover operation activates a corresponding second virtual machine to operate in place of a failed first virtual machine. The above-recited system further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a replication operation of the first virtual machine to the second virtual machine. The above-recited system further comprising: managing, by the storage manager, a respective failover operation for any of the plurality of virtual machines confirmed failed, wherein the respective failover operation activates a corresponding second virtual machine to operate in place of a failed first virtual machine, wherein prior to the failover operation, the storage manager managed a live synchronization operation of the first virtual machine to the second virtual machine.

Another illustrative embodiment comprises a method for heartbeat monitoring virtual machines in a data storage management system, the method comprising: configuring a first data agent to operate as a first worker monitor node, wherein the first data agent executes on one of: (i) a computing device comprising one or more processors and computer memory, and (ii) a first virtual machine hosted by a hypervisor executing on a computing device comprising one or more processors and computer memory; transmitting, from the first worker monitor node, a plurality of data packets to a second virtual machine hosted by a first hypervisor executing on a computing device comprising one or more processors and computer memory, wherein the second virtual machine is one of a plurality of virtual machines which are assigned to the first worker monitor node for heartbeat monitoring; when the first worker monitor node determines that a rate of responses to the plurality of data packets falls below a predefined threshold, querying one of: (a) the first hypervisor, and (b) a controller of a virtual machine data center comprising the first hypervisor about an operational status of the second virtual machine; if, responsive to the querying, the operational status of the second virtual machine is reported to be failed, (a) refraining from further transmitting of data packets by the first worker monitor node to the second virtual machine.

The above-recited method wherein if, responsive to the querying, the operational status of the second virtual machine is reported to be failed, (b) reporting to a master monitor node that the second virtual machine has been confirmed failed, wherein the reporting comprises updating, by the first worker monitor node, a data structure in a distributed file system having an instance on the first worker monitor node and on the master monitor node. The above-recited method further comprising: if, responsive to the querying, the operational status of the second virtual machine is reported to be active, resuming the transmitting of data packets by the first worker monitor node to the second virtual machine. The above-recited method further comprising: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited method wherein a second data agent is configured to operate as a master monitor node and executes on one of (i) a computing device comprising one or more processors and computer memory, and (ii) a third virtual machine hosted by a hypervisor executing on a computing device comprising one or more processors and computer memory; and wherein the master monitor node notifies a storage manager that the second virtual machine has been confirmed failed; and wherein the storage manager manages storage management operations in the data storage management system. The above-recited method further comprising: managing, by the storage manager, a failover operation for the second virtual machine, wherein a fourth virtual machine is activated to operate in place of the failed second virtual machine. The above-recited method further comprising: managing, by the storage manager, a failover operation for the second virtual machine, wherein a fourth virtual machine is activated to operate in place of the failed second virtual machine; and wherein prior to the failover operation, the storage manager managed a replication operation of the second virtual machine to the fourth virtual machine. The above-recited method further comprising: managing, by the storage manager, a failover operation for the second virtual machine, wherein a fourth virtual machine is activated to operate in place of the failed second virtual machine; and wherein prior to the failover operation, the storage manager managed a live synchronization operation of the second virtual machine to the fourth virtual machine. The above-recited method wherein the first data agent is further configured to operate as a master monitor node; and wherein the master monitor node notifies a storage manager that the second virtual machine has been confirmed failed, and wherein the storage manager manages storage management operations in the data storage management system. The above-recited method wherein the first worker monitor node transmits a first respective data packet to each of the plurality of virtual machines which are assigned to the first worker monitor node for heartbeat monitoring before transmitting a second respective data packet to each of the plurality of virtual machines. The above-recited method further comprising: for a given data packet from among the plurality of data packets transmitted to the second virtual machine, waiting by the first worker monitor node for a responsive data packet to arrive within a predefined timeout interval; if the responsive data packet does not arrive within the predefined timeout interval, re-transmitting, by the first worker monitor node, the given data packet to the second virtual machine, wherein the re-transmitting is limited to a predefined count. The above-recited method wherein the rate of responses to the plurality of data packets includes the re-transmitting of the given data packet. The above-recited method wherein the first worker monitor node executes an instance of Apache ZooKeeper server and client services and is part of a quorum that also includes the master monitor node. The above-recited method wherein the first worker monitor node executes an instance of Apache ZooKeeper client services; wherein the master monitor node is part of a quorum of monitor nodes; and wherein the first worker monitor node is not part of the quorum.

Yet another illustrative embodiment comprises a computer-readable medium, excluding transitory propagating signals, storing instructions that, when executed by a computing device, cause the computing device to perform operations comprising: transmitting, from a first worker monitor node, a plurality of data packets to a second virtual machine hosted by a first hypervisor executing on a computing device comprising one or more processors and computer memory, wherein the second virtual machine is one of a plurality of virtual machines which are assigned to the first worker monitor node for heartbeat monitoring, wherein a first data agent is configured to operate as the first worker monitor node, wherein the first data agent executes on the computing device, which comprises one of: (i) one or more processors and computer memory, and (ii) a first virtual machine hosted by a hypervisor executing on the computing device having one or more processors and computer memory; when the first worker monitor node determines that a rate of responses to the plurality of data packets falls below a predefined threshold, querying one of: (a) the first hypervisor, and (b) a controller of a virtual machine data center comprising the first hypervisor about an operational status of the second virtual machine; and if, responsive to the querying, the operational status of the second virtual machine is reported to be failed, (a) refraining from further transmitting of data packets by the first worker monitor node to the second virtual machine.

The above-recited computer-readable medium wherein if, responsive to the querying, the operational status of the second virtual machine is reported to be failed, (b) reporting to a master monitor node that the second virtual machine has been confirmed failed, wherein the reporting comprises updating, by the first worker monitor node, a data structure in a distributed file system having an instance on the first worker monitor node and on the master monitor node. The above-recited computer-readable medium further comprising: if, responsive to the querying, the operational status of the second virtual machine is reported to be active, resuming the transmitting of data packets by the first worker monitor node to the second virtual machine. The above-recited computer-readable medium further comprising: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited computer-readable medium wherein a second data agent is configured to operate as a master monitor node and executes on one of (i) a computing device comprising one or more processors and computer memory, and (ii) a third virtual machine hosted by a hypervisor executing on a computing device comprising one or more processors and computer memory; and wherein the master monitor node notifies a storage manager that the second virtual machine has been confirmed failed; and wherein the storage manager manages storage management operations in the data storage management system. The above-recited computer-readable medium further comprising: managing, by the storage manager, a failover operation for the second virtual machine, wherein a fourth virtual machine is activated to operate in place of the failed second virtual machine. The above-recited computer-readable medium further comprising: managing, by the storage manager, a failover operation for the second virtual machine, wherein a fourth virtual machine is activated to operate in place of the failed second virtual machine; and wherein prior to the failover operation, the storage manager managed a replication operation of the second virtual machine to the fourth virtual machine. The above-recited computer-readable medium further comprising: managing, by the storage manager, a failover operation for the second virtual machine, wherein a fourth virtual machine is activated to operate in place of the failed second virtual machine; and wherein prior to the failover operation, the storage manager managed a live synchronization operation of the second virtual machine to the fourth virtual machine. The above-recited computer-readable medium wherein the first data agent is further configured to operate as a master monitor node; and wherein the master monitor node notifies a storage manager that the second virtual machine has been confirmed failed, and wherein the storage manager manages storage management operations in the data storage management system. The above-recited computer-readable medium wherein the first worker monitor node transmits a first respective data packet to each of the plurality of virtual machines which are assigned to the first worker monitor node for heartbeat monitoring before transmitting a second respective data packet to each of the plurality of virtual machines. The above-recited computer-readable medium further comprising: for a given data packet from among the plurality of data packets transmitted to the second virtual machine, waiting by the first worker monitor node for a responsive data packet to arrive within a predefined timeout interval; if the responsive data packet does not arrive within the predefined timeout interval, re-transmitting, by the first worker monitor node, the given data packet to the second virtual machine, wherein the re-transmitting is limited to a predefined count. The above-recited computer-readable medium wherein the rate of responses to the plurality of data packets includes the re-transmitting of the given data packet. The above-recited computer-readable medium wherein the first worker monitor node executes an instance of Apache ZooKeeper server and client services and is part of a quorum that also includes the master monitor node. The above-recited computer-readable medium wherein the first worker monitor node executes an instance of Apache ZooKeeper client services; wherein the master monitor node is part of a quorum of monitor nodes; and wherein the first worker monitor node is not part of the quorum.

Yet one more illustrative embodiment comprises: a system for heartbeat monitoring virtual machines in a data storage management system comprising: a first data agent configured to operate as a first worker monitor node, wherein the first data agent executes on one of: (i) a computing device comprising one or more processors and computer memory, and (ii) a first virtual machine hosted by a hypervisor executing on a computing device comprising one or more processors and computer memory; and wherein the first worker monitor node is configured to: transmit a plurality of data packets to a second virtual machine hosted by a first hypervisor executing on a computing device comprising one or more processors and computer memory, wherein the second virtual machine is one of a plurality of virtual machines which are assigned to the first worker monitor node for heartbeat monitoring, when the first worker monitor node determines that a rate of responses to the plurality of data packets falls below a predefined threshold, querying one of: (a) the first hypervisor, and (b) a controller of a virtual machine data center comprising the first hypervisor about an operational status of the second virtual machine, and if, responsive to the querying, the operational status of the second virtual machine is reported to be failed, (a) refraining from further transmitting of data packets by the first worker monitor node to the second virtual machine.

The above-recited system wherein if, responsive to the querying, the operational status of the second virtual machine is reported to be failed, (b) reporting to a master monitor node that the second virtual machine has been confirmed failed, wherein the reporting comprises updating, by the first worker monitor node, a data structure in a distributed file system having an instance on the first worker monitor node and on the master monitor node. The above-recited system further comprising: if, responsive to the querying, the operational status of the second virtual machine is reported to be active, resuming the transmitting of data packets by the first worker monitor node to the second virtual machine. The above-recited system further comprising: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited system wherein a second data agent is configured to operate as a master monitor node and executes on one of (i) a computing device comprising one or more processors and computer memory, and (ii) a third virtual machine hosted by a hypervisor executing on a computing device comprising one or more processors and computer memory; and wherein the master monitor node notifies a storage manager that the second virtual machine has been confirmed failed; and wherein the storage manager manages storage management operations in the data storage management system. The above-recited system further comprising: managing, by the storage manager, a failover operation for the second virtual machine, wherein a fourth virtual machine is activated to operate in place of the failed second virtual machine. The above-recited system further comprising: managing, by the storage manager, a failover operation for the second virtual machine, wherein a fourth virtual machine is activated to operate in place of the failed second virtual machine; and wherein prior to the failover operation, the storage manager managed a replication operation of the second virtual machine to the fourth virtual machine. The above-recited system further comprising: managing, by the storage manager, a failover operation for the second virtual machine, wherein a fourth virtual machine is activated to operate in place of the failed second virtual machine; and wherein prior to the failover operation, the storage manager managed a live synchronization operation of the second virtual machine to the fourth virtual machine. The above-recited system wherein the first data agent is further configured to operate as a master monitor node; and wherein the master monitor node notifies a storage manager that the second virtual machine has been confirmed failed, and wherein the storage manager manages storage management operations in the data storage management system. The above-recited system wherein the first worker monitor node transmits a first respective data packet to each of the plurality of virtual machines which are assigned to the first worker monitor node for heartbeat monitoring before transmitting a second respective data packet to each of the plurality of virtual machines. The above-recited system further comprising: for a given data packet from among the plurality of data packets transmitted to the second virtual machine, waiting by the first worker monitor node for a responsive data packet to arrive within a predefined timeout interval; if the responsive data packet does not arrive within the predefined timeout interval, re-transmitting, by the first worker monitor node, the given data packet to the second virtual machine, wherein the re-transmitting is limited to a predefined count. The above-recited system wherein the rate of responses to the plurality of data packets includes the re-transmitting of the given data packet. The above-recited system wherein the first worker monitor node executes an instance of Apache ZooKeeper server and client services and is part of a quorum that also includes the master monitor node. The above-recited system wherein the first worker monitor node executes an instance of Apache ZooKeeper client services; wherein the master monitor node is part of a quorum of monitor nodes; and wherein the first worker monitor node is not part of the quorum.

According to another example embodiment, a method for heartbeat monitoring virtual machines in a data storage management system, the method comprising: heartbeat monitoring, by a first data agent configured to operate as a first worker monitor node, a second virtual machine in the data storage management system, wherein the first data agent executes on one of: (i) a computing device comprising one or more processors and computer memory, and (ii) a first virtual machine hosted by a hypervisor executing on a computing device comprising one or more processors and computer memory; and wherein the heartbeat monitoring comprises: transmitting, from the first worker monitor node, a plurality of data packets to a second virtual machine hosted by a first hypervisor executing on a computing device comprising one or more processors and computer memory, when the first worker monitor node determines that a loss rate of responses to the plurality of data packets exceeds a predefined threshold, querying one of: (a) the first hypervisor that hosts the second virtual machine, and (b) a controller of a virtual machine data center comprising the first hypervisor, about an operational status of the second virtual machine, and if, responsive to the querying, the operational status of the second virtual machine is reported to be failed, (a) refraining by the first worker monitor node from further transmitting data packets to the second virtual machine, and (b) updating by the first worker monitor node, with an indication that the second virtual machine is confirmed failed, a data structure in a distributed file system having an instance on the first worker monitor node.

The above-recited method wherein the heartbeat monitoring further comprises: if, responsive to the querying, the operational status of the second virtual machine is reported to be active, continuing the transmitting of data packets by the first worker monitor node to the second virtual machine. The above-recited method wherein the heartbeat monitoring further comprises: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited method wherein the heartbeat monitoring further comprises: receiving, by a master monitor node in the data storage management system, the indication that the second virtual machine is confirmed failed, based on the master monitor node detecting the updating in an instance of the distributed file system on the master monitor node; and notifying a storage manager, by the master monitor node, that the second virtual machine is confirmed failed; and based on the notifying, managing by the storage manager, a failover operation of the second virtual machine to a third virtual machine that is configured to replicate at least some operational characteristics of the second virtual machine, wherein the storage manager manages storage management operations in the data storage management system.

According to yet another example embodiment a computer-readable medium, excluding transitory propagating signals, storing instructions that, when executed by a computing device, cause the computing device to perform operations comprising: heartbeat monitoring, by a first data agent configured to operate as a first worker monitor node, a second virtual machine in the data storage management system, wherein the first data agent executes on the computing device, which comprises one of: (i) one or more processors and computer memory, and (ii) a first virtual machine hosted by a hypervisor executing on the computing device having one or more processors and computer memory; and wherein the heartbeat monitoring comprises: transmitting, from the first worker monitor node, a plurality of data packets to a second virtual machine hosted by a first hypervisor executing on a computing device comprising one or more processors and computer memory, when the first worker monitor node determines that a loss rate of responses to the plurality of data packets exceeds a predefined threshold, querying one of: (a) the first hypervisor that hosts the second virtual machine, and (b) a controller of a virtual machine data center comprising the first hypervisor, about an operational status of the second virtual machine, and if, responsive to the querying, the operational status of the second virtual machine is reported to be failed, (a) refraining by the first worker monitor node from further transmitting data packets to the second virtual machine, and (b) updating by the first worker monitor node, with an indication that the second virtual machine is confirmed failed, a data structure in a distributed file system having an instance on the first worker monitor node.

The above-recited computer-readable medium wherein the heartbeat monitoring further comprises: if, responsive to the querying, the operational status of the second virtual machine is reported to be active, continuing the transmitting of data packets by the first worker monitor node to the second virtual machine. The above-recited computer-readable medium wherein the heartbeat monitoring further comprises: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited computer-readable medium wherein the heartbeat monitoring further comprises: receiving, by a master monitor node in the data storage management system, the indication that the second virtual machine is confirmed failed, based on the master monitor node detecting the updating in an instance of the distributed file system on the master monitor node; and notifying a storage manager, by the master monitor node, that the second virtual machine is confirmed failed; and based on the notifying, managing by the storage manager, a failover operation of the second virtual machine to a third virtual machine that is configured to replicate at least some operational characteristics of the second virtual machine, wherein the storage manager manages storage management operations in the data storage management system.

According to one more example embodiment a system for heartbeat monitoring virtual machines comprising: a first data agent configured to operate as a first worker monitor node, wherein the first data agent executes on one of: (i) a computing device comprising one or more processors and computer memory, and (ii) a first virtual machine hosted by a hypervisor executing on a computing device comprising one or more processors and computer memory; and wherein the first worker monitor node is configured to: transmit a plurality of data packets to a second virtual machine hosted by a first hypervisor executing on a computing device comprising one or more processors and computer memory, when the first worker monitor node determines that a loss rate of responses to the plurality of data packets exceeds a predefined threshold, querying one of: (a) the first hypervisor that hosts the second virtual machine, and (b) a controller of a virtual machine data center comprising the first hypervisor, about an operational status of the second virtual machine, and if, responsive to the querying, the operational status of the second virtual machine is reported to be failed, (a) refraining by the first worker monitor node from further transmitting data packets to the second virtual machine, and (b) updating by the first worker monitor node, with an indication that the second virtual machine is confirmed failed, a data structure in a distributed file system having an instance on the first worker monitor node.

The above-recited system wherein the heartbeat monitoring further comprises: if, responsive to the querying, the operational status of the second virtual machine is reported to be active, continuing the transmitting of data packets by the first worker monitor node to the second virtual machine. The above-recited system wherein the heartbeat monitoring further comprises: if, responsive to the querying, the operational status of the second virtual machine is reported to be undergoing maintenance, (i) suspending for a time period the transmitting of data packets by the first worker monitor node to the second virtual machine, and (ii) after the time period expires, querying again about the operational status of the second virtual machine. The above-recited system wherein the heartbeat monitoring further comprises: receiving, by a master monitor node in the data storage management system, the indication that the second virtual machine is confirmed failed, based on the master monitor node detecting the updating in an instance of the distributed file system on the master monitor node; and notifying a storage manager, by the master monitor node, that the second virtual machine is confirmed failed; and based on the notifying, managing by the storage manager, a failover operation of the second virtual machine to a third virtual machine that is configured to replicate at least some operational characteristics of the second virtual machine, wherein the storage manager manages storage management operations in the data storage management system.

According to another example embodiment a method for assigning virtual machines as targets for heartbeat monitoring by heartbeat monitor nodes in a data storage management system, the method comprising: validating, by a heartbeat monitor node, which is designated a master monitor node, whether a first set of virtual machines are operational in the data storage management system, wherein the master monitor node comprises a data agent in communication with a storage manager, wherein the data agent executes on one of (i) a nonvirtualized computing device comprising one or more processors and computer memory, and (ii) a first virtual machine executing on a computing device comprising one or more processors and computer memory and executing a hypervisor, and wherein the storage manager executes on a computing device comprising one or more processors and computer memory, and wherein the storage manager manages storage management operations in the data storage management system; wherein the validating comprises: obtaining from the storage manager a first list of the first set of virtual machines that are targeted for heartbeat monitoring by one or more heartbeat monitor nodes, and querying one or more hypervisors operating in the data storage management system to confirm whether the targeted first set of virtual machines are currently operational, resulting in a list of confirmed target virtual machines; based on distribution rules, assigning each target virtual machine on the list of confirmed target virtual machines to one of a plurality of worker monitor nodes, resulting in a worker-to-virtual-machine mapping; and performing, by each of the plurality of worker monitor nodes, heartbeat monitoring of one or more target virtual machines assigned thereto in the assigning operation.

The above-recited method wherein before the assigning operation, each of the plurality of worker monitor nodes has been confirmed by the master monitor node to be operational in the data storage management system. The above-recited method further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes. The above-recited method further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes; and transmitting the worker-to-virtual-machine mapping to each of the confirmed worker monitor nodes, thereby enabling each confirmed worker monitor node to perform the heartbeat monitoring of respective one or more confirmed target virtual machines assigned thereto in the assigning operation. The above-recited method wherein the master monitor node also operates as one of the plurality of worker monitor nodes.

The above-recited method wherein the distribution rules favor assigning a given target virtual machine on the list of confirmed target virtual machines to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine. The above-recited method wherein the distribution rules favor assigning a given target virtual machine on the list of confirmed target virtual machines to a second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine. The above-recited method wherein the distribution rules favor assigning a given target virtual machine on the list of confirmed target virtual machines to a third worker monitor node that operates on a different virtual machine network than and is hosted by the same virtual machine host server as the given target virtual machine, as compared to assigning the given target virtual machine to a fourth worker monitor node having an acceptable hop count from the given target virtual machine. The above-recited method wherein the distribution rules favor assigning a given target virtual machine on the list of confirmed target virtual machines to a fourth worker monitor node having an acceptable hop count from the given target virtual machine, as compared to assigning the given target virtual machine to a fifth worker monitor node that operates on the same subnetwork as the given target virtual machine. The above-recited method wherein the distribution rules favor assigning a given target virtual machine on the list of confirmed target virtual machines to a fifth worker monitor node that operates on the same subnetwork as the given target virtual machine, as compared to assigning the given target virtual machine to a sixth worker monitor node having an acceptable ping-latency from the given target virtual machine. The above-recited method wherein the distribution rules comprise an order of preferences for assigning a given target virtual machine on the list of confirmed target virtual machines to a worker monitor node; wherein the order of preferences favor assigning the given target virtual machine to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine; wherein the order of preferences favor assigning the given target virtual machine to the second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine; wherein the order of preferences favor assigning the given target virtual machine to the third worker monitor node that operates on a different virtual machine network than and is hosted by the same virtual machine host server as the given target virtual machine, as compared to assigning the given target virtual machine to a fourth worker monitor node having an acceptable hop count from the given target virtual machine; wherein the order of preferences favor assigning the given target virtual machine to the fourth worker monitor node having an acceptable hop count from the given target virtual machine, as compared to assigning the given target virtual machine to a fifth worker monitor node that operates on the same subnetwork as the given target virtual machine; and wherein the order of preferences favor assigning the given target virtual machine to the fifth worker monitor node that operates on the same subnetwork as the given target virtual machine, as compared to assigning the given target virtual machine to a sixth worker monitor node having an acceptable ping-latency from the given target virtual machine. The above-recited method wherein the worker-to-virtual-machine mapping is transmitted to each of the plurality of worker monitor nodes by a distributed file system having an instance on each of the plurality of worker monitor nodes. The above-recited method wherein the worker-to-virtual-machine mapping is transmitted to each of the plurality of worker monitor nodes by a distributed file system having an instance on each of the plurality of worker monitor nodes, wherein the distributed file system is based on Apache ZooKeeper services. The above-recited method wherein the master monitor node executes an instance of Apache ZooKeeper server and client services. The above-recited method wherein the master monitor node and at least one of the plurality of worker monitor nodes is part of a quorum based on Apache ZooKeeper services. The above-recited method wherein the master monitor node executes an instance of Apache ZooKeeper server and client services; and wherein the master monitor node and at least one of the plurality of worker monitor nodes is part of a quorum based on Apache ZooKeeper services.

According to yet another example embodiment a computer-readable medium, excluding transitory propagating signals, storing instructions that, when executed by a computing device, cause the computing device to perform operations comprising: validating, by a heartbeat monitor node, which is designated a master monitor node, whether a first set of virtual machines are operational in the data storage management system, wherein the master monitor node comprises a data agent in communication with a storage manager, wherein the data agent executes on the computing device comprising one of: (i) one or more processors and computer memory, and (ii) a first virtual machine hosted by a hypervisor executing on one or more processors and computer memory, and wherein the storage manager executes on a computing device comprising one or more processors and computer memory, and wherein the storage manager manages storage management operations in the data storage management system; wherein the validating comprises: obtaining from the storage manager a first list of the first set of virtual machines that are targeted for heartbeat monitoring by one or more heartbeat monitor nodes, and querying one or more hypervisors operating in the data storage management system to confirm whether the targeted first set of virtual machines are currently operational, resulting in a list of confirmed target virtual machines; based on distribution rules, assigning each target virtual machine on the list of confirmed target virtual machines to one of a plurality of worker monitor nodes, resulting in a worker-to-virtual-machine mapping; and performing, by each of the plurality of worker monitor nodes, heartbeat monitoring of one or more target virtual machines assigned thereto in the assigning operation.

The above-recited computer-readable medium wherein before the assigning operation, each of the plurality of worker monitor nodes has been confirmed by the master monitor node to be operational in the data storage management system. The above-recited computer-readable medium further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes. The above-recited computer-readable medium further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes; and transmitting the worker-to-virtual-machine mapping to each of the confirmed worker monitor nodes, thereby enabling each confirmed worker monitor node to perform the heartbeat monitoring of respective one or more confirmed target virtual machines assigned thereto in the assigning operation. The above-recited computer-readable medium wherein the master monitor node also operates as one of the plurality of worker monitor nodes.

The above-recited computer-readable medium wherein the distribution rules favor assigning a given target virtual machine on the list of confirmed target virtual machines to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine. The above-recited computer-readable medium wherein the distribution rules favor assigning a given target virtual machine on the list of confirmed target virtual machines to a second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine. The above-recited computer-readable medium wherein the distribution rules favor assigning a given target virtual machine on the list of confirmed target virtual machines to a third worker monitor node that operates on a different virtual machine network than and is hosted by the same virtual machine host server as the given target virtual machine, as compared to assigning the given target virtual machine to a fourth worker monitor node having an acceptable hop count from the given target virtual machine. The above-recited computer-readable medium wherein the distribution rules favor assigning a given target virtual machine on the list of confirmed target virtual machines to a fourth worker monitor node having an acceptable hop count from the given target virtual machine, as compared to assigning the given target virtual machine to a fifth worker monitor node that operates on the same subnetwork as the given target virtual machine. The above-recited computer-readable medium wherein the distribution rules favor assigning a given target virtual machine on the list of confirmed target virtual machines to a fifth worker monitor node that operates on the same subnetwork as the given target virtual machine, as compared to assigning the given target virtual machine to a sixth worker monitor node having an acceptable ping-latency from the given target virtual machine. The above-recited computer-readable medium wherein the distribution rules comprise an order of preferences for assigning a given target virtual machine on the list of confirmed target virtual machines to a worker monitor node; wherein the order of preferences favor assigning the given target virtual machine to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine; wherein the order of preferences favor assigning the given target virtual machine to the second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine; wherein the order of preferences favor assigning the given target virtual machine to the third worker monitor node that operates on a different virtual machine network than and is hosted by the same virtual machine host server as the given target virtual machine, as compared to assigning the given target virtual machine to a fourth worker monitor node having an acceptable hop count from the given target virtual machine; wherein the order of preferences favor assigning the given target virtual machine to the fourth worker monitor node having an acceptable hop count from the given target virtual machine, as compared to assigning the given target virtual machine to a fifth worker monitor node that operates on the same subnetwork as the given target virtual machine; and wherein the order of preferences favor assigning the given target virtual machine to the fifth worker monitor node that operates on the same subnetwork as the given target virtual machine, as compared to assigning the given target virtual machine to a sixth worker monitor node having an acceptable ping-latency from the given target virtual machine. The above-recited computer-readable medium wherein the worker-to-virtual-machine mapping is transmitted to each of the plurality of worker monitor nodes by a distributed file system having an instance on each of the plurality of worker monitor nodes. The above-recited computer-readable medium wherein the worker-to-virtual-machine mapping is transmitted to each of the plurality of worker monitor nodes by a distributed file system having an instance on each of the plurality of worker monitor nodes, wherein the distributed file system is based on Apache ZooKeeper services. The above-recited computer-readable medium wherein the master monitor node executes an instance of Apache ZooKeeper server and client services. The above-recited computer-readable medium wherein the master monitor node and at least one of the plurality of worker monitor nodes is part of a quorum based on Apache ZooKeeper services. The above-recited computer-readable medium wherein the master monitor node executes an instance of Apache ZooKeeper server and client services; and wherein the master monitor node and at least one of the plurality of worker monitor nodes is part of a quorum based on Apache ZooKeeper services.

According to yet one more example embodiment a system for assigning virtual machines as targets for heartbeat monitoring by heartbeat monitor nodes in a data storage management system, the system comprising: a data agent that executes on the computing device comprising one of: (i) one or more processors and computer memory, and (ii) a first virtual machine hosted by a hypervisor executing on one or more processors and computer memory; wherein the data agent is configured to operate as a master monitor node for validating whether a first set of virtual machines are operational in the data storage management system, wherein the master monitor node is in communication with a storage manager that executes on a computing device comprising one or more processors and computer memory, and wherein the storage manager manages storage management operations in the data storage management system; wherein the validating by the master monitor node comprises: obtaining from the storage manager a first list of the first set of virtual machines that are targeted for heartbeat monitoring by one or more heartbeat monitor nodes, and querying one or more hypervisors operating in the data storage management system to confirm whether the targeted first set of virtual machines are currently operational, resulting in a list of confirmed target virtual machines; based on distribution rules, assigning each target virtual machine on the list of confirmed target virtual machines to one of a plurality of worker monitor nodes, resulting in a worker-to-virtual-machine mapping; and performing, by each of the plurality of worker monitor nodes, heartbeat monitoring of one or more target virtual machines assigned thereto in the assigning operation.

The above-recited system wherein before the assigning operation, each of the plurality of worker monitor nodes has been confirmed by the master monitor node to be operational in the data storage management system. The above-recited system further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes. The above-recited system further comprising: obtaining from the storage manager a list of a second set of heartbeat monitor nodes that are designated worker monitor nodes in the data storage management system; querying at least one of: (a) one or more hypervisors operating in the data storage management system, and (b) one or more nonvirtualized computing devices in the data storage management system, to confirm whether the designated worker monitor nodes are currently operational, resulting in a list of confirmed worker monitor nodes, which comprises the plurality of worker monitor nodes; and transmitting the worker-to-virtual-machine mapping to each of the confirmed worker monitor nodes, thereby enabling each confirmed worker monitor node to perform the heartbeat monitoring of respective one or more confirmed target virtual machines assigned thereto in the assigning operation. The above-recited system wherein the master monitor node also operates as one of the plurality of worker monitor nodes.

The above-recited system wherein the distribution rules favor assigning a given target virtual machine on the list of confirmed target virtual machines to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine. The above-recited system wherein the distribution rules favor assigning a given target virtual machine on the list of confirmed target virtual machines to a second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine. The above-recited system wherein the distribution rules favor assigning a given target virtual machine on the list of confirmed target virtual machines to a third worker monitor node that operates on a different virtual machine network than and is hosted by the same virtual machine host server as the given target virtual machine, as compared to assigning the given target virtual machine to a fourth worker monitor node having an acceptable hop count from the given target virtual machine. The above-recited system wherein the distribution rules favor assigning a given target virtual machine on the list of confirmed target virtual machines to a fourth worker monitor node having an acceptable hop count from the given target virtual machine, as compared to assigning the given target virtual machine to a fifth worker monitor node that operates on the same subnetwork as the given target virtual machine. The above-recited system wherein the distribution rules favor assigning a given target virtual machine on the list of confirmed target virtual machines to a fifth worker monitor node that operates on the same subnetwork as the given target virtual machine, as compared to assigning the given target virtual machine to a sixth worker monitor node having an acceptable ping-latency from the given target virtual machine. The above-recited system wherein the distribution rules comprise an order of preferences for assigning a given target virtual machine on the list of confirmed target virtual machines to a worker monitor node; wherein the order of preferences favor assigning the given target virtual machine to a first worker monitor node that operates on the same virtual machine network and is hosted by the same virtual machine host server as the given target virtual machine, as compared to assigning the given virtual machine to a second worker monitor node that operates on the same virtual machine network as and is hosted by a different virtual machine host server than the given target virtual machine; wherein the order of preferences favor assigning the given target virtual machine to the second worker monitor node that operates on the same virtual machine network as and is hosted by a different virtual machine host server than the given target virtual machine, as compared to assigning the given virtual machine to a third worker monitor node that operates on a different virtual machine network than and is hosted by the same virtual machine host server as the given target virtual machine; wherein the order of preferences favor assigning the given target virtual machine to the third worker monitor node that operates on a different virtual machine network than and is hosted by the same virtual machine host server as the given target virtual machine, as compared to assigning the given target virtual machine to a fourth worker monitor node having an acceptable hop count from the given target virtual machine; wherein the order of preferences favor assigning the given target virtual machine to the fourth worker monitor node having an acceptable hop count from the given target virtual machine, as compared to assigning the given target virtual machine to a fifth worker monitor node that operates on the same subnetwork as the given target virtual machine; and wherein the order of preferences favor assigning the given target virtual machine to the fifth worker monitor node that operates on the same subnetwork as the given target virtual machine, as compared to assigning the given target virtual machine to a sixth worker monitor node having an acceptable ping-latency from the given target virtual machine. The above-recited system wherein the worker-to-virtual-machine mapping is transmitted to each of the plurality of worker monitor nodes by a distributed file system having an instance on each of the plurality of worker monitor nodes. The above-recited system wherein the worker-to-virtual-machine mapping is transmitted to each of the plurality of worker monitor nodes by a distributed file system having an instance on each of the plurality of worker monitor nodes, wherein the distributed file system is based on Apache ZooKeeper services. The above-recited system wherein the master monitor node executes an instance of Apache ZooKeeper server and client services. The above-recited system wherein the master monitor node and at least one of the plurality of worker monitor nodes is part of a quorum based on Apache ZooKeeper services. The above-recited system wherein the master monitor node executes an instance of Apache ZooKeeper server and client services; and wherein the master monitor node and at least one of the plurality of worker monitor nodes is part of a quorum based on Apache ZooKeeper services.

Some example enumerated embodiments of the present invention are herein in the form of methods, systems, and non-transitory computer-readable media, without limitation. In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising: configuring a first data agent as a master monitor node in a data storage management system for managing worker monitor nodes, wherein: the master monitor node comprises a local copy of a first data file for managing heartbeat monitoring of virtual machines in the data storage management system, and changes to the first data file are propagated to other monitor nodes in the data storage management system; configuring a second data agent as a first worker monitor node in the data storage management system, wherein: the first worker monitor node performs heartbeat monitoring of a plurality of virtual machines as assigned by the master monitor node, and the first worker monitor node comprises a corresponding local copy of the first data file that indicates the plurality of virtual machines to be monitored by the first worker monitor node; detecting, by the master monitor node, that the first worker monitor node has failed based on a change to at least one file of a distributed file system, which is accessible by the master monitor node and by the first worker monitor node, wherein the distributed file system comprises the first data file; querying for an operational status of the second data agent; and in response to the operational status indicating that the second data agent has failed: re-assigning, by the master monitor node, the plurality of virtual machines assigned to the first worker monitor node to a third data agent configured as a second worker monitor node in the data storage management system; and updating the first data file to show that the plurality of virtual machines are assigned to the second worker monitor node, wherein the first data file as updated is propagated by the distributed file system to other monitor nodes in the data storage management system, including to the master monitor node.

2. The method of claim 1, wherein:
the first data agent executes on one of (i) a nonvirtualized computing device comprising one or more processors and computer memory, and (ii) a first virtual machine hosted by a hypervisor executing on a computing device comprising one or more processors and computer memory.

3. The method of claim 1, wherein:
the second data agent executes on one of (i) a nonvirtualized computing device comprising one or more processors and computer memory, and (ii) a second virtual machine hosted by a hypervisor executing on a computing device comprising one or more processors and computer memory.

4. The method of claim 3, wherein querying for the operational status of the second data agent comprises:
querying one of: (a) the nonvirtualized computing device, (b) the hypervisor that hosts the second virtual machine, and (c) a controller of a virtual machine data center comprising the second virtual machine, about the operational status of the second data agent.

5. The method of claim 1, further comprising:
monitoring, by the second worker monitor node, the plurality of virtual machines assigned thereto by the master monitor node.

6. The method of claim 1, wherein the master monitor node assigns the plurality of virtual machines to the first worker monitor node based on a proximity of each of the plurality of virtual machines to the first monitor worker node within a network topology.

7. The method of claim 1, further comprising:
initiating, by a storage manager of the data storage management system, a failover operation for a first virtual machine among the plurality of virtual machines, wherein the failover operation activates a second virtual machine located in a second region of a cloud service provider to operate in place of the first virtual machine among the plurality of virtual machines located in a first region of the cloud service provider.

8. A system comprising: one or more non-transitory, computer-readable mediums having computer-executable instructions stored thereon; and one or more processors that, having executed the computer-executable instructions, configure the system to perform a plurality of operations comprising: configuring a first data agent as a master monitor node in a data storage management system for managing worker monitor nodes, wherein: the master monitor node comprises a local copy of a first data file for managing heartbeat monitoring of virtual machines in the data storage management system, and changes to the first data the are propagated to other monitor nodes in the data storage management system; configuring a second data agent as a first worker monitor node in the data storage management system, wherein: the first worker monitor node performs heartbeat monitoring of a plurality of virtual machines as assigned by the master monitor node, and the first worker monitor node comprises a corresponding local copy of the first data file that indicates the plurality of virtual machines to be monitored by the first worker monitor node; detecting, by the master monitor node, that the first worker monitor node has faded based on a change to at least one the of a distributed file system accessible by the master monitor node and by the first worker monitor node, wherein the distributed file system comprises the first data file; querying for an operational status of the second data agent; and in response to the operational status indicating that the second data agent has failed re-assigning, by the master monitor node, the plurality of virtual machines assigned to the first worker monitor node to a third data agent configured as a second worker monitor node in the data storage management system; and updating the first data file to show that of the plurality of virtual machines are assigned to the second worker monitor node, wherein the first data file as updated is propagated by the distributed the system to other monitor nodes in the data storage management system, including to the master monitor node.

9. The system of claim 8, wherein:
the first data agent executes on one of (i) a nonvirtualized computing device comprising one or more processors and computer memory, and (ii) a first virtual machine hosted by a hypervisor executing on a computing device comprising one or more processors and computer memory.

10. The system of claim 8, wherein:
the second data agent executes on one of (i) a nonvirtualized computing device comprising one or more processors and computer memory, and (ii) a second virtual machine hosted by a hypervisor executing on a computing device comprising one or more processors and computer memory.

11. The system of claim 10, wherein querying for the operational status of the second data agent comprises:
querying one of: (a) the nonvirtualized computing device, (b) the hypervisor that hosts the second virtual machine, and (c) a controller of a virtual machine data center comprising the second virtual machine, about the operational status of the second data agent.

12. The system of claim 8, wherein the plurality of operations further comprises:
monitoring, by the second worker monitor node, the plurality of virtual machines assigned thereto by the master monitor node.

13. The system of claim 8, wherein the master monitor node is configured to assign the plurality of virtual machines to the first worker monitor node based on a proximity of each of the plurality of virtual machines to the first worker monitor node within a network topology.

14. The system of claim 8, wherein the plurality of operations further comprises:
initiating, by a storage manager of the data storage management system, a failover operation for a first virtual machine among the plurality of virtual machines, wherein the failover operation activates a second virtual machine located in a second region of a cloud service provider to operate in place of the first virtual machine among the plurality of virtual machines located in a first region of the cloud service provider.

15. A non-transitory, computer-readable medium having computer-executable instructions stored thereon that, when executed by one or more processors, cause a system to perform a method comprising: configuring a first data agent as a master monitor node in a data storage management system for managing worker monitor nodes, wherein: the master monitor node comprises a local copy of a first data the for managing heartbeat monitoring of virtual machines in the data storage management system, and changes to the first data the are propagated to other monitor nodes in the data storage management system; configuring a second data agent as a first worker monitor node in the data storage management system, wherein: the first worker monitor node performs heartbeat monitoring of a plurality of virtual machines as assigned by the master monitor node, and the first worker monitor node comprises a corresponding local copy of the first data the that indicates the plurality of virtual machines to be monitored by the first worker monitor node; detecting, by the master monitor node, that the first worker monitor node has faded based on a change to at least one the of a distributed file system, which is accessible by the master monitor node and by the first worker monitor node, wherein the distributed file system comprises the first data file; querying for an operational status of the second data agent; and in response to the operational status indicating that the second data agent has failed: re-assigning, by the master monitor node, the plurality of virtual machines assigned to the first worker monitor node to a third data agent configured as a second worker monitor node in the data storage management system; and updating the first data the to show that the plurality of virtual machines are assigned to the second worker monitor node, wherein the first data file as updated is propagated by the distributed the system to other monitor nodes in the data storage management system, including to the master monitor node.

16. The non-transitory, computer-readable medium of claim 15, wherein:

the first data agent executes on one of (i) a nonvirtualized computing device comprising one or more processors and computer memory, and (ii) a first virtual machine hosted by a hypervisor executing on a computing device comprising one or more processors and computer memory.

17. The non-transitory, computer-readable medium of claim 15, wherein:

the second data agent executes on one of (i) a nonvirtualized computing device comprising one or more processors and computer memory, and (ii) a second virtual machine hosted by a hypervisor executing on a computing device comprising one or more processors and computer memory.

18. The non-transitory, computer-readable medium of claim 17, wherein querying for the operational status of the second data agent comprises:

querying one of: (a) the nonvirtualized computing device, (b) the hypervisor that hosts the second virtual machine, and (c) a controller of a virtual machine data center comprising the second virtual machine, about the operational status of the second data agent.

19. The non-transitory, computer-readable medium of claim 15, wherein the method further comprises:

monitoring, by the second worker monitor node, the plurality of virtual machines assigned thereto by the master monitor node.

20. The non-transitory, computer-readable medium of claim 15, wherein the master monitor node assigns the plurality of virtual machines to the first worker monitor node based on a proximity of each of the plurality of virtual machines to the first worker monitor node within a network topology.

* * * * *